(12) United States Patent
Arima et al.

(10) Patent No.: US 10,858,883 B2
(45) Date of Patent: Dec. 8, 2020

(54) OPTICAL BODY, WINDOW MATERIAL, AND ROLL SCREEN

(71) Applicant: Dexerials Corporation, Tokyo (JP)

(72) Inventors: Mitsuo Arima, Sendai (JP); Atsushi Shibuya, Tokyo (JP); Tsutomu Nagahama, Tokyo (JP)

(73) Assignee: Dexerials Corporation, Tokyo (JP)

( * ) Notice: Subject to any disclaimer, the term of this patent is extended or adjusted under 35 U.S.C. 154(b) by 97 days.

(21) Appl. No.: 16/091,639

(22) PCT Filed: Mar. 22, 2017

(86) PCT No.: PCT/JP2017/011520
§ 371 (c)(1),
(2) Date: Oct. 5, 2018

(87) PCT Pub. No.: WO2017/175588
PCT Pub. Date: Oct. 12, 2017

(65) Prior Publication Data
US 2019/0153776 A1    May 23, 2019

(30) Foreign Application Priority Data

Apr. 7, 2016 (JP) .................................. 2016-077582
Jul. 19, 2016 (JP) .................................. 2016-141835

(51) Int. Cl.
*G02B 5/08* (2006.01)
*E06B 9/24* (2006.01)
(Continued)

(52) U.S. Cl.
CPC .................. *E06B 9/24* (2013.01); *E06B 9/40* (2013.01); *E06B 9/42* (2013.01); *G02B 5/124* (2013.01);
(Continued)

(58) Field of Classification Search
CPC ...... A47H 23/06; A47H 23/08; E06B 3/6608; E06B 9/24; E06B 9/42; E06B 2009/2417;
(Continued)

(56) References Cited

U.S. PATENT DOCUMENTS 5,831,767 A * 11/1998 Benson .................. G02B 5/124
359/529
6,685,323 B1 * 2/2004 Mimura .................. G02B 5/124
359/529
(Continued)

FOREIGN PATENT DOCUMENTS

JP    2010160467 A    7/2010
JP    2011212892 A   10/2011
(Continued)

OTHER PUBLICATIONS

Oct. 11, 2018, International Preliminary Report on Patentability issued in the International Patent Application No. PCT/JP2017/011520.
(Continued)

*Primary Examiner* — Balram T Parbadia
(74) *Attorney, Agent, or Firm* — Kenja IP Law PC

(57) ABSTRACT

An optical body includes a first optical transparent layer having quadrangular pyramid-shaped depressions, a wavelength-selective reflecting layer formed on the depressions and selectively reflecting light of a specific wavelength band, and a second optical transparent layer formed on the wavelength-selective reflecting layer. When (θ, φ) is taken as the incident angle (θ: angle between perpendicular line relative to second optical transparent layer acting as incident surface and light incident on incident surface; φ: angle between specific straight line within incident surface and component resulting from projection of incident light on incident surface), with respect to incident light that is incident on the incident surface from different φ directions at (Continued)

θ=60°, the optical body has an average reflection angle of reflected light to the same quadrant as the incident light of 30° or more.

7 Claims, 30 Drawing Sheets

(51) Int. Cl.
  *G02B 5/26* (2006.01)
  *G02B 5/124* (2006.01)
  *E06B 9/40* (2006.01)
  *E06B 9/42* (2006.01)

(52) U.S. Cl.
  CPC ........ *G02B 5/26* (2013.01); *E06B 2009/2417* (2013.01)

(58) Field of Classification Search
  CPC ........ G02B 27/141; G02B 5/08; G02B 5/124; G02B 5/208; G02B 5/26; G02B 5/00
  See application file for complete search history.

(56) References Cited

U.S. PATENT DOCUMENTS

| | | | | |
|---|---|---|---|---|
| 6,802,616 | B2* | 10/2004 | Mimura | G02B 5/124 359/529 |
| 2011/0216414 | A1* | 9/2011 | Suzuki | C03C 17/36 359/585 |
| 2011/0256350 | A1 | 10/2011 | Ito | |
| 2012/0300306 | A1* | 11/2012 | Nagahama | G02B 1/118 359/601 |
| 2015/0098128 | A1* | 4/2015 | Carls | G02B 5/305 359/485.06 |

FOREIGN PATENT DOCUMENTS

| | | |
|---|---|---|
| JP | 2012234047 A | 11/2012 |
| JP | 2012237978 A | 12/2012 |
| JP | 2013237256 A | 11/2013 |
| WO | 2005087680 A1 | 9/2005 |
| WO | 2011158721 A1 | 12/2011 |
| WO | 2015151610 A1 | 10/2015 |
| WO | 2015162978 A1 | 10/2015 |
| WO | 2016009933 A1 | 1/2016 |

OTHER PUBLICATIONS

Jun. 20, 2017, International Search Report issued in the International Patent Application No. PCT/JP2017/011520.
Nov. 22, 2019, the Extended European Search Report issued by the European Patent Office in the corresponding European Patent Application No. 17778967.4.
Jan. 7, 2020, Notification of Reasons for Refusal issued by the Japan Patent Office in the corresponding Japanese Patent Application No. 2016-141835.
Yilong Han et al., Toward mitigating urban heat island effects: Investigating the thermal-energy impact of bio-inspired retro-reflective building envelopes in dense urban settings, Energy and Buildings, Sep. 1, 2015, pp. 380-389, vol. 102.
Aug. 20, 2020, Office Action issued by the China National Intellectual Property Administration in the corresponding Chinese Patent Application No. 201780022314.3.

* cited by examiner

OPTICAL BODY, WINDOW MATERIAL, AND ROLL SCREEN

CROSS-REFERENCE TO RELATED APPLICATIONS

This application claims priority of Japanese Patent Application No. 2016-077582 (filed Apr. 7, 2016) and Japanese Patent Application No. 2016-141835 (filed Jul. 19, 2016) filed in Japan, the entire disclosure of which is incorporated into this application for reference.

TECHNICAL FIELD

The present disclosure relates to an optical body, a window material, and a roll screen.

BACKGROUND

A laminated structure for shielding against solar radiation that reflects solar radiation has been proposed from a viewpoint of reducing air conditioning load (for example, refer to PTL 1). However, since this laminated structure for shielding against solar radiation is affixed to flat window glass for use, the laminated structure can only specularly reflect incident sunlight. As a consequence, sunlight that is irradiated from the sky and is specularly reflected reaches other buildings and the ground outdoors, and is absorbed and converted to heat, which leads to an increase in the surrounding air temperature. This results in a localized rise in temperature in proximity to a building having a laminated structure for shielding against solar radiation such as described above affixed to all the windows thereof and may act as a factor that exacerbates a heat island effect in an urban area.

An optical body has also been proposed that, with respect to light of a specific wavelength band that exacerbates the heat island effect, causes directional reflection of the light in a direction other than a specular reflection direction (for example, refer to PTL 2). When this optical body is affixed to window glass for use, the optical body is expected to bring about an effect of inhibiting exacerbation of the heat island effect caused by specular reflection as described above because light of the specific wavelength band among sunlight irradiated from the sky can be reflected toward the sky by the optical body. For this reason, optical bodies having enhanced directional reflection performance with respect to light of a specific wavelength band have been developed in recent years as examples of the optical body mentioned above.

CITATION LIST

Patent Literature

PTL 1: WO 05/087680 A1
PTL 2: JP 2010-160467 A

SUMMARY

Technical Problem

The present disclosure was completed in order to respond to the demands set forth above and aims to provide an optical body, window material, and roll screen having enhanced directional reflection performance with respect to light of a specific wavelength band.

Solution to Problem

An optical body according to the present disclosure that solves the problems set forth above comprises:
a first optical transparent layer having a surface in which quadrangular pyramid-shaped depressions having ridges that rhombically intersect are formed;
a wavelength-selective reflecting layer that is formed on the depressions and selectively reflects light of a specific wavelength band; and
a second optical transparent layer formed on the wavelength-selective reflecting layer, wherein
when $(\theta, \phi)$ is taken as an incident angle, where:
$\theta$ is an angle between a perpendicular line relative to the second optical transparent layer acting as an incident surface and incident light that is incident on the incident surface; and
$\phi$ is an angle between a specific straight line within the incident surface and a component resulting from projection of the incident light on the incident surface, with respect to incident light that is incident on the incident surface from different $\phi$ directions at $\theta=60°$, an average reflection angle of reflected light to the same quadrant as the incident light is 30° or more.

Moreover, a window material according to the present disclosure and a roll screen according to the present disclosure each comprise the optical body set forth above.

Advantageous Effect

According to the present disclosure, it is possible to enhance directional reflection performance with respect to light of a specific wavelength band.

DETAILED DESCRIPTION

The following describes embodiments of the present disclosure with reference to the drawings.

First Embodiment

[Configuration of Optical Body]

Figure 1A:
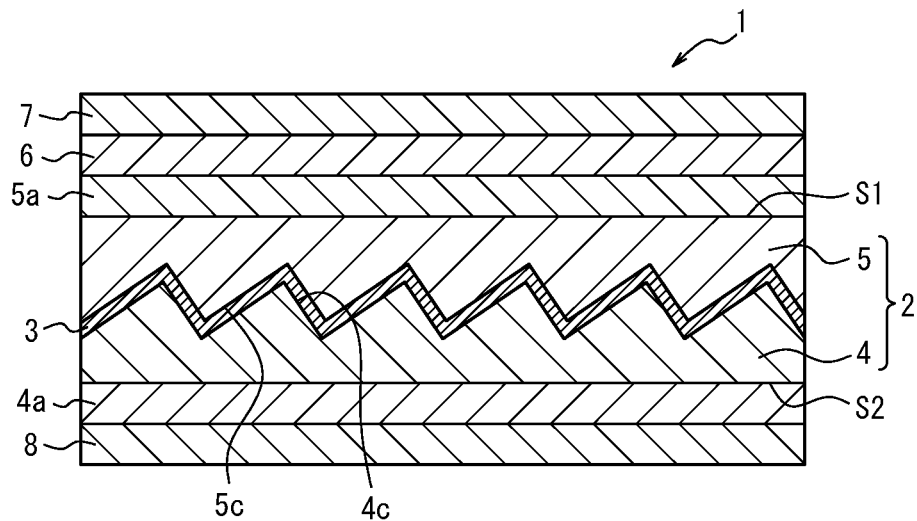
FIG. 1A is a cross-sectional view illustrating one example of configuration of an optical body according to a first embodiment.
Figure 1B:
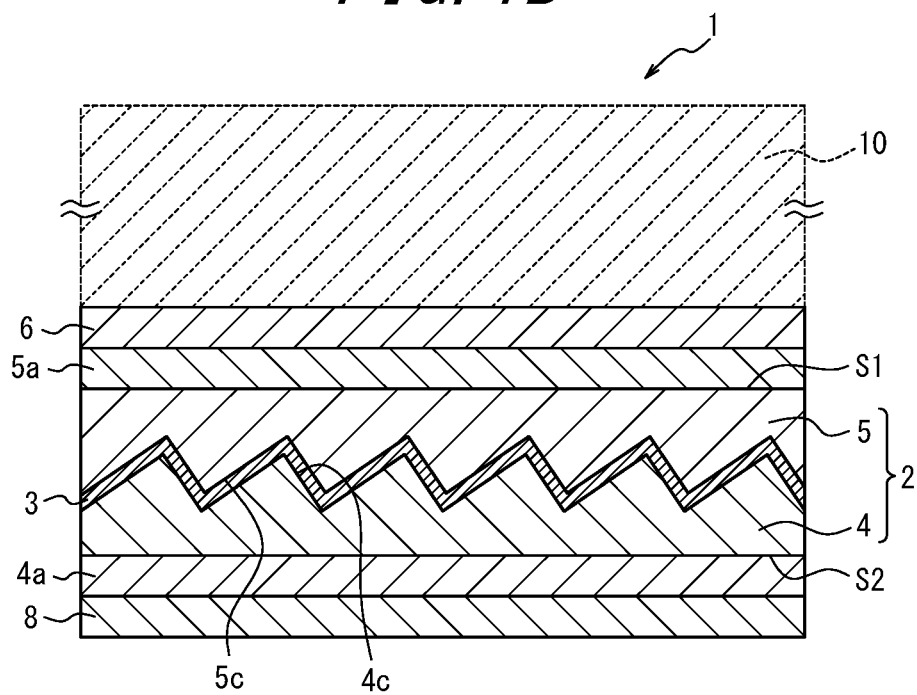
FIG. 1B is a cross-sectional view illustrating an example in which the optical body in FIG. 1A is affixed to an adherend.

FIG. 1A is a cross-sectional view illustrating one example of configuration of an optical body according to a first embodiment. FIG. 1B is a cross-sectional view illustrating an example in which the optical body in FIG. 1A is affixed to an adherend. The optical body 1 has what is referred to as "directional reflection performance". The optical body 1 includes an optical layer 2 having an internal interface with a depression-protrusion shape and a wavelength-selective reflecting layer 3 located at the interface in the optical layer 2. The optical layer 2 includes a first optical transparent layer 4 having a first surface with a depression-protrusion shape and a second optical transparent layer 5 having a second surface with a depression-protrusion shape. The internal interface of the optical layer 2 is formed by the depression-protrusion shaped first and second surfaces that are located in opposition to one another. More specifically, the optical body 1 includes a first optical transparent layer 4 having a depression-protrusion surface, a wavelength-selective reflecting layer 3 formed on the depression-protrusion surface of the first optical transparent layer 4, and a second optical transparent layer 5 formed on the wavelength-selective reflecting layer 3 such as to embed the depression-protrusion surface at which the wavelength-selective reflecting layer 3 is formed. The optical body 1 has an incident surface S1 at which light, such as sunlight, is incident and an emission surface S2 at which light is emitted that has passed through the optical body 1 from among incident light that is incident through the incident surface S1.

The optical body 1 can suitably be adopted for an internal wall member, an external wall member, a window material, a wall material, or the like. Moreover, the optical body 1 can suitably be used as a slat (solar radiation shielding member) of a blind or a screen (solar radiation shielding member) of a roll screen. Furthermore, the optical body 1 can suitably be used as an optical body provided in a lighting portion of a fitting (interior member or exterior member) such as a shoji (Japanese-style sliding door).

The optical body 1 may further include a first substrate 4a at the emission surface S2 of the optical layer 2 as necessary. Moreover, the optical body 1 may further include a second substrate 5a at the incident surface S1 of the optical layer 2 as necessary. In a case in which the optical body 1 includes the first substrate 4a and/or the second substrate 5a, it is preferable that the subsequently described optical characteristics such as transparency and transmitted light color are satisfied in a state in which the optical body 1 includes the first substrate 4a and/or the second substrate 5a.

The optical body 1 may further include an affixing layer 6 as necessary. The affixing layer 6 is formed at a surface that, among the incident surface S1 and the emission surface S2 of the optical body 1, is a surface that is to be affixed to a window material 10. In such a case, the optical body 1 is affixed to an indoor side or an outdoor side of the window material 10 (adherend) via the affixing layer 6. The affixing layer 6 may, for example, be a bonding layer having a bonding agent (for example, a UV-curable resin or a two-liquid mixture-type resin) as a main component or an adhesive layer having an adhesive (for example, a pressure sensitive adhesive (PSA)) as a main component. In a case in which the affixing layer 6 is an adhesive layer, the optical body 1 may further include a peelable layer 7 formed on the affixing layer 6. Through a configuration such as described above, the optical body 1 can easily be affixed to an adherend such as a window material 10, via the affixing layer 6, simply by peeling off the peelable layer 7.

The optical body 1 may further include a primer layer (not illustrated) between the second substrate 5a and the affixing layer 6 and/or the second optical transparent layer 5 in order to improve bonding between the second substrate 5a and the affixing layer 6 and/or the second optical transparent layer 5. Moreover, it is preferable that instead of the primer layer or in addition to the primer layer, commonly known physical pretreatment is performed in order to improve bonding at the same locations as mentioned above. Examples of the commonly known physical pretreatment include plasma treatment and corona treatment.

The optical body 1 may further include a barrier layer (not illustrated) on the incident surface S1 or emission surface S2 that is affixed to an adherend, such as a window material 10, or in between the surface and the wavelength-selective reflecting layer 3. The material of the barrier layer may, for example, be an inorganic oxide including at least one of alumina ($Al_2O_3$), silica ($SiO_x$), and zirconia or a resin material including at least one of polyvinylidene chloride (PVDC), polyvinyl fluoride resin, and partially hydrolyzed ethylene-vinyl acetate copolymer (EVOH). Moreover, the material of the barrier layer may, for example, be a dielectric material including at least one of SiN, ZnS—$SiO_2$, MN, $Al_2O_3$, a composite oxide of $SiO_2$—$Cr_2O_3$—$ZrO_2$ (SCZ), a composite oxide of $SiO_2$—$In_2O_3$—$ZrO_2$ (SIZ), $TiO_2$, and $Nb_2O_5$.

In a case in which the optical body 1 further includes a barrier layer at the incident surface S1 or the emission surface S2 as described above, the second optical transparent layer 5 or the first optical transparent layer 4 at which the barrier layer is formed preferably has the following relationship. Specifically, the water vapor permeability of the substrate 5a or the substrate 4a at which the barrier layer is formed is preferably lower than the water vapor permeability of the second optical transparent layer 5 or the first optical transparent layer 4. This is because diffusion of moisture to the wavelength-selective reflecting layer 3 from the incident surface S1 or the emission surface S2 of the optical body 1 can be further reduced. The inclusion of a barrier layer as described above can reduce diffusion of moisture to the wavelength-selective reflecting layer 3 from the incident surface S1 or the emission surface S2 and can inhibit degradation of metal or the like contained in the wavelength-selective reflecting layer 3. This can improve durability of the optical body 1.

The optical body 1 may further include a hard coat layer 8 from a viewpoint of providing the surface of the optical body 1 with scratch resistance or the like. The hard coat layer 8 is preferably formed at a surface that, among the incident surface S1 and the emission surface S2 of the optical body 1, is a surface at the opposite side of the optical body 1 to the surface that is to be affixed to an adherend such as a window material 10. The pencil hardness of the hard coat layer 8 is preferably 2H or higher, and more preferably 3H or higher from a viewpoint of scratch resistance. The hard coat layer 8 is obtained through application and curing of a resin composition. Examples of resin compositions that may be used include thermosetting resins based on organosilanes such as methyltriethoxysilane and phenyltriethoxysilane, thermosetting resins based on melamine such as etherified methylol melamine, and ultraviolet-curable resins based on polyfunctional acrylates such as polyol acrylate, polyester acrylate, urethane acrylate, and epoxy acrylate. The resin composition used in formation of the hard coat layer 8 may further contain additives such as light stabilizers, flame retardants, and antioxidants as necessary.

When a hard coat layer 8 is formed as described above, the optical body 1 can be provided with scratch resistance, which can inhibit the formation of scratches when the surface of the optical body 1 is touched by someone or cleaned in a situation in which the optical body 1 is affixed to an inner side of a window material 10, for example. Moreover, the formation of scratches can be inhibited in the same manner in a situation in which the optical body 1 is affixed to an outer side of a window material 10.

A layer having water repellency or hydrophilicity may be further included at the incident surface S1 or the emission surface S2 of the optical body 1 from a viewpoint of imparting antifouling performance or the like. A layer having a function such as described above may, for example, be formed as an independent antifouling layer that contains an antifouling agent or may be obtained through inclusion of an antifouling agent in any of various functional layers, such as the hard coat layer 8, to provide the functional layer with antifouling functionality. The antifouling agent may be selected as appropriate depending on the objective without any specific limitations and is preferably a silicone oligomer and/or a fluorine-containing oligomer having at least one (meth)acryl group, vinyl group, or epoxy group. The amount of silicone oligomer and/or fluorine-containing oligomer that is compounded is preferably at least 0.01 mass % and not more than 5 mass % of solid content. Compounding of less than 0.01 mass % tends to provide insufficient antifouling functionality. On the other hand, compounding of more than 5 mass % tends to reduce coating hardness. Preferable examples of antifouling agents that may be used include RS-602 and RS-751-K produced by DIC Corporation, CN4000 produced by Sartomer, OPTOOL DAC-HP produced by Daikin Industries, Ltd., X-22-164E produced by Shin-Etsu Chemical Co., Ltd., FM-7725 produced by Chisso Corporation, EBECRYL 350 produced by Daicel Cytec Co., Ltd., and TEGO Rad 2700 produced by Degussa. In a case in which the hard coat layer 8 is provided with antifouling functionality, for example, the pure water contact angle of the hard coat layer 8 provided with antifouling performance is preferably 70° or more, and more preferably 90° or more. Moreover, in a case in which an antifouling layer is formed independently on the hard coat layer 8, for example, a coupling agent layer (primer layer) is preferably further included between the hard coat layer 8 and the antifouling layer from a viewpoint of improving close adherence between the hard coat layer 8 and the antifouling layer.

The optical body 1 preferably has flexibility from a viewpoint of enabling easy affixing thereof to an adherend such as a window material 10. Accordingly, the optical body 1 is taken to be inclusive of a film or sheet having flexibility.

The optical body 1 preferably has transparency. The transparency is preferably such that transmitted image quality is within the range described further below. The refractive index difference between the first optical transparent layer 4 and the second optical transparent layer 5 is preferably 0.010 or less, more preferably 0.008 or less, and even more preferably 0.005 or less. When the refractive index difference is more than 0.010, a transmitted image tends be blurred. When the refractive index difference is more than 0.008 and not more than 0.010, there are no problems in daily life, though this is dependent on the external brightness. When the refractive index difference is more than 0.005 and not more than 0.008, outdoor views can be clearly seen, though a diffraction pattern is noticeable only for extremely bright objects such as illuminants. When the refractive index difference is 0.005 or less, a diffraction pattern is barely noticeable.

An optical layer that, among the first optical transparent layer 4 and the second optical transparent layer 5, is located at a side affixed to a window material 10 or the like may contain an adhesive as a main component. Through such a configuration, the optical body 1 can be affixed to a window material 10 or the like through the first optical transparent layer 4 or second optical transparent layer 5 having an adhesive as a main component. Note that the refractive index difference of the adhesive preferably satisfies any of the ranges set forth above in a configuration such as described above.

The first optical transparent layer 4 and the second optical transparent layer 5 preferably have the same optical characteristics such as refractive index. More specifically, it is preferable that the first optical transparent layer 4 and the second optical transparent layer 5 are made from the same material and that the material has transparency in the visible region. For example, the first optical transparent layer 4 and the second optical transparent layer 5 may be made from the same resin material. By forming the first optical transparent layer 4 and the second optical transparent layer 5 from the same material, transparency of visible light can be improved because the refractive index of the first optical transparent layer 4 and the refractive index of the second optical transparent layer 5 are equal. However, it is important to be aware that even when the same material is used as a starting point, the refractive indices of the finally produced layers may differ depending on the curing conditions and so forth in film formation. In contrast, in a situation in which the first optical transparent layer 4 and the second optical transparent layer 5 are made from different materials, refraction of light occurs with the wavelength-selective reflecting layer 3 as a boundary as a result of the refractive index of first optical transparent layer 4 and the refractive index of the second optical transparent layer 5 differing from one another, which tends to blur a transmitted image. In particular, a diffraction pattern is clearly noticeable when an object analogous to a point light source, such as a distant lamp, is observed. Note that an additive may be mixed into the first optical transparent layer 4 and/or the second optical transparent layer 5 to adjust the value of the refractive index.

The first optical transparent layer 4 and the second optical transparent layer 5 preferably have transparency in the visible region. Herein, the term "transparency" has two meanings: not absorbing light and not scattering light. Although the term transparent is generally used to refer to just the former of these definitions, the optical body 1 according to the first embodiment preferably has transparency according to both definitions. For example, retroreflectors that are currently is use are intended for visual confirmation of light reflected by road signs, clothes of night-workers, and so forth. Therefore, even if the retroreflector has light scattering ability, light reflected from the underlying reflector can be visually confirmed so long as the retroreflector is in close contact with the underlying reflector. This is the same principle by which an image can be visually confirmed even when the front surface of an image display device is subjected to antiglare treatment having scattering ability with the aim of providing antiglare performance. However, the optical body 1 according to the first embodiment transmits light that is not of specific directionally reflected wavelengths. Therefore, in order that transmitted light is observed when the optical body 1 that mainly transmits light of such transmitted wavelengths is adhered to a transmitting body, it is preferable that the optical body 1 does not scatter light. However, depending on the application, the second optical transparent layer 5 may be intentionally provided with scattering ability.

The optical body 1 is preferably used in a state in which it is affixed, via an adhesive or the like, to a rigid body such as a window material 10 that principally transmits light other than of the specific wavelengths that has been transmitted. The window material 10 may, for example, be a construction window material for a high-rise building, housing, or the like, or a window material for a vehicle. In a case in which the optical body 1 is adopted with respect to a construction window material, the optical body 1 is, in particular, preferably adopted with respect to a window material oriented in a direction in a range from east through south to west (for example, a direction from southeast to southwest). This is because heat rays can be more effectively reflected when the optical body 1 is adopted with respect to a window material 10 that is oriented in this manner. The optical body 1 is not limited to use with only single-layer window glass and may also be used with specialized glass such as multilayer glass. Moreover, the window material 10 is not limited to being made from glass and may alternatively be made from a polymer material that has transparency. The optical layer 2 preferably has transparency in the visible region. This is because in a situation in which the optical body 1 is affixed to a window material 10 such as window glass, visible light can be transmitted and lighting by sunlight can be ensured when the optical layer 2 has transparency in this manner. Moreover, the affixing surface is not limited to the inner surface of glass and may alternatively be the outer surface.

The optical body 1 may be used in combination with another heat ray-cutting film. For example, a light-absorbing coating may be provided at an interface between air and the optical body 1 (i.e., at the outermost surface of the optical body 1). Moreover, the optical body 1 may be used in combination with an ultraviolet-cutting layer, a surface reflection prevention layer, or the like. In a case in which the optical body 1 is used in combination with such functional layers, it is preferable that these functional layers are provided at an interface between the optical body 1 and air. However, in the case of an ultraviolet-cutting layer, it is necessary for the layer to be positioned at a side closer to the sun than the optical body 1. In particular, in a case in which the optical body 1 is to be affixed at the inside of an indoor window glass surface, the ultraviolet light cutting layer is, therefore, preferably provided between the window glass surface and the optical body 1. In such a situation, an ultraviolet absorber may be added in an affixing layer positioned between the window glass surface and the optical body 1.

Depending on the application of the optical body 1, the optical body 1 may be colored to impart a design. In a case in which such a design is imparted, at least one of the first optical transparent layer 4 and the second optical transparent layer 5 is preferably configured to principally absorb light of a specific wavelength band in the visible region to an extent that does not cause loss of transparency.

Figure 2:
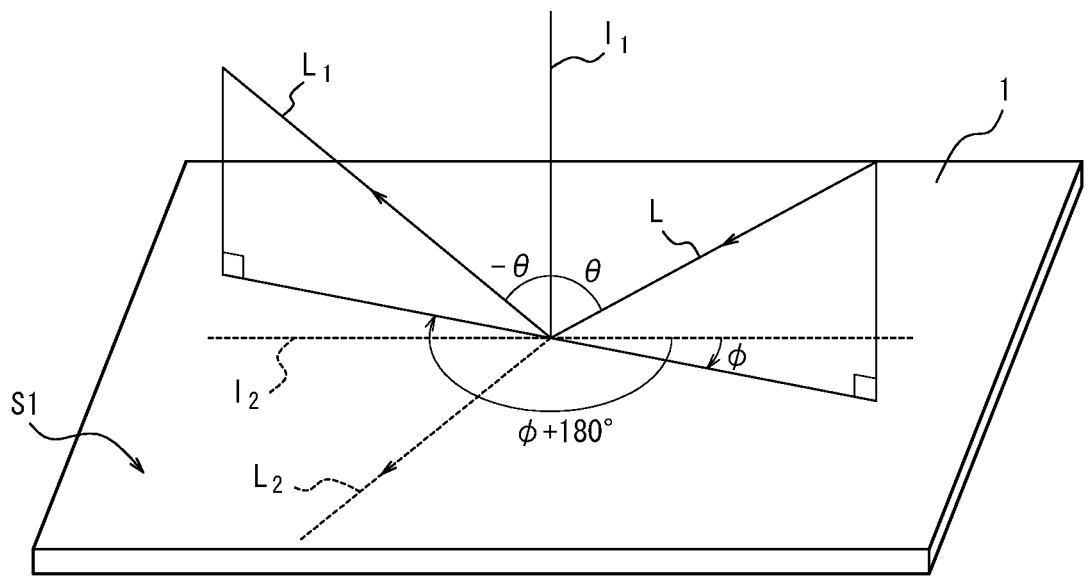
FIG. 2 is a perspective view illustrating a relationship between incident light that is incident on an optical body and reflected light that is reflected by the optical body.

FIG. 2 is a perspective view illustrating a relationship between incident light that is incident with respect to the optical body 1 and reflected light that is reflected by the optical body 1. The optical body 1 has an incident surface S1 at which light L is incident. It is preferable that, of incident light L that is incident on the incident surface S1 at an incident angle ($\theta$, $\phi$), the optical body 1 selectively directionally reflects light $L_1$ of a specific wavelength band in a direction other than a specular reflection direction ($-\theta$, $\phi+180°$) and transmits light $L_2$ that is not of the specific wavelength band. Moreover, the optical body 1 preferably has transparency with respect to light $L_2$ that is not of the specific wavelength band. The transparency is preferably such that transmitted image quality is within the range described further below. Note that in FIG. 2, $\theta$ is an angle between a perpendicular line $l_1$ relative to the incident surface S1 and the incident light L or reflected light $L_1$. On the other hand, $\phi$ is an angle between a specific straight line $l_2$ within the incident surface S1 and a component resulting from projection of the incident light L or reflected light $L_1$ on the incident surface S1.

Figure 3A:
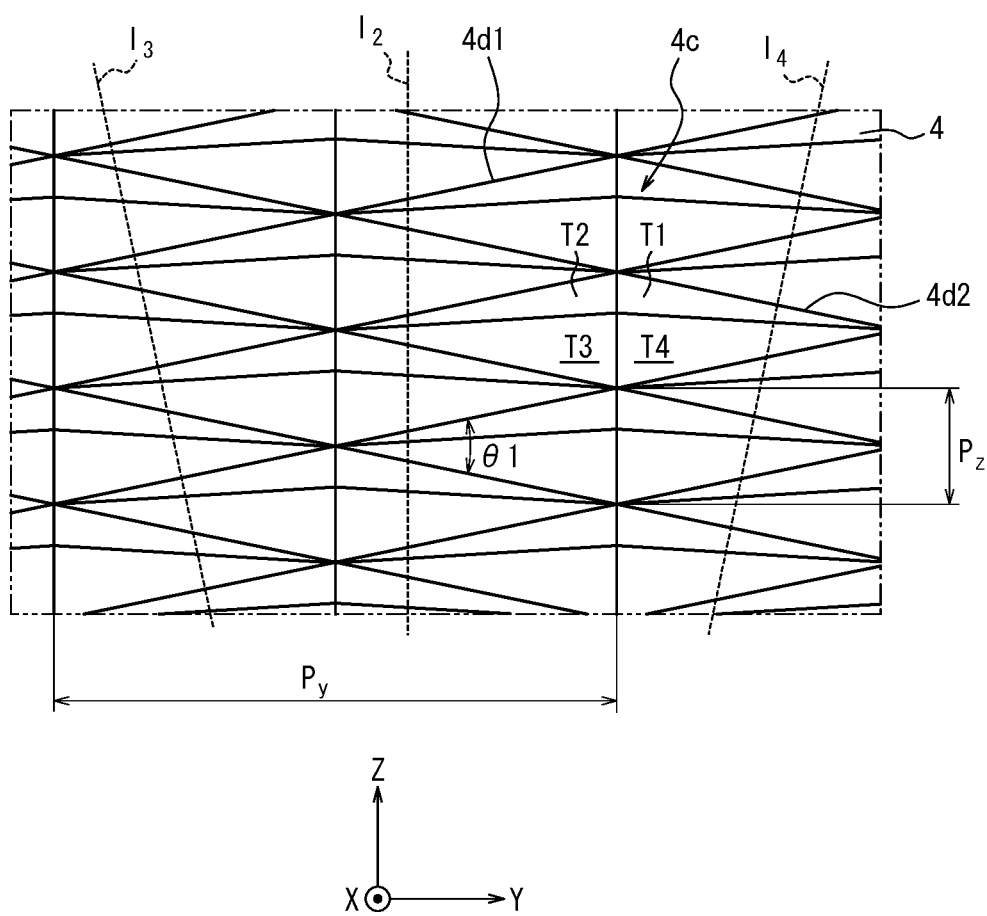
FIG. 3A is a plan view illustrating an example of shape of quadrangular pyramid-shaped depressions formed in a first optical transparent layer.

The specific straight line $l_2$ within the incident surface S1 is an axis that maximizes reflection intensity to the same quadrant as incident light when the incident angle ($\theta$, $\phi$) is fixed and the optical body 1 is rotated about the perpendicular line $l_1$ relative to the incident surface S1 of the optical body 1 as an axis (refer to FIG. 3A). However, in a case in which there is more than one axis (direction) for which reflection intensity is maximized, one of the axes is selected as the straight line $l_2$. In the present specification, the same quadrant as incident light refers to the incident light side when a plane including the perpendicular line $l_1$ and a straight line in the incident surface S1 that intersects the specific straight line $l_2$ is taken as a boundary. The same quadrant as incident light may preferably be taken as the incident light side when a plane with respect to which the specific straight line $l_2$ is a perpendicular line (i.e., a plane orthogonal to the specific straight line $l_2$) is taken as a boundary. With regard to polarity of $\theta$, an angle $\theta$ rotated clockwise with the perpendicular line $l_1$ as a reference is taken to be "+$\theta$" and an angle $\theta$ rotated counterclockwise with the perpendicular line $l_1$ as a reference is taken to be "−$\theta$". Moreover, with regard to polarity of $\phi$, an angle $\phi$ rotated clockwise with the straight line $l_2$ as a reference is taken to be "+$\phi$" and an angle $\phi$ rotated counterclockwise with the straight line $l_2$ as a reference is taken to be "−$\phi$".

The light of the specific wavelength band that is selectively directionally reflected and the specific light that is transmitted differ depending on the application of the optical body 1. For example, in a case in which the optical body 1 is adopted with respect to a window material 10, the light of the specific wavelength band that is selectively directionally reflected is preferably near infrared light and the light of the specific wavelength band that is transmitted is preferably visible light. Specifically, the light of the specific wavelength band that is selectively directionally reflected is preferably near infrared light principally of a wavelength band from 780 nm to 2100 nm. Through reflection of near infrared light, a rise of temperature inside a building can be inhibited when the optical body 1 is affixed to a window material such as a glass window. Consequently, the cooling load can be reduced and energy efficiency can be improved. The term "directional reflection" implies that light is reflected in a specific direction other than a specular reflection direction and that the intensity of reflected light is sufficiently stronger than light that is diffusely reflected without directivity. Moreover, the term "reflects" implies that reflectance in a specific wavelength band, such as the near infrared region, is preferably 30% or more, more preferably 50% or more, and even more preferably 80% or more. The term "transmits" implies that transmittance in a specific wavelength band, such as the visible light region, is preferably 30% or more, more preferably 50% or more, and even more preferably 70% or more.

In the optical body 1, the direction of directional reflection should be the same quadrant as incident light. This is because in a situation in which the optical body 1 is affixed to a window material 10, light of a specific wavelength band among incident light from the sky above buildings standing at roughly the same height can be efficiently returned toward the sky above other buildings when the direction of directional reflection is as described above. Since sensing of infrared light from a specific direction in the same manner as an infrared sensor or as in infrared imaging is not required in the case of the optical body 1, it is not necessary for the direction of retroreflection to be strictly the same as the direction of incidence.

In the optical body 1 according to the present embodiment, the depression-protrusion surface of the first optical transparent layer 4 is formed by quadrangular pyramid-shaped depressions having ridges that rhombically intersect as described further below. As a consequence, with respect to incident light that is incident on the incident surface S1 from different φ directions at an incident angle θ=60°, the average reflection angle of reflected light to the same quadrant as the incident light is 30° or more. Therefore, in a situation in which the optical body 1 is affixed to a window material 10, light of a specific wavelength band among light incident from the sky can be efficiently reflected toward the sky in the same quadrant as the incident light. This can reduce the effect on surrounding buildings and suppress the heat island effect. The heat island effect generally tends to be promoted when the elevation angle (altitude) of the sun is 60° or more. The optical body 1 according to the present embodiment can suppress the heat island effect because with respect to incident light from different φ directions at an incident angle θ=60° at which the heat island effect starts, the average reflection angle of light of a specific wavelength band to the same quadrant as the incident light is 30° or more. Note that in a situation in which surrounding high buildings are present, for example, there is a higher probability of reflected light being incident on the surrounding high buildings and a higher probability of the heat island effect being exacerbated if the average reflection angle is less than 30°.

With regard to transmitted image clarity in a wavelength band for which the optical body 1 has transmissivity, a value measured using a 0.5 mm optical comb is preferably 50 or more, more preferably 60 or more, and even more preferably 75 or more. When transmitted image clarity has a value of less than 50, a transmitted image tends to appear blurred. When transmitted image clarity has a value of at least 50 and less than 60, there are no problems in daily life, though this is dependent on the external brightness. When transmitted image clarity has a value of at least 60 and less than 75, outdoor views can be clearly seen, though a diffraction pattern is noticeable only for extremely bright objects such as illuminants. When transmitted image clarity has a value of 75 or more, a diffraction pattern is barely noticeable. Moreover, the total value of values for transmitted image clarity measured using 0.125 mm, 0.5 mm, 1.0 mm, and 2.0 mm optical combs is preferably 230 or more, more preferably 270 or more, and even more preferably 350 or more. When transmitted image clarity has a total value of less than 230, a transmitted image tends to appear blurred. When transmitted image clarity has a total value of at least 230 and less than 270, there are no problems in daily life, though this is dependent on the external brightness. When transmitted image clarity has a total value of at least 270 and less than 350, outdoor views can be clearly seen, though a diffraction pattern is noticeable only for extremely bright objects such as illuminants. When transmitted image clarity has a value of 350 or more, a diffraction pattern is barely noticeable. The value of transmitted image clarity is taken to be a value measured in accordance with JIS K7105 using an ICM-1T produced by Suga Test Instruments Co., Ltd. However, in a case in which wavelengths that are be transmitted differ from wavelengths of a D65 illuminant, it is preferable that measurement is performed after calibration using a filter for the wavelengths that are to be transmitted.

Haze with respect to a wavelength band for which the optical body 1 has transmissivity may be selected as appropriate depending on the objective without any specific limitations and is preferably 6% or less, more preferably 4% or less, and even more preferably 2% or less. If haze exceeds 6%, transmitted light is scattered, resulting in a cloudy appearance. Herein, haze is taken to be a value measured by a measurement method defined in JIS K7136 using an HM-150 produced by Murakami Color Research Laboratory Co., Ltd. However, in a case in which wavelengths that are be transmitted differ from wavelengths of a D65 illuminant, it is preferable that measurement is performed after calibration using a filter for the wavelengths that are to be transmitted.

The incident surface S1 of the optical body 1 has smoothness of a level such that transmitted image clarity is not reduced, and preferably both the incident surface S1 and the emission surface S2 have such smoothness. Specifically, the arithmetic mean roughness Ra of the incident surface S1 and the emission surface S2 is preferably 0.08 μm or less, more preferably 0.06 μm or less, and even more preferably 0.04 μm or less. The arithmetic mean roughness Ra is calculated as a roughness parameter by measuring surface roughness of the incident surface and obtaining a roughness curve from two-dimensional cross-section curve. The measurement conditions are in accordance with JIS B0601:2001. The measurement apparatus and conditions are indicated below.

Measurement apparatus: Fully Automatic Microfigure Measuring Instrument SURFCORDER ET4000A (produced by Kosaka Laboratory Ltd.)

λc=0.8 mm; evaluation length: 4 mm; cut-off: ×5

Data sampling interval: 0.5 μm

The transmitted light color of the optical body 1 is preferably as close as possible to neutral and even if there is coloring, the transmitted light color is preferably a pale tone of blue, blue-green, green, or the like that gives an impression of coolness. From a viewpoint of obtaining a color tone such as described above, the chromaticity coordinates x and y of transmitted light that is incident from the incident surface S1, passes through the optical layer 2 and the wavelength-selective reflecting layer 3, and is emitted from the emission surface S2 and reflected light preferably satisfy $0.20<x<0.35$ and $0.20<y<0.40$, more preferably satisfy $0.25<x<0.32$ and $0.25<y<0.37$, and even more preferably satisfy $0.30<x<0.32$ and $0.30<y<0.35$ when irradiation is performed with a D65 illuminant, for example. Moreover, it is preferable that a relationship $y>x-0.02$ is satisfied, and more preferable that a relationship $y>x$ is satisfied from a viewpoint of avoiding reddening of the color tone. Furthermore, change in the reflected color tone depending on the incident angle is undesirable because in a situation in which the optical body 1 is adopted for a building window, for example, the color tone differs depending on the location and the color appears to change while walking. In order to inhibit such change in color tone, the absolute value of a difference of the chromaticity coordinate x and the absolute value of a difference of the chromaticity coordinate y of specularly reflected light that is incident from the incident surface S1 or the emission surface S2 at an incident angle θ of at least 5° and not more than 60° and is reflected by the optical body 1 may be selected as appropriate depending on the objective for both principal surfaces of the optical body 1 without any specific limitations. For example, these absolute values are preferably 0.05 or less, more preferably 0.03 or less, and even more preferably 0.01 or less. The limitations on numerical ranges for the chromaticity coordinates x and y of such reflected light are preferably satisfied for both the incident surface S1 and the emission surface S2.

In order to inhibit color change in proximity to specular reflection, it is preferable that a flat surface having an inclination angle of 5° or less is not included and more preferable that a flat surface having an inclination angle of 10° or less is not included. Moreover, in a case in which the wavelength-selective reflecting layer 3 is covered with a resin, change in color tone in proximity to specularly reflected light can be inhibited over a wider incident angle range because incident light is refracted upon entering the resin from air. In addition, in a case in which reflection color other than specular reflection color is problematic, it is preferable that the optical body 1 is positioned such that directional reflection does not occur in the direction that is problematic.

The following describes the first optical transparent layer 4, the second optical transparent layer 5, and the wavelength-selective reflecting layer 3 of the optical body 1 in order.

(First Optical Transparent Layer and Second Optical Transparent Layer)

The first optical transparent layer 4 is a layer that, for example, supports and protects the wavelength-selective reflecting layer 3. The first optical transparent layer 4 is, for example, composed by a layer having a resin as a main component from a viewpoint of providing the optical body 1 with flexibility. One of the principal surfaces of the first optical transparent layer 4 is a smooth surface, for example, and the other of the principal surfaces of the first optical transparent layer 4 is a depression-protrusion surface (first surface), for example. The wavelength-selective reflecting layer 3 is formed on the depression-protrusion surface.

The second optical transparent layer 5 is a layer that protects the wavelength-selective reflecting layer 3 by embedding the first surface (depression-protrusion surface) of the first optical transparent layer 4 at which the wavelength-selective reflecting layer 3 is formed. The second optical transparent layer 5 is, for example, composed by a layer having a resin as a main component from a viewpoint of providing the optical body 1 with flexibility. One of the principal surfaces of the second optical transparent layer 5 is a smooth surface, for example, and the other of the principal surfaces of the second optical transparent layer 5 is a depression-protrusion surface (second surface), for example. The depression-protrusion surface of the first optical transparent layer 4 and the depression-protrusion surface of the second optical transparent layer 5 are related in terms that the depressions and protrusions thereof are inverted relative to one another.

The depression-protrusion surface of the first optical transparent layer 4 is formed by a maximally packed two-dimensional array of quadrangular pyramid-shaped depressions 4c having ridges that rhombically intersect. The depression-protrusion surface of the second optical transparent layer 5 is formed by a two-dimensional array of quadrangular pyramid-shaped protrusions 5c having ridges that rhombically intersect. Since the quadrangular pyramid-shaped depressions 4c of the first optical transparent layer 4 and the quadrangular pyramid-shaped protrusions 5c of the second optical transparent layer 5 only differ in terms that the depressions and protrusions are inverted, the following description focuses on the quadrangular pyramid-shaped depressions 4c of the first optical transparent layer 4.

Figure 3B:
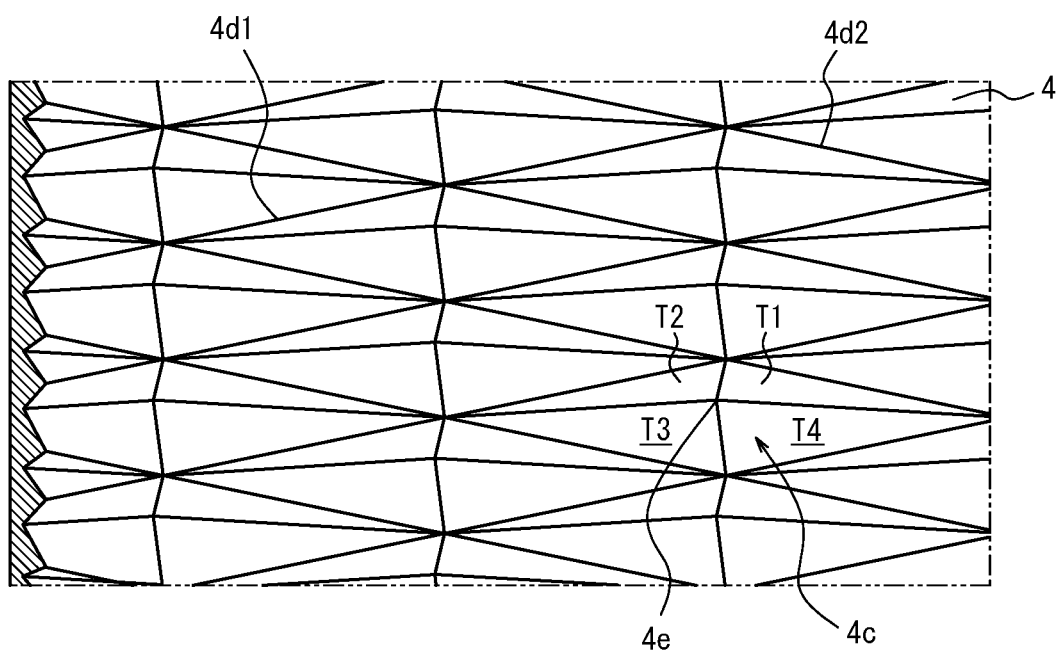
FIG. 3B is a perspective view illustrating the example of shape of quadrangular pyramid-shaped depressions illustrated in FIG. 3A.
Figure 3C:
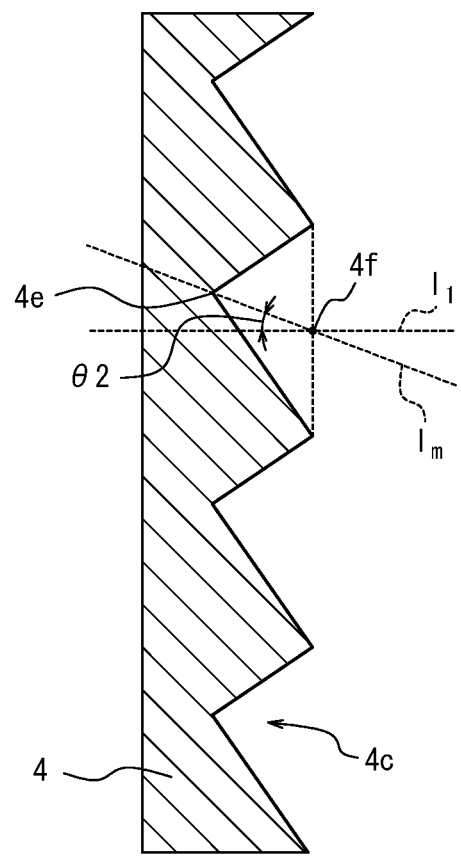
FIG. 3C is an enlarged cross-sectional view illustrating the first optical transparent layer illustrated in FIG. 3A.

FIG. 3A is a plan view illustrating an example of shape of the quadrangular pyramid-shaped depressions 4c formed in the first optical transparent layer 4. FIG. 3B is a perspective view illustrating the example of shape of the quadrangular pyramid-shaped depressions 4c illustrated in FIG. 3A. FIG. 3C is an enlarged cross-sectional view of the first optical transparent layer 4 in which the quadrangular pyramid-shaped depressions 4c illustrated in FIG. 3A are formed. As illustrated in FIGS. 3A and 3B, the quadrangular pyramid-shaped depressions 4c are formed in a maximally packed two-dimensional array by ridges 4d1 arranged in parallel to one another along a first direction straight line $l_3$ (illustrated as a dashed line) and ridges 4d2 arranged in parallel to one another along a second direction straight line $l_4$ (illustrated as a dashed line) that intersects the straight line 13. Each of the quadrangular pyramid-shaped depressions 4c has a first inclined surface T1, a second inclined surface T2, a third inclined surface T3, and a fourth inclined surface T4 that form a quadrangular pyramid surface and a rhombic open surface. The ridges 4d1 are formed by the second inclined surface T2 and the fourth inclined surface T4 of adjacent quadrangular pyramid-shaped depressions 4c. In the same manner, the ridges 4d2 are formed by the first inclined surface T1 and the third inclined surface T3 of adjacent quadrangular pyramid-shaped depressions 4c.

The angle between the straight line $l_3$ and the straight line $l_4$, which is in other words the intersection angle (interior angle) θ1 of the ridges 4d1 and the ridges 4d2, is not specifically limited so long as the ridges 4d1 and the ridges 4d2 form rhombic shapes. However, in a case in which the quadrangular pyramid-shaped depressions 4c are formed by a transfer method using a mold as described further below, it is preferable that 25°≤θ1≤120° from a viewpoint of mold production. The shape of the wavelength-selective reflecting layer 3 is the same as the surface shape of the quadrangular pyramid-shaped depressions 4c as a consequence of the wavelength-selective reflecting layer 3 being formed on the quadrangular pyramid-shaped depressions 4c. An apex angle η1 of the ridges 4d1 and an apex angle η2 of the ridges 4d2 (i.e., an angle between the second inclined surface T2 and the fourth inclined surface T4 of adjacent quadrangular pyramid-shaped depressions 4c and the angle between the first inclined surface T1 and the third inclined surface T3 of adjacent quadrangular pyramid-shaped depressions 4c) may be set as 60°≤η1 (η2)≤120° in view of mold production and satisfying preceding equation (1). The ridges 4d1 and the ridges 4d2 may have a pointed shape, inclusive of processing error, or may have a curved shape that is a spherical or aspherical shape. In a case in which the ridges 4d1 and the ridges 4d2 are formed with a curved shape that is a spherical or aspherical shape, the apex angle η is taken to be the opening angle of sides at parts preceding the curved part.

In FIG. 3A, a three-dimensional Cartesian coordinate system is defined in which one direction of the two-dimensional arrangement directions of the quadrangular pyramid-shaped depressions 4c is taken to be the Z direction, the other of the two-dimensional arrangement directions is taken to be the Y direction, and a direction orthogonal to the Z direction and the Y direction is taken to be the X direction. Note that in FIG. 3A, one diagonal of the rhombic open surface corresponds to the Z direction and the other diagonal of the rhombic open surface corresponds to the Y direction. The Y direction pitch $P_y$ and the Z direction pitch $P_z$ of the quadrangular pyramid-shaped depressions 4c in FIG. 3A are preferably at least 5 μm and not more than 5 mm, more preferably at least 5 μm and less than 250 μm, and even more preferably at least 20 μm and not more than 200 μm. If the pitch $P_y$ and the pitch $P_z$ are less than 5 μm, it is difficult to set the shape of the quadrangular pyramid-shaped depressions 4c as desired and it is normally difficult to provide the wavelength-selective reflecting layer 3 with a sharp wavelength selection characteristic, which may result in reflection of some light of wavelengths that are to be transmitted. When such reflection occurs, diffraction arises and higher-order reflection is visible, and thus transparency tends to feel poor. On the other hand, if the pitch $P_y$ and the pitch $P_z$ exceed 5 mm, the required film thickness when the shape of the quadrangular pyramid-shaped depressions 4c required for directional reflection is considered increases and flexibility is lost, which makes it difficult to affix the optical body 1 to a rigid body such as a window material 10. Moreover, setting the pitch $P_y$ and the pitch $P_z$ as less than 250 μm further increases flexibility, facilitates roll-to-roll production, and eliminates the need for batch production. Roll-to-roll production is more appropriate than batch production because the optical body 1 is required to have a length on the order of meters when the optical body 1 is to be adopted for a building material such as a window. Setting the pitch $P_y$ and the pitch $P_z$ as at least 20 μm and not more than 200 μm further improves productivity.

FIG. 3C illustrates an enlarged cross-sectional view along the Z direction diagonal of the quadrangular pyramid-shaped depressions 4c. The quadrangular pyramid-shaped depressions 4c may each be asymmetric in relation to a perpendicular line $l_1$ that passes through a center of mass 4f of the rhombic open surface of the depression 4c. In such a situation, a principal axis $l_m$ of the quadrangular pyramid-shaped depression 4c is inclined by an angle θ2 relative to the perpendicular line $l_1$. Hereinafter, the angle θ2 is also referred to as the inclination angle θ2. The term "principal axis $l_m$" as used herein refers to a straight line that passes through a lowermost point 4e of the quadrangular pyramid-shaped depression 4c and the center of mass 4f of the rhombic open surface. In a situation in which the optical body 1 is affixed to a window material 10 positioned roughly perpendicular to the ground, the direction of the inclination angle θ2 is preferably toward an upper side (sky side) of the window material 10. FIG. 3C illustrates an example in which the principal axis $l_m$ of a quadrangular pyramid-shaped depression 4c is inclined in the Z(+) direction. Consequently, when the area of the first inclined surface T1 of the quadrangular pyramid-shaped depression 4c is taken to be S1, the area of the second inclined surface T2 of the quadrangular pyramid-shaped depression 4c is taken to be S2, the area of the third inclined surface T3 of the quadrangular pyramid-shaped depression 4c is taken to be S3, and the area of the fourth inclined surface T4 of the quadrangular pyramid-shaped depression 4c is taken to be S4, S1 (=S2)<S3 (=S4) in the situation described above as illustrated in FIG. 3A. In the present embodiment, the specific straight line $l_2$ is defined as a Z direction straight line (illustrated as a dashed line) that is parallel to one diagonal of the rhombic open surface as illustrated in FIG. 3A.

When the quadrangular pyramid-shaped depressions 4c are inclined upward as described above, incident light that, for example, is incident from above at an incident angle of 60° is, depending on the direction of incidence (azimuth), mostly incident on the third inclined surface T3 and/or the fourth inclined surface T4 that each have a large area. Most light of the specific wavelength band among incident light that is incident on the third inclined surface T3 is reflected to the same quadrant as the incident light through reflection once by the third inclined surface T3. In the same manner, most light of the specific wavelength band among incident light that is incident on the fourth inclined surface T4 is reflected to the same quadrant as the incident light through reflection once by the fourth inclined surface T4.

In the optical body 1 according to the present embodiment, the intersection angle θ1 of the ridges 4d1 and the ridges 4d2 and the inclination angle θ2 of the principal axis $l_m$ relative to the perpendicular line $l_1$ described above preferably satisfy the following equations (1) or (2).

$$25 \leq \theta1 \leq 45° \text{ and } \theta2 \leq 15° \quad (1)$$

$$90° \leq \theta1 \leq 120° \text{ and } \theta2 \leq 10° \quad (2)$$

In a case in which the intersection angle θ1 satisfies 25°≤θ1≤45° (i.e., in a case in which the rhombic open surface of each of the quadrangular pyramid-shaped depressions 4c is elongated in the Y direction), the average reflection angle of light of the specific wavelength band to the same quadrant with respect to incident light that is incident at an incident angle of 60° does not reach 30° if θ2>15° as in Comparative Example 6 described further below. In the same manner, in a case in which the intersection angle θ1 satisfies 90°≤θ1≤120° (i.e., in a case in which the rhombic open surface of each of the quadrangular pyramid-shaped depressions 4c is elongated from a square shape in the Z direction), the average reflection angle of light of the specific wavelength band to the same quadrant with respect to incident light that is incident at an incident angle of 60° does not reach 30° if θ2>10° as in Comparative Examples 2 and 5 described further below. Therefore, if surrounding high buildings are present, for example, there is a higher probability of reflected light being incident on the surrounding high buildings and a higher probability of the heat island effect being exacerbated as previously explained in these cases.

The first optical transparent layer 4 preferably contains, as a main component, a resin exhibiting a small reduction in storage modulus at 100° C. and not having a significant difference in storage modulus between 25° C. and 100° C. Specifically, the first optical transparent layer 4 preferably contains a resin having a storage modulus of $3 \times 10^9$ Pa or less at 25° C. and having a storage modulus of $3 \times 10^7$ Pa or more at 100° C. Although the first optical transparent layer 4 is preferably composed of one type of resin, the first optical transparent layer 4 may contain two or more types of resins. Moreover, additives may be mixed into the first optical transparent layer 4 as necessary.

When the first optical transparent layer 4 contains a resin exhibiting a small reduction in storage modulus at 100° C. and not having a significant difference in storage modulus between 25° C. and 100° C. as a main component as described above, the designed interface shape can be substantially maintained even when a process that is accompanied by heat or heat and pressure is carried out after formation of the depression-protrusion surface (first surface) of the first optical transparent layer 4. In contrast, if the first optical transparent layer 4 contains a resin exhibiting a large reduction in storage modulus at 100° C. and having a significant difference in storage modulus between 25° C. and 100° C. as a main component, deformation from the designed interface shape increases and curling of the optical body 1 occurs.

Note that processes accompanied by heat are not limited to processes such as annealing in which heat is directly applied to the optical body 1 or a component thereof and are also inclusive of processes in which heat is indirectly applied. For example, such processes are inclusive of a process in which the temperature at the surface of a formed film is locally raised and heat is indirectly applied to the film surface during formation of a thin film and curing of a resin composition, for example, and a process in which the temperature of a mold is raised through energy ray irradiation and heat is indirectly applied to the optical body. Moreover, the effect obtained by limiting the storage modulus to the numerical ranges set forth above is not specifically limited by the type of resin and can be similarly obtained using any of a thermoplastic resin, a thermosetting resin, and an energy ray irradiation resin.

The storage modulus of the first optical transparent layer 4 can be confirmed as follows, for example. In a case in which the surface of the first optical transparent layer 4 is exposed, the storage modulus of the exposed surface can be confirmed through measurement using a micro-hardness meter. On the other hand, in a case in which a first substrate 4a or the like is formed on the surface of the first optical transparent layer 4, the first substrate 4a or the like may be peeled off to expose the surface of the first optical transparent layer 4 and then the storage modulus of the exposed surface may be confirmed through measurement using a micro-hardness meter.

The method by which reduction of the elastic modulus at high temperature is inhibited may, for example, be a method of adjusting the length and type of side chains or the like in the case of a thermoplastic resin and may be a method of adjusting the number of crosslinking sites, the molecular structure of crosslinking material, and the like in the case of a thermosetting resin or an energy ray irradiation resin. However, characteristics demanded of the resin material itself are preferably not lost through such structural modification. For example, it is preferable that the type of crosslinking agent is selected as appropriate in accordance with the desired characteristics because, depending on the type of crosslinking agent, the elastic modulus at around room temperature may increase to the extent that embrittlement occurs, and film curving and curling may occur due to increased shrinkage.

In a case in which the first optical transparent layer 4 contains a crystalline polymer material as a main component, it is preferable that the first optical layer 4 contains, as a main component, a resin having a glass transition point that is higher than a maximum temperature in a production process and exhibiting a small reduction in storage modulus at the maximum temperature in the production process. In contrast, if a resin that has a glass transition point within a range of from room temperature (25° C.) to the maximum temperature in the production process and that exhibits a large reduction in storage modulus at the maximum temperature in the production process is used, it is difficult to maintain the designed ideal interface shape in the production process.

In a case in which the first optical transparent layer 4 contains an amorphous polymer material as a main component, it is preferable that the first optical transparent layer 4 contains, as a main component, a resin having a melting point that is higher than the maximum temperature in the production process and exhibiting a small reduction in storage modulus at the maximum temperature in the production process. In contrast, if a resin that has a melting point within a range of from room temperature (25° C.) to the maximum temperature in the production process and that exhibits a large reduction in storage modulus at the maximum temperature in the production process is used, it is difficult to maintain the designed ideal interface shape in the production process.

The phrase "maximum temperature in the production process" refers to the maximum temperature of the depression-protrusion surface (first surface) of the first optical transparent layer 4 in the production process. The second optical transparent layer 5 preferably also satisfies the numerical range for storage modulus and temperature range for glass transition point set forth above.

In other words, it is preferable that at least one of the first optical transparent layer 4 and the second optical transparent layer 5 contains a resin having a storage modulus of $3 \times 10^9$ Pa or less at 25° C. This is because the optical body 1 can be provided with flexibility at room temperature (25° C.), which enables roll-to-roll production of the optical body 1.

The first substrate 4a and the second substrate 5a have transparency, for example. Although no specific limitations are placed on the substrate form, a substrate in the form of a film is preferable from a viewpoint of providing the optical body 1 with flexibility. The material of the first substrate 4a and the second substrate 5a may be a commonly known polymer material, for example. Examples of commonly known polymer materials that may be used include, but are not specifically limited to, triacetyl cellulose (TAC), polyester (TPEE), polyethylene terephthalate (PET), polyimide (PI), polyamide (PA), aramid, polyethylene (PE), polyacrylate, polyethersulfone, polysulfone, polypropylene (PP), diacetyl cellulose, polyvinyl chloride, acrylic resin (PMMA), polycarbonate (PC), epoxy resin, urea resin, urethane resin, and melamine resin. The thickness of the first substrate 4a and the second substrate 5a is preferably 38 μm to 100 μm from a viewpoint of productivity but is not specifically limited to this range. The first substrate 4a and the second substrate 5a are preferably transmissive to energy rays. This enables curing of an energy ray-curable resin interposed between the first substrate 4a and the wavelength-selective reflecting layer 3 or between the second substrate 5a and the wavelength-selective reflecting layer 3 through irradiation with energy rays from the first substrate 4a side or the second substrate 5a side as subsequently described.

The first optical transparent layer 4 and the second optical transparent layer 5 have transparency, for example. The first optical transparent layer 4 and the second optical transparent layer 5 may be obtained, for example, through curing of a resin composition. From a viewpoint of ease of production, it is preferable that an energy ray-curable resin that is curable by light, an electron beam, or the like, or a thermosetting resin that is curable by heat is used as the resin composition. The energy ray-curable resin is preferably a photosensitive resin composition that is curable by light, and is most preferably an ultraviolet-curable resin composition that is curable by ultraviolet light. The resin composition preferably further contains a phosphoric acid-containing compound, a succinic acid-containing compound, and/or a butyrolactone-containing compound from a viewpoint of improving close adherence of the first optical transparent layer 4 and the wavelength-selective reflecting layer 3 or of the second optical transparent layer 5 and the wavelength-selective reflecting layer 3. The phosphoric acid-containing compound may, for example, be a phosphoric acid-containing (meth)acrylate, and is preferably a (meth)acrylic monomer or oligomer that has phosphoric acid in a functional group. The succinic acid-containing compound may, for example, be a succinic acid-containing (meth)acrylate, and is preferably a (meth)acrylic monomer or oligomer that has succinic acid in a functional group. The butyrolactone-containing compound may, for example, be a (meth)acrylate that contains butyrolactone, and is preferably a (meth)acrylic monomer or oligomer that has butyrolactone in a functional group.

The ultraviolet-curable resin composition contains a (meth)acrylate and a photopolymerization initiator, for example. Moreover, the ultraviolet-curable resin composition may further contain a light stabilizer, a flame retardant, a leveling agent, an antioxidant, or the like as necessary.

The acrylate is preferably a monomer and/or oligomer that has at least two (meth)acryloyl groups. Examples of the monomer and/or oligomer include urethane (meth)acrylate, epoxy (meth)acrylate, polyester (meth)acrylate, polyol (meth)acrylate, polyether (meth)acrylate, and melamine (meth)acrylate. The term "(meth)acryloyl group" as used herein refers to an acryloyl group or a methacryloyl group. Also, the term "oligomer" as used herein refers to a molecule having a molecular weight of at least 500 and not more than 60,000.

The photopolymerization initiator may be selected as appropriate from commonly known materials. Examples of commonly known materials that may be used include benzophenone derivatives, acetophenone derivatives, anthraquinone derivatives, and the like used individually or in combination. The amount of the polymerization initiator that is compounded is preferably at least 0.1 mass % and not more than 10 mass % among solid content. If the amount is less than 0.1 mass %, photocuring ability is reduced to such an extent as to be practically unsuitable for industrial production. On the other hand, if the amount exceeds 10 mass %, an odor tends to remain in a coating when the photoirradiation dose is small. The term "solid content" as used herein refers to all components forming a hard coat layer 12 after curing. Specifically, the solid content includes the acrylate, the photopolymerization initiator, and so forth, for example.

The resin preferably enables transfer of a structure through energy ray irradiation, heat, or the like, and may be any type of resin, such as a vinyl resin, an epoxy resin, or a thermoplastic resin, so long as the requirements in terms of refractive index set forth above are met.

An oligomer may be added in order to reduce cure shrinkage. Moreover, the resin may contain a polyisocyanate or the like as a curing agent. In consideration of close adherence of the first optical transparent layer 4 and the second optical transparent layer 5, monomers having a hydroxy group, carboxyl group, or phosphate group, polyhydric alcohols, carboxylic acids, coupling agents such as silanes, aluminum, and titanium, various chelating agents, and so forth may be added.

The resin composition preferably further contains a crosslinking agent. Cyclic crosslinking agents are particularly preferable as the crosslinking agent. This is because the resin can be made heat resistant without significantly changing the storage modulus at room temperature through use of a crosslinking agent. If the storage modulus at room temperature significantly changes, the optical body 1 becomes brittle and is difficult to produce by a roll-to-roll process or the like. Examples of cyclic crosslinking agents that may be used include dioxane glycol diacrylate, tricyclodecane dimethanol diacrylate, tricyclodecane dimethanol dimethacrylate, ethylene oxide-modified isocyanurate diacrylate, ethylene oxide-modified isocyanurate triacrylate, and caprolactone-modified tris(acryloxyethyl) isocyanurate.

The first substrate 4a or the second substrate 5a preferably has lower water vapor permeability than the first optical transparent layer 4 or the second optical transparent layer 5. For example, in a case in which the first optical transparent layer 4 is formed from an energy ray-curable resin such as urethane acrylate, the first substrate 4a is preferably formed from a resin such as polyethylene terephthalate (PET) that has lower water vapor permeability than the first optical transparent layer 4 and is transmissive to energy rays. As a result, diffusion of moisture to the wavelength-selective reflecting layer 3 from the incident surface S1 or the emission surface S2 can be reduced, and degradation of metal or the like contained in the wavelength-selective reflecting layer 3 can be inhibited. Consequently, durability of the optical body 1 can be improved. The water vapor permeability of PET of 75 μm in thickness is roughly 10 g/m$^2$/day (40° C., 90% RH).

It is preferable that at least one of the first optical transparent layer 4 and the second optical transparent layer 5 includes a highly polar functional group and that the content thereof differs between the first optical transparent layer 4 and the second optical transparent layer 5. Moreover, it is preferable that both the first optical transparent layer 4 and the second optical transparent layer 5 contain a phosphoric acid compound (for example, a phosphoric acid ester) and that the content of the phosphoric acid compound differs between the first optical transparent layer 4 and the second optical transparent layer 5. The content of the phosphoric acid compound preferably differs between the first optical transparent layer 4 and the second optical transparent layer 5 by a factor or 2 or more, more preferably by a factor of 5 or more, and even more preferably by a factor of 10 or more.

In a case in which at least one of the first optical transparent layer 4 and the second optical transparent layer 5 contains a phosphoric acid compound, the wavelength-selective reflecting layer 3 preferably contains an oxide, a nitride, or an oxynitride at a surface that is in contact with the first optical transparent layer 4 or second optical transparent layer 5 containing the phosphoric acid compound. It is particularly preferable that the wavelength-selective reflecting layer 3 includes a layer containing zinc oxide (ZnO) or niobium oxide at the surface that is in contact with the first optical transparent layer 4 or second optical transparent layer 5 containing the phosphoric acid compound. This is in order to improve close adherence between these optical layers and the wavelength-selective reflecting layer 3. Moreover, this has a high corrosion prevention effect when the wavelength-selective reflecting layer 3 contains a metal such as Ag. The wavelength-selective reflecting layer 3 may contain a dopant such as Al or Ga. This is because inclusion of a dopant improves film quality and smoothness when a metal oxide layer is formed by sputtering or the like.

At least one of the first optical transparent layer 4 and the second optical transparent layer 5 preferably has a characteristic of absorbing light of a specific wavelength band in the visible region from a viewpoint of imparting a design on the optical body 1, or on a window material 10 or the like. Both organic pigments and inorganic pigments can be used as pigments dispersed in the resin, but inorganic pigments that themselves have high weatherability are particularly preferable. Specific examples include inorganic pigments such as zirconium gray (Co- and Ni-doped $ZrSiO_4$), praseodymium yellow (Pr-doped $ZrSiO_4$), chromium titanium yellow (Cr- and Sb-doped $TiO_2$ or Cr- and W-doped $TiO_2$), chromium green ($Cr_2O_3$, etc.), peacock blue (($CoZn)O(AlCr)_2O_3$), Victoria green (($Al,Cr)_2O_3$), deep blue ($CoO.Al_2O_3.SiO_2$), vanadium zirconium blue (V-doped $ZrSiO_4$), chromium tin pink (Cr-doped $CaO.SnO_2.SiO_2$), manganese pink (Mn-doped $Al_2O_3$), and salmon pink (Fe-doped $ZrSiO_4$), and organic pigments such as azo-based pigments and phthalocyanine-based pigments.

(Wavelength-Selective Reflecting Layer)

The wavelength-selective reflecting layer 3 is a layer that directionally reflects light of the specific wavelength band among incident light that is incident at the incident surface and transmits light among the incident light that is not of the specific wavelength band. The wavelength-selective reflecting layer 3 may include alternately laminated amorphous high refractive index and metal layers. However, in a case in which a high refractive index layer is present at the outermost surface of the wavelength-selective reflecting layer 3, the high refractive index layer at the outermost surface may be amorphous or crystalline.

When a crystalline high refractive index layer is formed on the depression-protrusion shaped first surface of the first optical transparent layer 4, the high refractive index layer does not have a uniform thickness, and consequently a uniform metal layer cannot be formed thereon, and sunlight absorption increases. The inventors discovered through diligent investigation that when an amorphous high refractive index layer is formed on the depression-protrusion shaped first surface of the first optical transparent layer 4, the amorphous high refractive index layer has a uniform thickness, a metal layer formed thereon is also formed uniformly, and sunlight absorption decreases.

The average thickness of the wavelength-selective reflecting layer 3 can be selected in accordance with the objective without any specific limitations and is preferably 20 μm or less, more preferably 5 μm or less, and particularly preferably 1 μm or less. If the average thickness of the wavelength-selective reflecting layer 3 exceeds 20 μm, a light path on which transmitted light is refracted becomes longer, and a transmitted image tends to appear distorted.

((Metal Layer))

The material of the metal layer can be selected as appropriate depending on the objective without any specific limitations and may, for example, be a simple substance of metal or an alloy. The simple substance of metal can be selected as appropriate depending on the objective without any specific limitations and examples thereof include Au, Ag, Cu, Al, Ni, Cr, Ti, Pd, Co, Si, Ta, W, Mo, and Ge. The alloy can be selected as appropriate depending on the objective without any specific limitations, is preferably a material based on Ag, Cu, Al, Si, or Ge, and is more preferably AlCu, AlTi, AlCr, AlCo, AlNdCu, AlMgSi, AgPdCu, AgPdTi, AgCuTi, AgPdCa, AgPdMg, or AgPdFe. A material such as Ti or Nd may be added to the metal layer in order to inhibit corrosion of the metal layer. In particular, addition of Ti and/or Nd is preferable in a case in which Ag is used as the material of the metal layer.

The average thickness of the metal layer is preferably 5.0 nm to 23.0 nm. Light may be transmitted without reflection even when the surface is smooth if the average thickness of the metal layer is less than 5.0 nm, whereas light may not be transmitted if the average thickness of the metal layer exceeds 23.0 nm.

The measurement method of the average thickness of the metal layer can be selected as appropriate depending on the objective without any specific limitations and may, for example, be cross-sectional measurement by a transmission electron microscope, measurement using an X-ray fluorescence film thickness meter, or measurement by an X-ray reflectance method.

The method by which the metal layer is formed can be selected as appropriate depending on the objective without any specific limitations and may, for example, be sputtering, vapor deposition, chemical vapor deposition (CVD), dip coating, die coating, wet coating, or spray coating.

((Amorphous High Refractive Index Layer))

The amorphous high refractive index layer is a high refractive index layer that is amorphous, has a high refractive index in the visible region, and functions as an antireflection layer. The material of the amorphous high refractive index layer can be selected as appropriate depending on the objective without any specific limitations and may, for example, be a metal oxide or a metal nitride. The metal oxide can be selected as appropriate depending on the objective without any specific limitations and may, for example, be niobium oxide, tantalum oxide, titanium oxide, indium tin oxide, silicon dioxide, cerium oxide, tin oxide, or aluminum oxide. The metal nitride can be selected as appropriate depending on the objective without any specific limitations and may, for example, be silicon nitride, aluminum nitride, or titanium nitride.

The amorphous high refractive index layer is preferably formed using a material with which an amorphous film can easily be formed through control of further added elements and amounts thereof. Examples of such materials include a composite metal oxide including $In_2O_3$ and 10 mass % to 40 mass % of $CeO_2$ relative to $In_2O_3$, a composite metal oxide including ZnO and 20 mass % to 40 mass % of $SnO_2$ relative to ZnO, and a composite metal oxide including ZnO and 10 mass % to 20 mass % of $TiO_2$ relative to ZnO. It is possible to confirm that the layer is amorphous through observation of a cross-sectional image of the layer using a transmission electron microscope (TEM). The term "high refractive index" as used herein indicates a refractive index of 1.7 or more, for example.

The average thickness of the amorphous high refractive index layer can be selected as appropriate depending on the objective without any specific limitations and is preferably 10 nm to 200 nm, more preferably 15 nm to 150 nm, and particularly preferably 20 nm to 130 nm.

The method by which the amorphous high refractive index layer is formed can be selected as appropriate depending on the objective without any specific limitations and may, for example, be sputtering, vapor deposition, chemical vapor deposition (CVD), dip coating, die coating, wet coating, or spray coating.

(Other Layers)

Other layers such as a functional layer can be selected as appropriate depending on the objective without any specific limitations.

(Functional Layer)

The functional layer includes, as a main component, a chromic material that undergoes a reversible change in reflection performance or the like through external stimulation. The chromic material is, for example, a material that undergoes a reversible change in structure through external stimulation by heat, light, infiltrating molecules, or the like. Examples of chromic materials that may be used include photochromic materials, thermochromic materials, gasochromic materials, and electrochromic materials.

A photochromic material is a material that undergoes a reversible change in structure through the action of light. Various physical properties of the photochromic material such as reflectance and color may reversibly change through photoirradiation with ultraviolet light or the like. Examples of photochromic materials that may be used include transition metal oxides such as $TiO_2$, $WO_3$, $MoO_3$, and $Nb_2O_5$ doped with Cr, Fe, Ni, and the like. Moreover, wavelength selectivity can be improved through lamination of a layer of differing refractive index to these layers.

A thermochromic material is a material that undergoes a reversible change in structure through the action of heat. Various physical properties of the thermochromic material such as reflectance and color may reversibly change through heating. Examples of thermochromic materials that may be used include $VO_2$ and the like. Moreover, elements such as W, Mo, and F may be added with the aim of transition temperature or transition curve control. A laminated structure may be adopted in which a thin film having a thermochromic material such as $VO_2$ as a main component is sandwiched between antireflection layers having a high refractive index material such as $TiO_2$ or ITO as a main component.

Alternatively, a photonic lattice of cholesteric liquid-crystals or the like may be used. Cholesteric liquid-crystals can selectively reflect light of a wavelength dependent on layer spacing and thus physical properties thereof such as reflectance and color can reversibly change through heating because the layer spacing changes depending on the temperature. In such a situation, the reflection band can be widened by using a number of cholesteric liquid-crystal layers having differing layer spacing.

An electrochromic material is a material having physical properties such as reflectance and color that can be reversibly changed through electricity. For example, the electrochromic material may be a material that undergoes a reversible change in structure through application of voltage. More specifically, the electrochromic material may, for example, be a reflection-type light modulation material having reflection characteristics that change through doping or de-doping of protons or the like. The reflection-type light modulation material is specifically a material for which optical attributes can be controlled between a transparent state and a mirror state and/or an intermediate state thereof through external stimulation. Examples of such reflection-type light modulation materials include an alloy material of magnesium and nickel, an alloy material having an alloy material of magnesium and titanium as a main component, $WO_3$, and a material in which needle-like crystals having selective reflection ability are enclosed in microcapsules.

The specific configuration of the functional layer may, for example, be a configuration in which the above-described metal layer, a catalyst layer containing Pd or the like, a thin buffer layer of Al or the like, an electrolyte layer of $Ta_2O_5$ or the like, an ion storage layer of proton-containing $WO_3$ or the like, and a transparent conductive layer are laminated on the second optical transparent layer 5. Alternatively, a configuration in which a transparent conductive layer, an electrolyte layer, an electrochromic layer of $WO_3$ or the like, and a transparent conductive layer are laminated on the second optical transparent layer may be adopted. In such configurations, protons contained in the electrolyte layer can be doped into or de-doped from an alloy layer through application of voltage between a transparent conductive layer and a counter electrode. This changes transmittance of the alloy layer. It is preferable that an electrochromic material is laminated with a high refractive index material such as $TiO_2$ or ITO to increase wavelength selectivity. In another example of a configuration that may be adopted, a transparent conductive layer, an optical transparent layer in which microcapsules are dispersed, and a transparent electrode are laminated on the second optical transparent layer 5. In this configuration, a transmission state in which needle-like crystals in the microcapsules are aligned can be set by applying voltage between both transparent electrodes and a wavelength-selective reflection state in which the needle-like crystals are oriented in all directions can be set by removing the voltage.

[Function of Optical Body]

Figure 4:
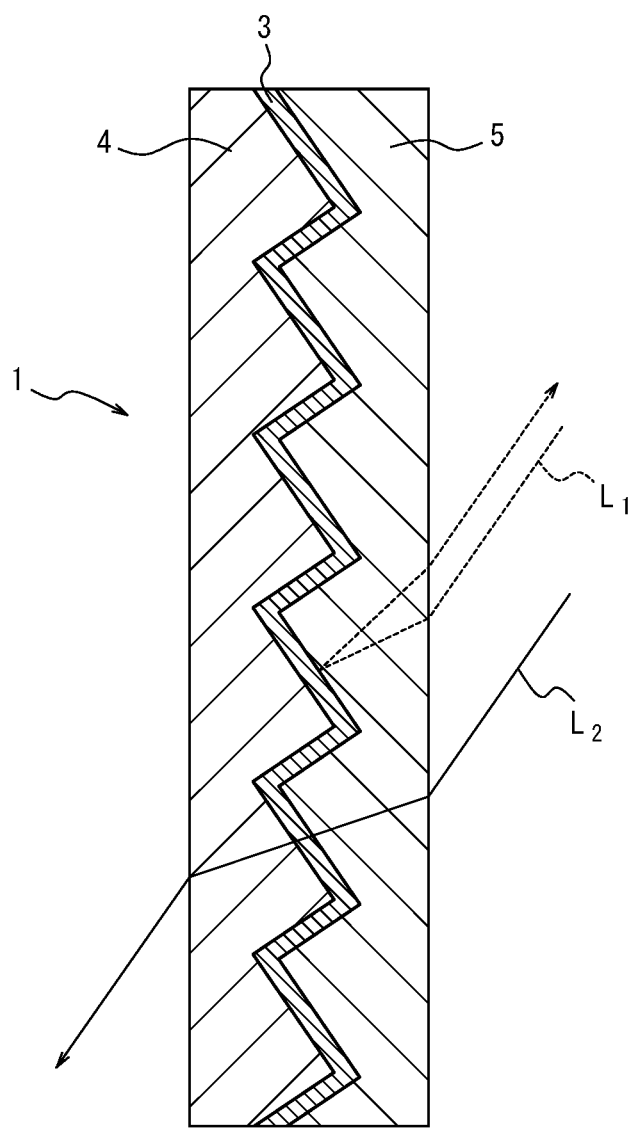
FIG. 4 is a cross-sectional view for explaining one example of function of the optical body according to the first embodiment.

FIG. 4 is a cross-sectional view for explaining one example of function of the optical body 1. As illustrated in FIG. 4, when the optical body 1 is installed with the Z(+) direction as upward, a portion of near infrared light $L_1$ among sunlight (incident light) L that is incident on the optical body 1 from the sky is reflected by the wavelength-selective reflecting film 3 such as to be directionally reflected to the same quadrant as the direction of incidence. In contrast, visible light $L_2$ passes through the optical body 1. As a result of the quadrangular pyramid-shaped depressions 4c being formed in the first optical transparent layer 4 and the wavelength-selective reflecting layer 3 being formed on the depressions 4c, the optical body 1 according to the present embodiment can increase the proportion of light incident from above that is reflected upward. Consequently, a portion of near infrared light $L_1$ incident from the sky at an incident angle of 60° can be directionally reflected to the same quadrant as the incident light through reflection once by the wavelength-selective reflecting film 3 and the final reflected component can be increased compared to a shape that causes reflection twice or more. For example, when reflectance of a wavelength-selective reflecting layer with respect to a certain wavelength is taken to be 80%, reflectance to the sky is 64% when reflection occurs twice as compared to 80% when reflection once is sufficient.

Figure 5A:
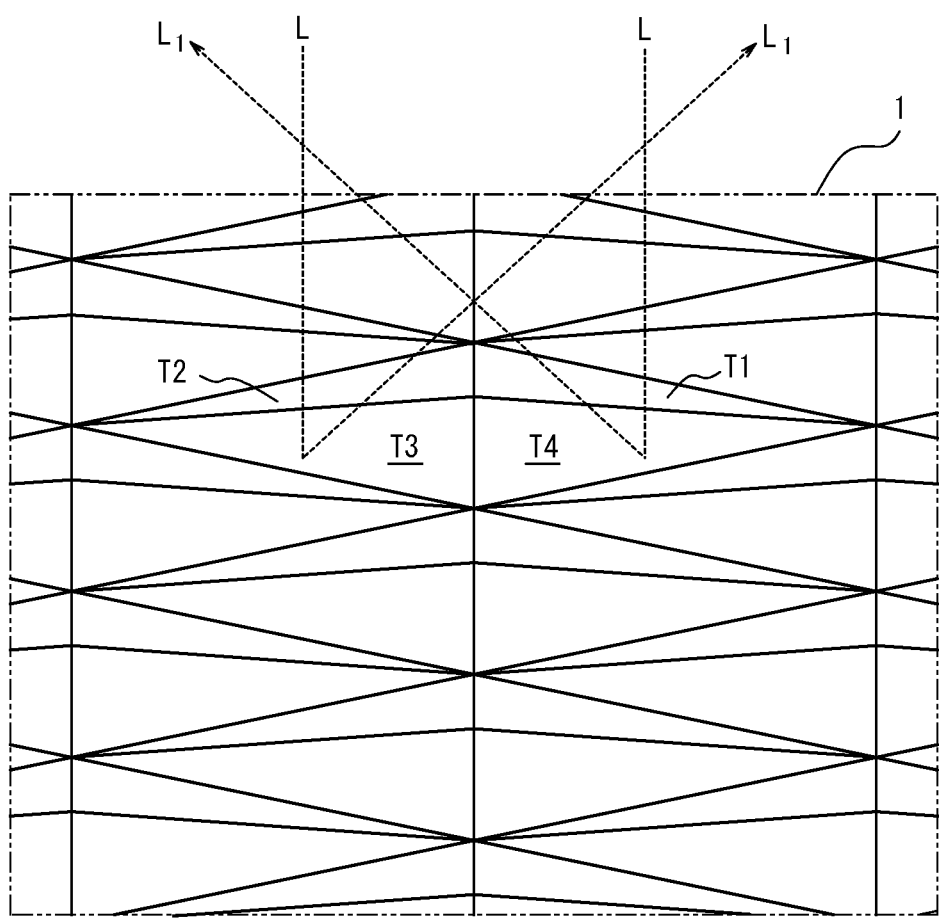
FIG. 5A is a plan view for explaining one example of function of the optical body according to the first embodiment.
Figure 5B:
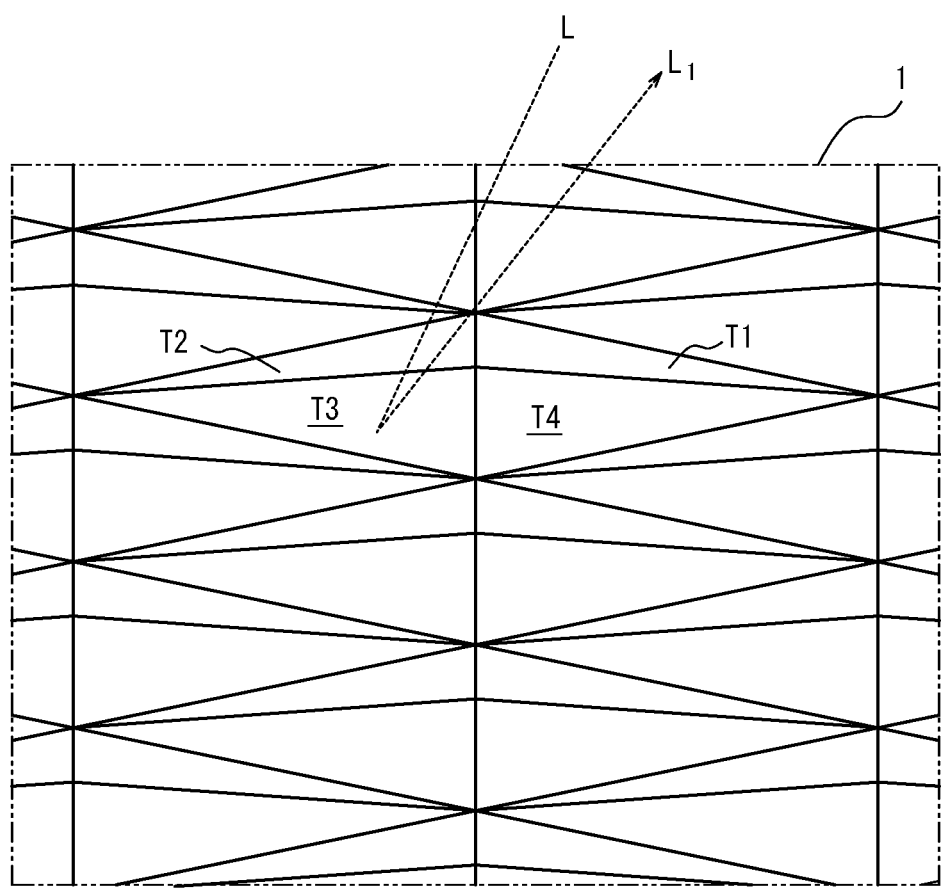
FIG. 5B is a plan view for explaining one example of function of the optical body according to the first embodiment.
Figure 5C:
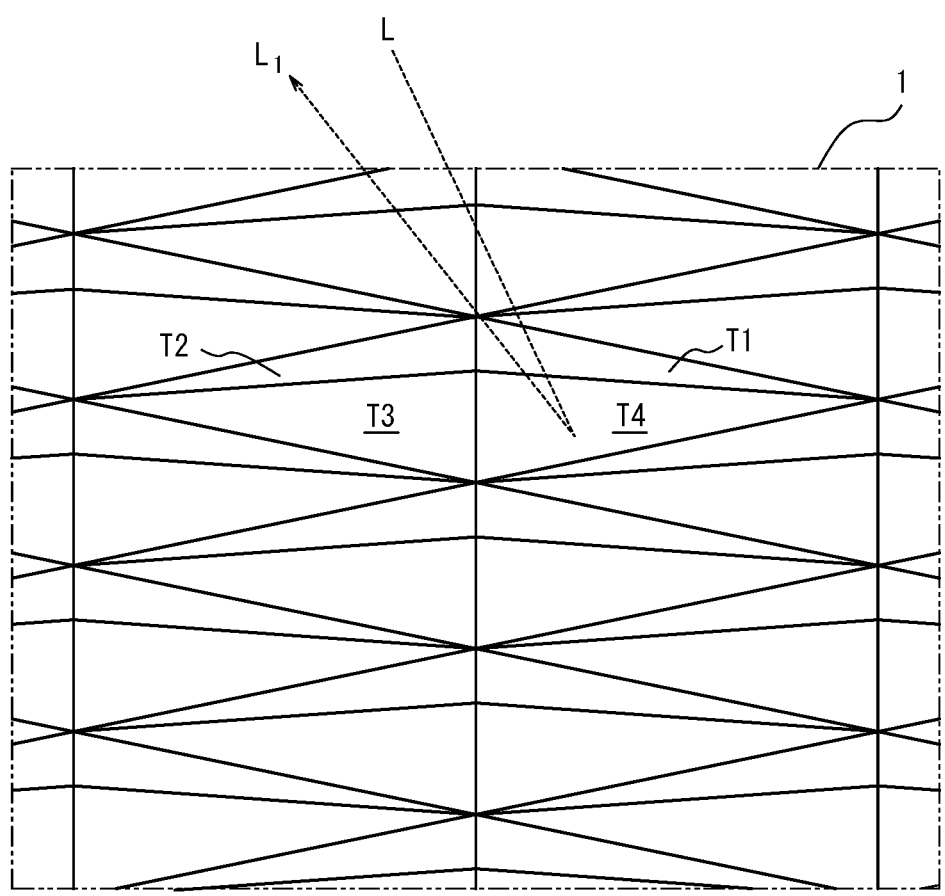
FIG. 5C is a plan view for explaining one example of function of the optical body according to the first embodiment.

FIGS. 5A to 5C are plan views for explaining one example of function of the optical body 1. In FIGS. 5A to 5C, the optical body 1 is installed with the Z(+) direction as upward. FIG. 5A illustrates a case in which incident light L is incident on the optical body 1 from the sky at an incident angle ($\theta=60°$, $\phi=0°$). In this situation, most of the incident light L is incident on the wavelength-selective reflecting layer at locations corresponding to the third inclined surface T3 and the fourth inclined surface T4 of the quadrangular pyramid-shaped depressions 4c. Light $L_1$ of the specific wavelength band among incident light L that is incident on the wavelength-selective reflecting layer at a location corresponding to the third inclined surface T3 is selectively reflected toward the right-hand sky in the plan view of FIG. 5A. On the other hand, light $L_1$ of the specific wavelength band among incident light L that is incident on the wavelength-selective reflecting layer at a location corresponding to the fourth inclined surface T4 is selectively reflected toward the left-hand sky in a symmetrically opposite manner to in the case of the third inclined surface T3. As a result, the optical body 1 reflects light $L_1$ of the specific wavelength band to the same quadrant as incident light with a reflectance R1 that, relative to reflectance R2 in all directions with a reflection angle $\theta o$ ($-90°<\theta o<90°$), is 50% or more (i.e., $R1 \geq R2 \times 0.5$).

Moreover, in a case in which incident light L is incident from the sky at an incident angle ($\theta=60°$, $\phi \neq 0°$), light $L_1$ of the specific wavelength band is selectively reflected by the wavelength-selective reflecting layer at locations corresponding to the third inclined surface T3 and the fourth inclined surface T4 in proportions that vary depending on the polarity and value of $\phi$. As illustrated in FIG. 5B, in a case in which incident light L is incident from the right-hand sky at an incident angle ($\theta=60°$, $-\phi$) that is only incident on the wavelength-selective reflecting layer at a location corresponding to the third inclined surface T3, light $L_1$ of the specific wavelength band is selectively reflected to the same right-hand sky as the incident light. In the same manner, in a case in which incident light L is incident from the left-hand sky at an incident angle ($\theta=60°$, $+\phi$) that is only incident on the wavelength-selective reflecting layer at a location corresponding to the fourth inclined surface T4, light $L_1$ of the specific wavelength band is selectively reflected to the same left-hand sky as the incident light as illustrated in FIG. 5C.

[Overall Shape of Optical Body]

Figure 6:
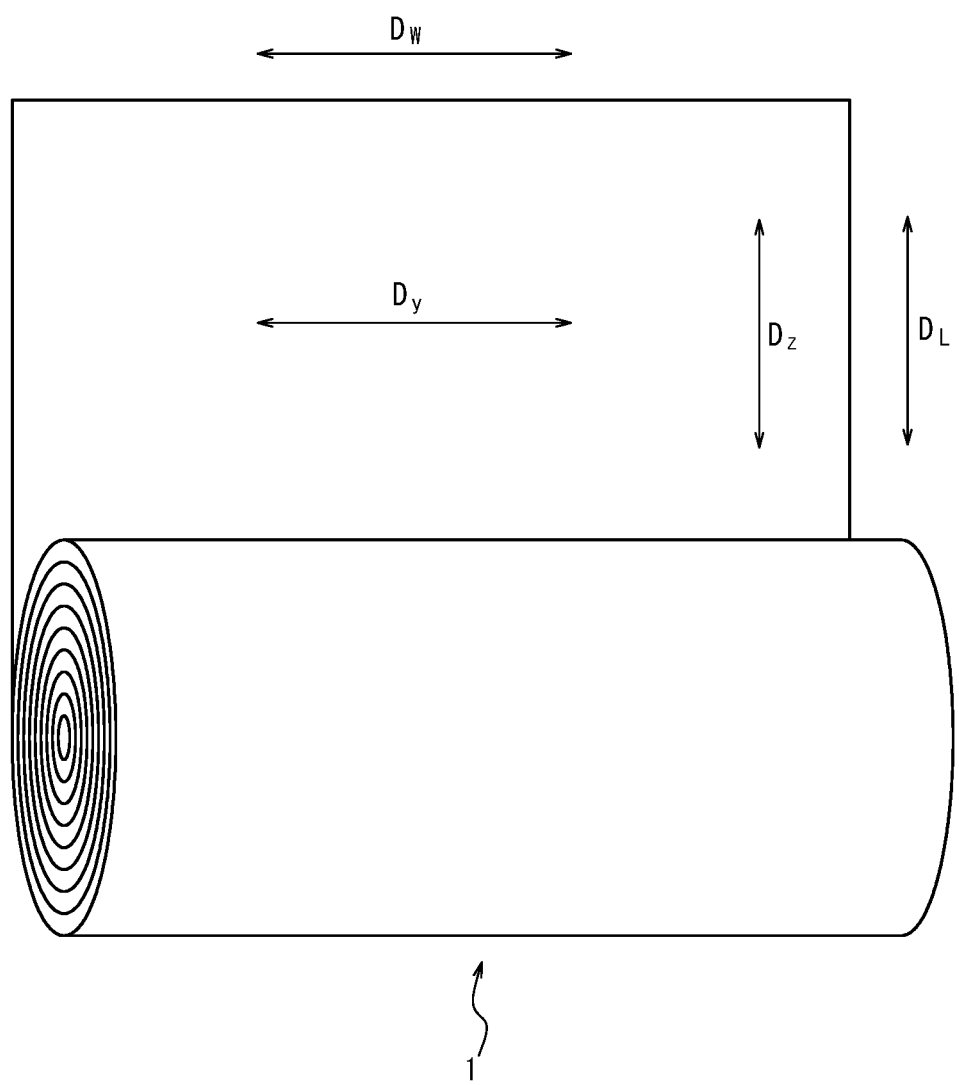
FIG. 6 is a perspective view illustrating one example of overall shape of the optical body according to the first embodiment.

FIG. 6 is a perspective view illustrating one example of overall shape of the optical body 1 according to the first embodiment. The optical body 1 preferably has an overall belt-like or rectangular shape as illustrated in FIG. 6. A shape such as described above enables simple production of the optical body 1 by a roll-to-roll process. Moreover, winding of the optical body 1 in the form of a roll or the like can facilitate handling. In the following description, the longitudinal direction of the optical body 1 having a belt-like or rectangular shape is referred to as longitudinal direction $D_L$ and the transverse direction (also referred to as the width direction) of the optical body 1 is referred to as transverse direction $D_W$. Moreover, the Y direction illustrated in FIG. 3A is referred to as depression arrangement direction $D_y$ and the Z direction illustrated in FIG. 3A is referred to as depression arrangement direction $D_z$.

The quadrangular pyramid-shaped depressions 4c are preferably formed in the first optical transparent layer 4 in a maximally packed two-dimensional array such that the depression arrangement direction $D_z$ is parallel to the longitudinal direction $D_L$ of the optical body 1 and the depression arrangement direction $D_y$ is parallel to the transverse direction $D_W$ of the optical body 1. As a result, reflection function of the optical body 1 can be effectively expressed simply by affixing the optical body 1 having a belt-like or rectangular shape to a window material or the like of a construction such that there is a roughly parallel relationship between the height direction of the construction and the longitudinal direction $D_L$ of the optical body 1 having a belt-like or rectangular shape.

[Affixing Method of Optical Body]

Figure 7A:
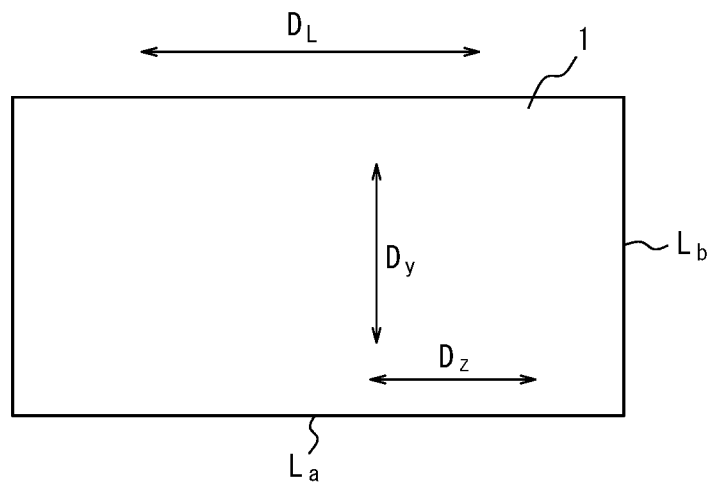
FIG. 7A is a schematic view for explaining one example of a method of affixing the optical body according to the first embodiment.
Figure 7B:
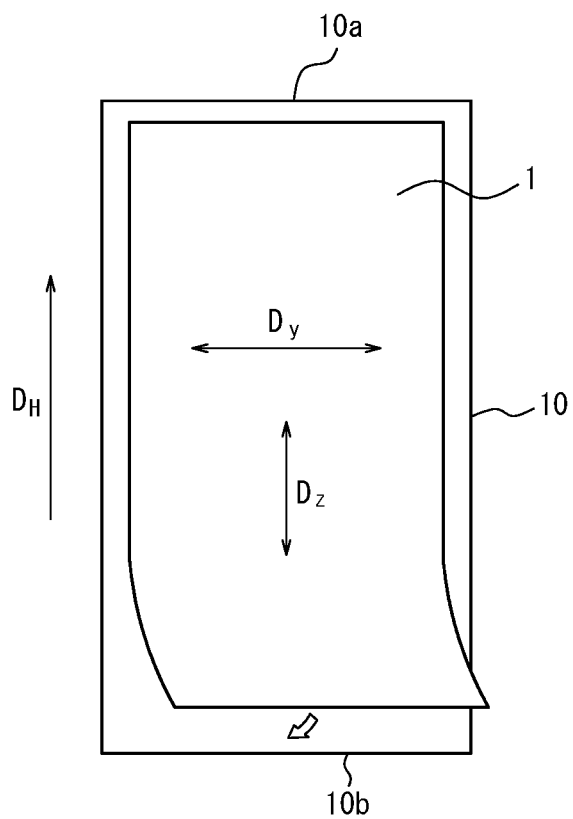
FIG. 7B is a schematic view for explaining one example of a method of affixing the optical body according to the first embodiment.

FIGS. 7A and 7B are schematic views for explaining one example of a method of affixing the optical body 1 according to the first embodiment. Window materials 10 used in high-rise constructions such as buildings in recent years typically have a rectangular shape with a longer vertical length than horizontal width. Therefore, the following describes an example in which the optical body 1 is affixed to a window material 10 having a shape such as described above.

First, a belt-shaped optical body 1 is unrolled from an optical body 1 that has been rolled up in the form of a roll (a so-called "stock roll") and is cut as appropriate in accordance with the shape of a window material 10 to which it is to be affixed to obtain a rectangular optical body 1. The rectangular optical body 1 has a pair of opposing long sides $L_a$ and a pair of opposing short sides $L_b$ as illustrated in FIG. 7A. The long sides $L_a$ of the rectangular optical body 1 are roughly orthogonal to the depression arrangement direction $D_y$ of the quadrangular pyramid-shaped depressions 4c in the incident surface of the optical body 1. In other words, the longitudinal direction $D_L$ of the rectangular optical body 1 is roughly orthogonal to the depression arrangement direction $D_y$ of the quadrangular pyramid-shaped depressions 4c in the incident surface of the optical body 1.

Next, one short side $L_b$ of the cut optical body 1 is aligned with a short side 10a located at an upper edge of a rectangular window material 10. During this alignment, the optical body 1 is aligned such that the Z(+) direction in FIG. 3A becomes the height direction $D_H$ of a construction such as a high-rise construction. Next, the rectangular optical body 1 is affixed sequentially via the affixing layer 6 or the like from the upper edge of the window material 10 toward the lower edge of the window material 10. As a result, the other short side $L_b$ of the optical body 1 is aligned with a short side 10b located at the other edge of the rectangular window material 10. Next, air bubbles that have entered between the window material 10 and the optical body 1 are removed as necessary by performing pressing or the like of the surface of the optical body 1 that has been affixed to the window material 10. In this manner, the rectangular optical body 1 is affixed to the window material 10 such that the Z direction in FIG. 3A (i.e., the specific straight line $l_2$) is roughly parallel to the height direction $D_H$ of the construction with the Z(+) direction oriented toward the upper edge side of the window material 10.

[Affixing Direction of Optical Body]

Figure 8A:
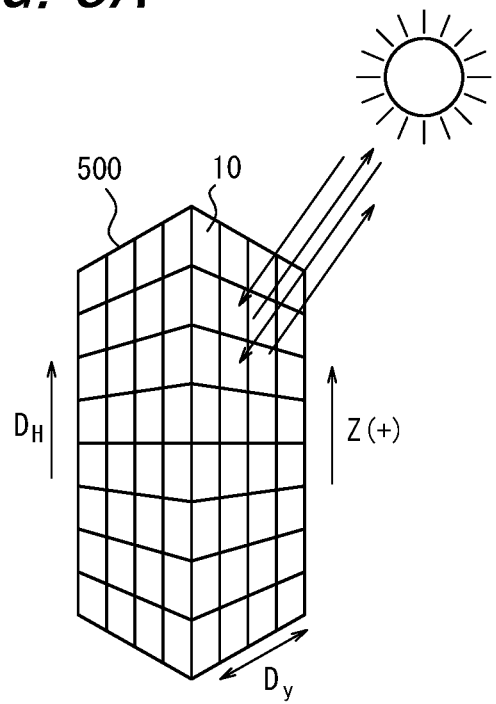
FIG. 8A is a schematic view for explaining reflecting function of an optical body 1 dependent on affixing direction of the optical body according to the first embodiment.
Figure 8B:
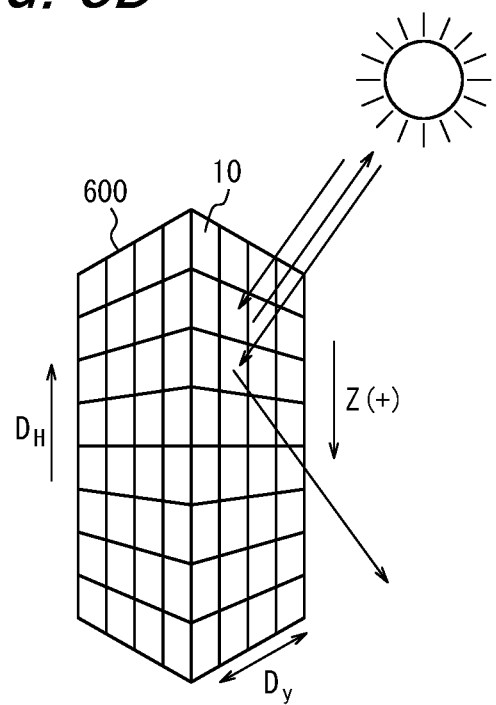
FIG. 8B is a schematic view for explaining difference in reflecting function of the optical body 1 dependent on affixing direction of the optical body according to the first embodiment.

FIGS. 8A and 8B are schematic views for explaining difference in reflection function of the optical body 1 depending on the affixing direction.

FIG. 8A illustrates an example of a construction 500 in which the optical body 1 is affixed to a window material 10 such that the depression arrangement direction $D_z$ of the optical body 1 is roughly parallel to the height direction $D_H$ of the construction with the Z(+) direction illustrated in FIG. 3A oriented toward the upper edge side of the window material 10. In other words, FIG. 8A illustrates an example in which the optical body 1 is affixed to the window material 10 by the optical body affixing method set forth above. Reflection function of the optical body 1 can be effectively expressed when the optical body 1 is affixed to the window material 10 in this manner. Consequently, a large amount of incident light that is incident on the window material 10 from above can be efficiently reflected upward to the same quadrant as the incident light. In other words, upward reflectance by the window material 10 to the same quadrant as incident light can be improved.

FIG. 8B illustrates an example of a construction 600 in which the optical body 1 is affixed to a window material 10 such that the depression arrangement direction $D_z$ of the optical body 1 is roughly parallel to the height direction $D_H$ of the construction with the Z(+) direction illustrated in FIG. 3A oriented toward the lower edge side of the window material 10. In this case, the proportion of downward reflection of incident light that is incident on the window material 10 from above increases. In other words, upward reflectance by the window material 10 to the same quadrant as incident light decreases. Reflection function of the optical body 1 cannot be effectively expressed, therefore, when the optical body 1 is affixed to the window material 10 in this manner.

[Production Apparatus of Optical Body]

Figure 9:
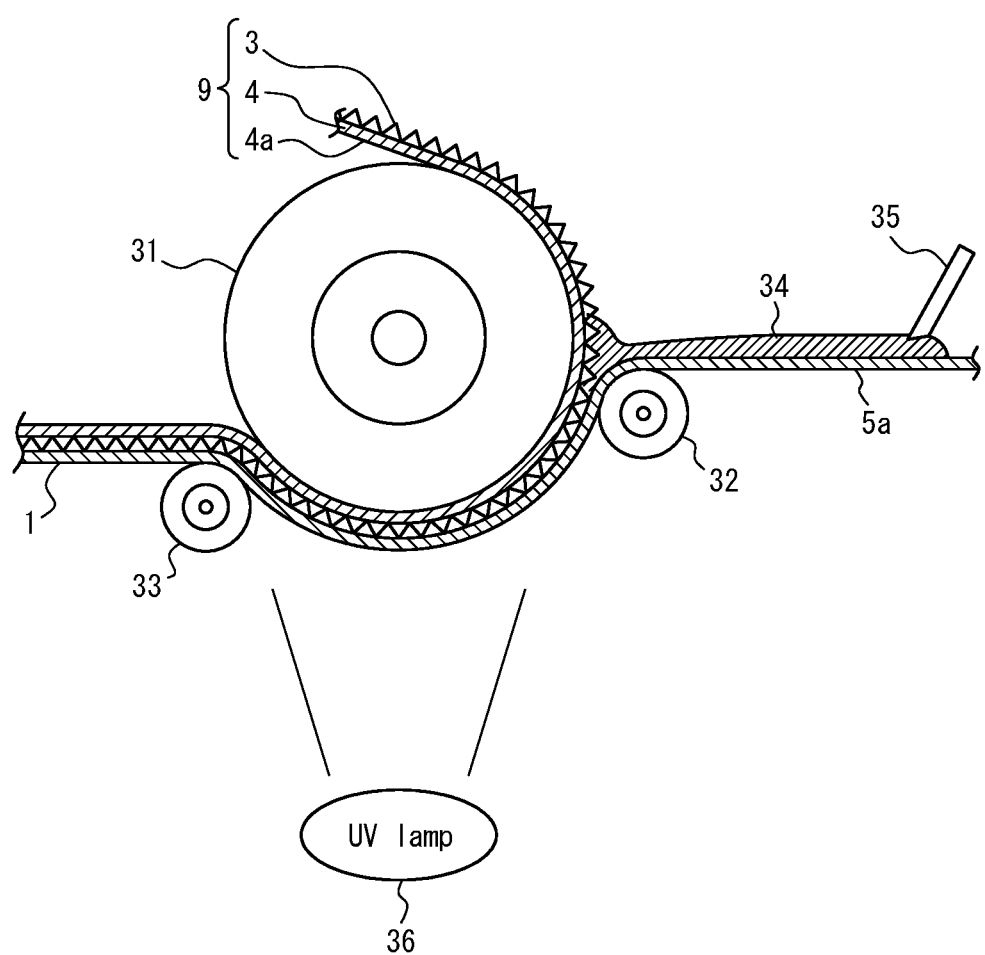
FIG. 9 is a schematic view illustrating one example of configuration of a production apparatus for producing the optical body according to the first embodiment.

FIG. 9 is a schematic view illustrating one example of configuration of a production apparatus for producing the optical body 1 according to the first embodiment. As illustrated in FIG. 9. the production apparatus includes laminating rolls 31 and 32, a guide roll 33, an application apparatus 35, and an irradiation apparatus 36.

The laminating rolls 31 and 32 are configured to nip a reflecting layer-equipped optical layer 9 and the second substrate 5a. The reflecting layer-equipped optical layer 9 is a product obtained by forming the wavelength-selective reflecting layer 3 on one principal surface of the first optical transparent layer 4. Note that the reflecting layer-equipped optical layer 9 may also include the first substrate 4a formed on the other principal surface of the first optical transparent layer 4 at an opposite side to the surface on which the wavelength-selective reflecting layer 3 is formed. In the present example, a case is illustrated in which the wavelength-selective reflecting layer 3 is formed on one principal surface of the first optical transparent layer 4 and the first substrate 4a is formed on the other principal surface of the first optical transparent layer 4. The guide roll 33 is positioned on a conveyance path inside the production apparatus such as to enable conveyance of the optical body 1 having a belt-like shape. Materials of the laminating rolls 31 and 32 and the guide roll 33 are not specifically limited and can be selected as appropriate from metals such as stainless steel, rubbers, silicone, and the like depending on the desired roll characteristics.

The application apparatus 35 may, for example, be an apparatus including an application means such as a coater. The coater may be a gravure coater, a wire bar, a die or the like that is used as appropriate in consideration of physical properties of the resin composition that is to be applied and so forth. The irradiation apparatus 36 is, for example, an irradiation apparatus that performs irradiation with ionizing radiation such as an electron beam, ultraviolet light, visible light, or gamma rays. In the present example, a case is illustrated in which a UV lamp that performs irradiation with ultraviolet light is used as the irradiation apparatus 36.

[Production Method of Optical Body]

The following describes one example of a production method of the optical body according to the first embodiment with reference to FIGS. 9, 10A to 10C, 11A, 11B, 12A to 12C, and 13A to 13C. It is preferable that all or part of the production process described below is performed in a roll-to-roll manner in consideration of productivity.

Figure 10A:
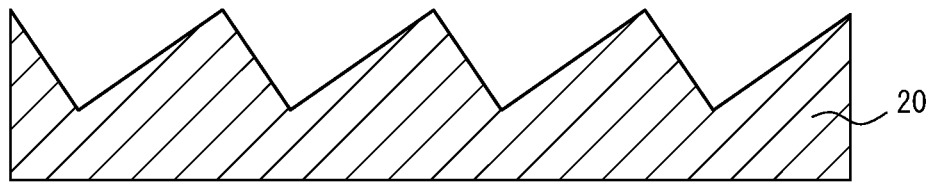
FIG. 10A is a process diagram for explaining one example of a production method of the optical body according to the first embodiment.

First, a mold having the same depression-protrusion shape as the quadrangular pyramid-shaped depressions $4c$ or a mold (replica) 20 having an inverted shape of that mold is formed by tool bit processing, laser processing, or the like as illustrated in FIG. 10A.

Figure 11A:
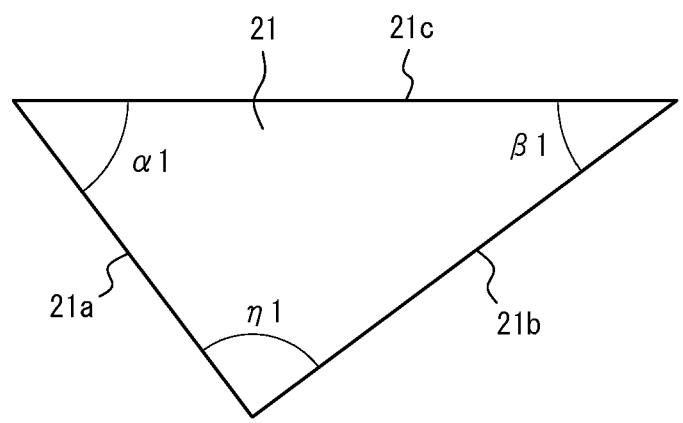
FIG. 11A is a cross-sectional view illustrating one example of configuration of a tool bit used when a mold (die) illustrated in FIG. 10A is formed by tool bit processing.

In a case in which the mold 20 is formed by tool bit processing, for example, the cross-sectional shape of a tool bit that forms a groove having a cross-sectional triangular shape in a direction corresponding to the ridges $4d1$ illustrated in FIGS. 3A to 3C is, for example, as illustrated in FIG. 11A. In the same manner, the cross-sectional shape of a tool bit that forms a groove having a cross-sectional triangular shape in a direction corresponding to the ridges $4d2$ is, for example, as illustrated in FIG. 11B.

A tool bit 21 illustrated in FIG. 11A has an oblique side $21a$, an oblique side $21b$, and an upper side $21c$. An angle between the oblique side $21a$ and the oblique side $21b$ corresponds to the apex angle $\eta1$ forming the ridges $4d1$ of the quadrangular pyramid-shaped depressions $4c$. Moreover, when an angle between the oblique side $21a$ and the upper side $21c$ is taken to be $\alpha1$ and an angle between the oblique side $21b$ and the upper side $21c$ is taken to be $\beta1$ ($<\alpha1$), the oblique side $21a$ is equivalent to a side that forms the second inclined surface T2 of the quadrangular pyramid-shaped depressions $4c$ and the oblique side $21b$ is equivalent to a side that forms the fourth inclined surface T4 of the quadrangular pyramid-shaped depressions $4c$. When the optical body 1 is affixed to an adherend such as a window material 10, the angle $\alpha1$ is an inclination angle at the upper side (sky side).

Figure 11B:
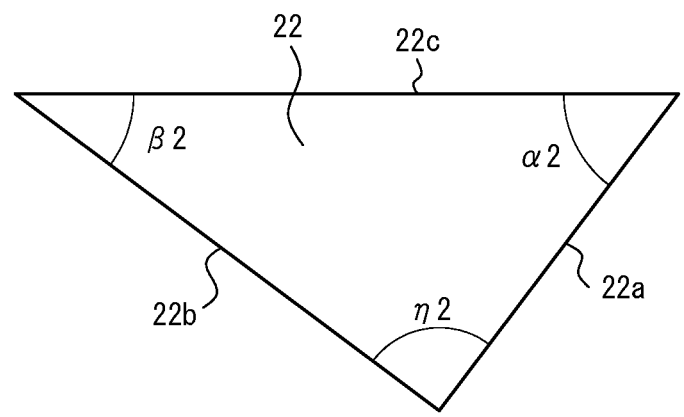
FIG. 11B is a cross-sectional view illustrating another example of configuration of a tool bit used when the mold illustrated in FIG. 10A is formed by tool bit processing.

In the same manner, a tool bit 22 illustrated in FIG. 11B has an oblique side $22a$, an oblique side $22b$, and an upper side $22c$. An angle between the oblique side $22a$ and the oblique side $22b$ corresponds to the apex angle $\eta2$ forming the ridges $4d2$ of the quadrangular pyramid-shaped depressions $4c$. Moreover, when an angle between the oblique side $22a$ and the upper side $22c$ is taken to be $\alpha2$ and an angle between the oblique side $22b$ and the upper side $22c$ is taken to be $\beta2$ ($<\alpha2$), the oblique side $22a$ corresponds to a side that forms the first inclined surface T1 of the quadrangular pyramid-shaped depressions $4c$ and the oblique side $22b$ corresponds to a side that forms the third inclined surface T3 of the quadrangular pyramid-shaped depressions $4c$. When the optical body 1 is affixed to an adherend such as a window material 10, the angle $\alpha2$ is an inclination angle at the upper side (sky side).

In FIGS. 11A and 11B, the apex angle $\eta1$ and the apex angle $\eta2$ may be set as the same apex angle $\eta$. In the same manner, the angle $\alpha1$ and the angle $\alpha2$ may be set as the same angle $\alpha$ and the angle $\beta1$ and the angle $\beta2$ may be set as the same angle $\beta$. The apex angle $\eta$ the angle $\alpha$, and the angle $\beta$ may be set, for example, using an isosceles right-angled triangle for which $\eta=90°$ as a reference shape. In such a situation, the inclination angle $\theta2$ of the lowermost point $4e$ of the quadrangular pyramid-shaped depressions $4c$ described above is defined by $$\theta2=|\alpha-45°|=|45°-\beta|.$$

Note that the reference shape is not limited to an isosceles right-angled triangle and may be any isosceles triangle.

Figure 10B:
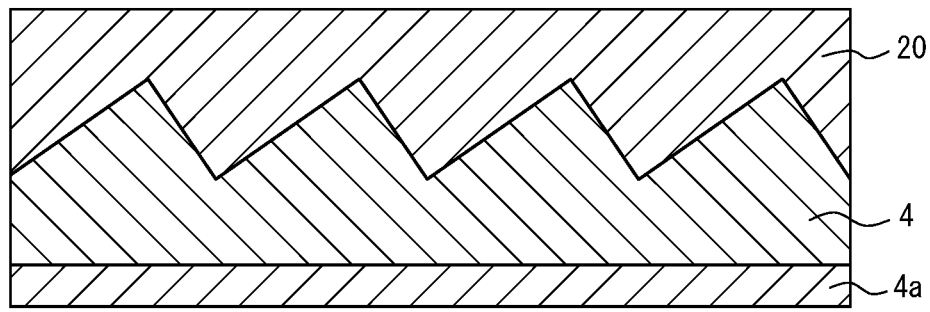
FIG. 10B is a process diagram for explaining one example of a production method of the optical body according to the first embodiment.

Next, the depression-protrusion shape of the mold 20 is transferred to a resin material in the form of a film by a melt extrusion method, a transfer method, or the like as illustrated in FIG. 10B. Examples of transfer methods that may be used include a method in which an energy ray-curable resin is caused to flow into a mold and is then cured by irradiation with energy rays, a method in which heat or pressure is applied to the resin to transfer the shape, and a method in which a resin film is supplied from a roll and then the shape of a mold is transferred while applying heat (laminate transfer method). In this manner, the first optical transparent layer 4 having quadrangular pyramid-shaped depressions $4c$ at one principal surface thereof is formed as illustrated in FIG. 10C.

Figure 10C:
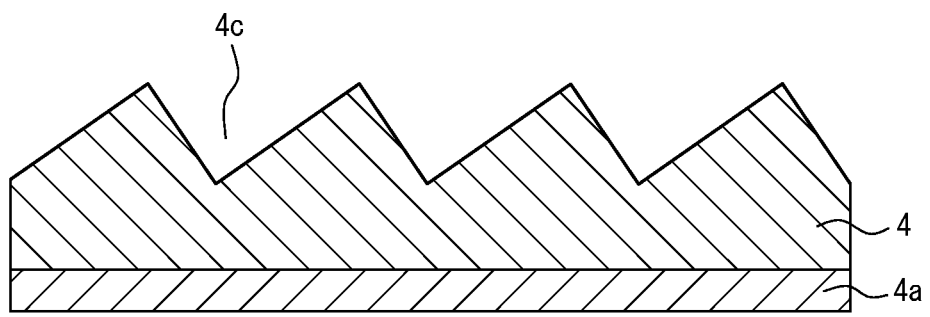
FIG. 10C is a process diagram for explaining one example of a production method of the optical body according to the first embodiment.

Moreover, the first optical transparent layer 4 may be formed on the first substrate $4a$ as illustrated in FIG. 10C. In such a situation, a method may be adopted in which, for example, the first substrate $4a$ is supplied in the form of a film from a roll, an energy ray-curable resin is applied onto the substrate, the mold is subsequently pressed thereagainst to transfer the shape of the mold, and then irradiation with energy rays is performed to cure the resin. The resin preferably further contains a crosslinking agent. This is because the resin can be made heat resistant without significantly changing the storage modulus at room temperature.

Figure 12A:
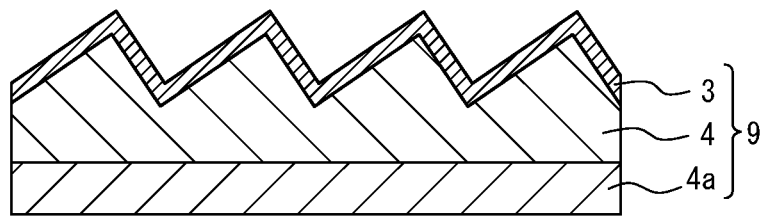
FIG. 12A is a process diagram for explaining one example of a production method of the optical body according to the first embodiment.
Figure 12B:
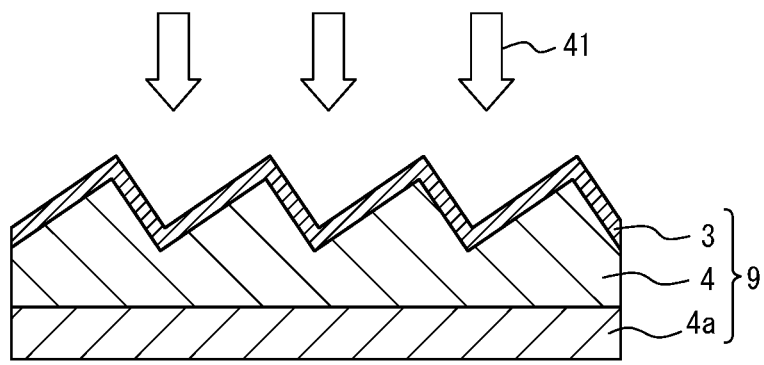
FIG. 12B is a process diagram for explaining one example of a production method of the optical body according to the first embodiment.

Next, the wavelength-selective reflecting layer 3 is formed on one principal surface of the first optical transparent layer 4 to form a reflecting layer-equipped optical layer 9 as illustrated in FIG. 12A. Examples of methods by which the wavelength-selective reflecting layer 3 may be formed include sputtering, vapor deposition, chemical vapor deposition (CVD), dip coating, die coating, wet coating, and spray coating. A method is preferably selected as appropriate from these film formation methods depending on the shape of the quadrangular pyramid-shaped depressions $4c$ and so forth. Next, the wavelength-selective reflecting layer 3 may be subjected to annealing 41 as necessary as illustrated in FIG. 12B. The annealing temperature is within a range of 100° C. to 250° C., for example.

Figure 12C:
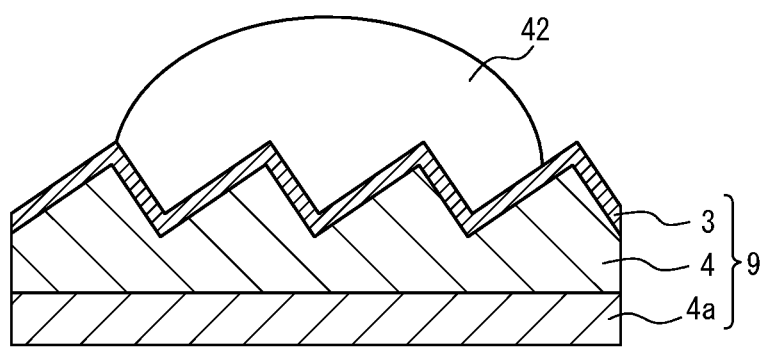
FIG. 12C is a process diagram for explaining one example of a production method of the optical body according to the first embodiment.
Figure 13A:
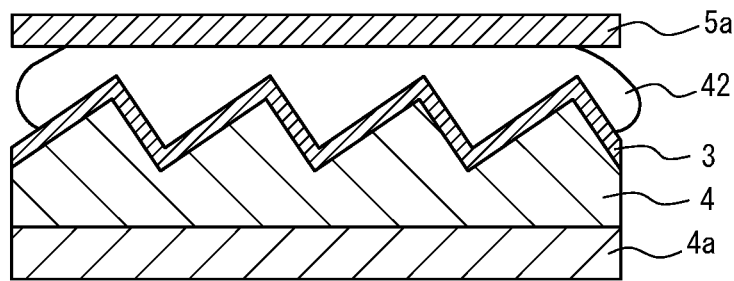
FIG. 13A is a process diagram for explaining one example of a production method of the optical body according to the first embodiment.
Figure 13B:
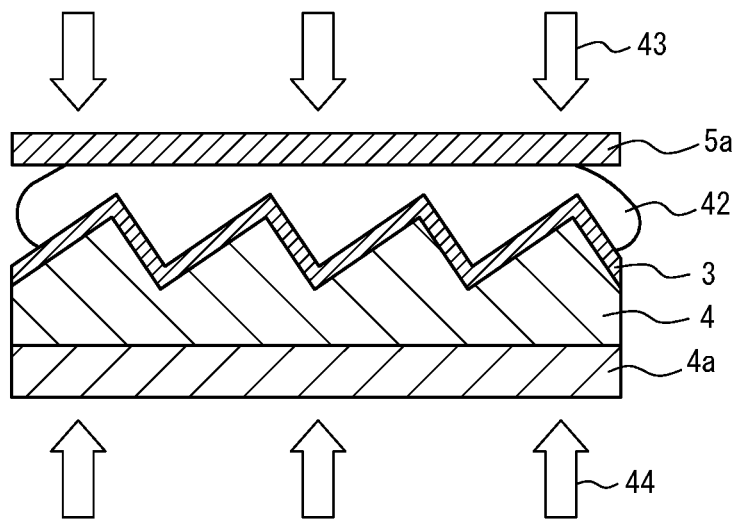
FIG. 13B is a process diagram for explaining one example of a production method of the optical body according to the first embodiment.
Figure 13C:
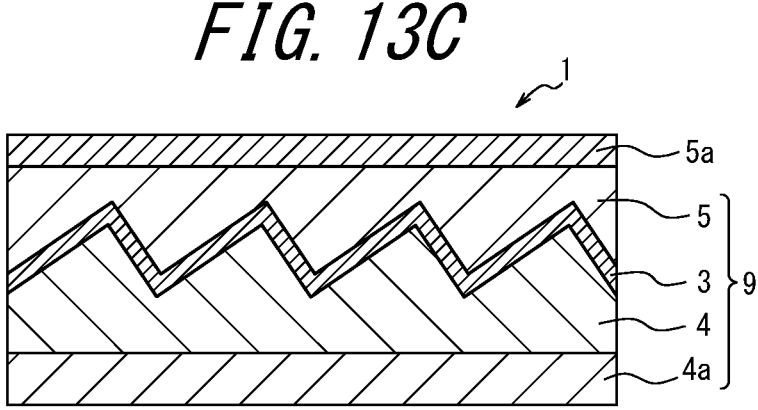
FIG. 13C is a process diagram for explaining one example of a production method of the optical body according to the first embodiment.

Next, a resin 42 is applied onto the wavelength-selective reflecting layer 3 in an uncured state as illustrated in FIG. 12C. The resin 42 may, for example, be an energy ray-curable resin or a thermosetting resin. An ultraviolet-curable resin is preferable as the energy ray-curable resin. Next, a laminate is formed by covering the resin 42 with the second substrate $5a$ as illustrated in FIG. 13A. The resin 42 is subsequently cured through energy rays 43 or heating 43, and pressure 44 is applied to the laminate as illustrated in FIG. 13B, for example. Examples of energy rays that may be used include an electron beam, ultraviolet light, visible light, gamma rays, and an electron beam, with ultraviolet light being preferable from a viewpoint of production equipment. The cumulative irradiation dose is preferably selected as appropriate in consideration of curing characteristics of the resin, yellowing prevention of the resin and substrate 11, and so forth. The pressure applied to the laminate is preferably within a range of 0.01 MPa to 1 MPa. A pressure of less than 0.01 MPa is problematic for film running. On the other hand, a pressure exceeding 1 MPa is undesirable because it is necessary to use a metal roll as a nip roll and pressure variation is more likely to occur. In this manner, the second optical transparent layer 5 is formed on the wavelength-selective reflecting layer 3 as illustrated in FIG. 13C to obtain the optical body 1.

The following provides a specific description of a method of forming the optical body 1 using the production apparatus illustrated in FIG. 9. First, the second substrate 5a is fed from a substrate supply roll (not illustrated) and the fed second substrate 5a passes under the application apparatus 35. Next, the application apparatus 35 applies an ionizing radiation-curable resin 34 onto the second substrate 5a passing under the application apparatus 35. The second substrate 5a on which the ionizing radiation-curable resin 34 has been applied is subsequently conveyed toward the laminating rolls. Meanwhile, the reflecting layer-equipped optical layer 9 is fed from an optical layer supply roll (not illustrated) and is conveyed toward the laminating rolls 31 and 32.

Next, the conveyed second substrate 5a and reflecting layer-equipped optical layer 9 are sandwiched together by the laminating rolls 31 and 32 such that air bubbles do not enter between the second substrate 5a and the reflecting layer-equipped optical layer 9 to thereby laminate the reflecting layer-equipped optical layer 9 to the second substrate 5a. The second substrate 5a that has been laminated with the reflecting layer-equipped optical layer 9 is subsequently conveyed along the outer circumferential surface of the laminating roll 31, and the irradiation apparatus 36 irradiates the ionizing radiation-curable resin 4 with ionizing radiation from the second substrate 5a side to cure the ionizing radiation-curable resin 34. In this manner, the second substrate 5a and the reflecting layer-equipped optical layer 9 are affixed to each other with the ionizing radiation-curable resin 34 interposed between to produce the target elongated optical body 1. Next, the produced belt-like optical body 1 is taken up by a take-up roll (not illustrated). As a result, a stock roll of the rolled-up optical body 1 having a belt-like shape is obtained.

When the process temperature in formation of the second optical transparent layer described above is taken to be t° C., the cured first optical transparent layer 4 preferably has a storage modulus of $3 \times 10^7$ Pa or more at $(t-20)°$ C. The process temperature t referred to herein may, for example, be the heating temperature of the laminating roll 31. It has been empirically found that a temperature of approximately $(t-20)°$ C. actually acts on the first optical transparent layer 4 as a result of the first optical transparent layer 4 being provided on the first substrate 4a and being conveyed along the laminating roll 31 with the first substrate 4a interposed between. Therefore, by setting the storage modulus of the first optical transparent layer 4 as $3 \times 10^7$ Pa or more at $(t-20)°$ C., it is possible to inhibit deformation of depression-protrusion shape at the internal interface of the optical layer due to heat or heat and pressure.

Moreover, the first optical transparent layer 4 preferably has a storage modulus of $3 \times 10^9$ Pa or less at 25° C. This can provide the optical body with flexibility at room temperature. Consequently, the optical body 1 can be produced by a roll-to-roll production process or the like.

The process temperature t is preferably 200° C. or lower in consideration of heat resistance of resin used for the optical layer or substrate. However, when a resin having high heat resistance is used, the process temperature t can be set as 200° C. or higher.

Through the optical body 1 according to the first embodiment, most light of a specific wavelength band among incident light that is incident from above with differing azimuth, for example, can be efficiently returned to the same quadrant as the incident light with an average reflection angle of 30° or more through reflection once by the wavelength-selective reflecting layer 3 as a result of the quadrangular pyramid-shaped depressions 4c being formed in the first optical transparent layer 4 as set forth above. Accordingly, light absorption by the wavelength-selective reflecting layer 3 can be reduced and heat generation can be inhibited compared to when using a corner cube that returns incident light to the sky through reflection three times, and this enables the achievement of improved safety and energy efficiency (for example, reduced $CO_2$ emission).

Moreover, high upward reflectance to the same quadrant as incident light can be obtained by inclining the principal axis $l_m$ of the quadrangular pyramid-shaped depressions 4c upward with the perpendicular line $l_1$ as a reference. Furthermore, film thickness reduction can be achieved compared to when a corner cube is used. This enables cost reduction for the optical body 1.

The apex angle $\eta 1$, apex angle $\eta 2$, angle $\alpha 1$, and angle $\alpha 2$ (or angle $\beta 1$ and angle $\beta 2$) illustrated in FIGS. 11A and 11B may be set as appropriate. Through setting of these angles, the lowermost point 4c of each quadrangular pyramid-shaped depression 4c may, in the plan view of FIG. 3A, be inclined in the Y direction relative to the Z direction diagonal of the quadrangular pyramid-shaped depression 4c, for example. Through the above, light of the specific wavelength band can be more efficiently returned to the same quadrant as incident light in accordance with the orientation in which a window material 10 is installed.

Modified Example

The following describes a modified example of the embodiment set forth above.

Figure 14:
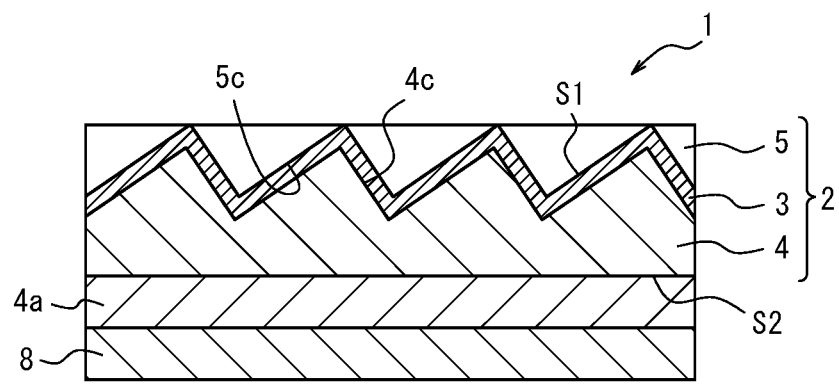
FIG. 14 is a cross-sectional view illustrating a modified example of the first embodiment.

FIG. 14 is a cross-sectional view illustrating a modified example of the first embodiment. In an optical body 1 according the present modified example, the position of protrusion shape tops of a depression-protrusion surface of a first optical transparent layer 4 on which a wavelength-selective reflecting layer 3 is formed is at roughly the same height as an incident surface S1 of a second optical transparent layer 5 as illustrated in FIG. 14.

Second Embodiment

A second embodiment differs from the first embodiment in terms that ridges 4d1 and ridges 4d2 of quadrangular pyramid-shaped depressions 4c in a first transparent optical layer 4 are formed with a spherical shape. Consequently, a wavelength-selective reflecting film 3 formed on the quadrangular pyramid-shaped depressions 4c is also formed with a spherical shape at locations corresponding to the ridges 4d1 and the ridges 4d2.

Figure 15:
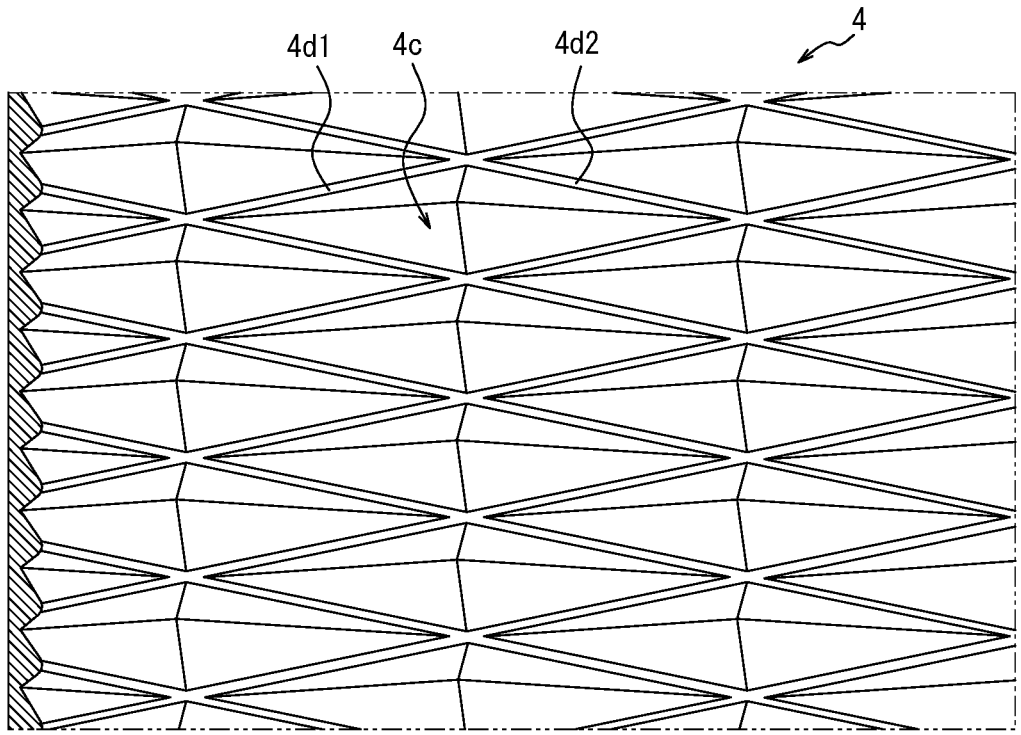
FIG. 15 is a perspective view illustrating an example of shape of quadrangular pyramid-shaped depressions of an optical body according to a second embodiment.

FIG. 15 is a perspective view illustrating an example of shape of the quadrangular pyramid-shaped depressions 4c formed in the first transparent optical layer 4 of the optical body 1 according to the second embodiment. In FIG. 15, the ridges 4d1 and the ridges 4d2 of the quadrangular pyramid-shaped depressions 4c are formed with a spherical shape. The sphere curvature radius Sr can be selected as appropriate and is preferably 10 μm or less, and more preferably 5 μm or less. The reason for this is that when the optical body 1 is affixed to a window material 10, downward reflectance of incident light from above increases, and upward reflectance to the same quadrant as the incident light decreases if the curvature radius Sr exceeds 10 μm.

According to the second embodiment, it is possible to reduce generation of diffracted light at the ridges 4d1 and the ridges 4d2 through a spherical lens effect as a result of the ridges 4d1 and the ridges 4d2 being formed with a spherical shape. Improvement of transmitted image clarity is expected as a result.

Third Embodiment

A third embodiment differs from the first embodiment in terms that ridges 4d1 and ridges 4d2 of quadrangular pyramid-shaped depressions 4c in a first transparent optical layer 4 are formed with an aspherical shape.

Consequently, a wavelength-selective reflecting film 3 formed on the quadrangular pyramid-shaped depressions 4c is also formed with an aspherical shape at locations corresponding to the ridges 4d1 and the ridges 4d2.

Figure 16:
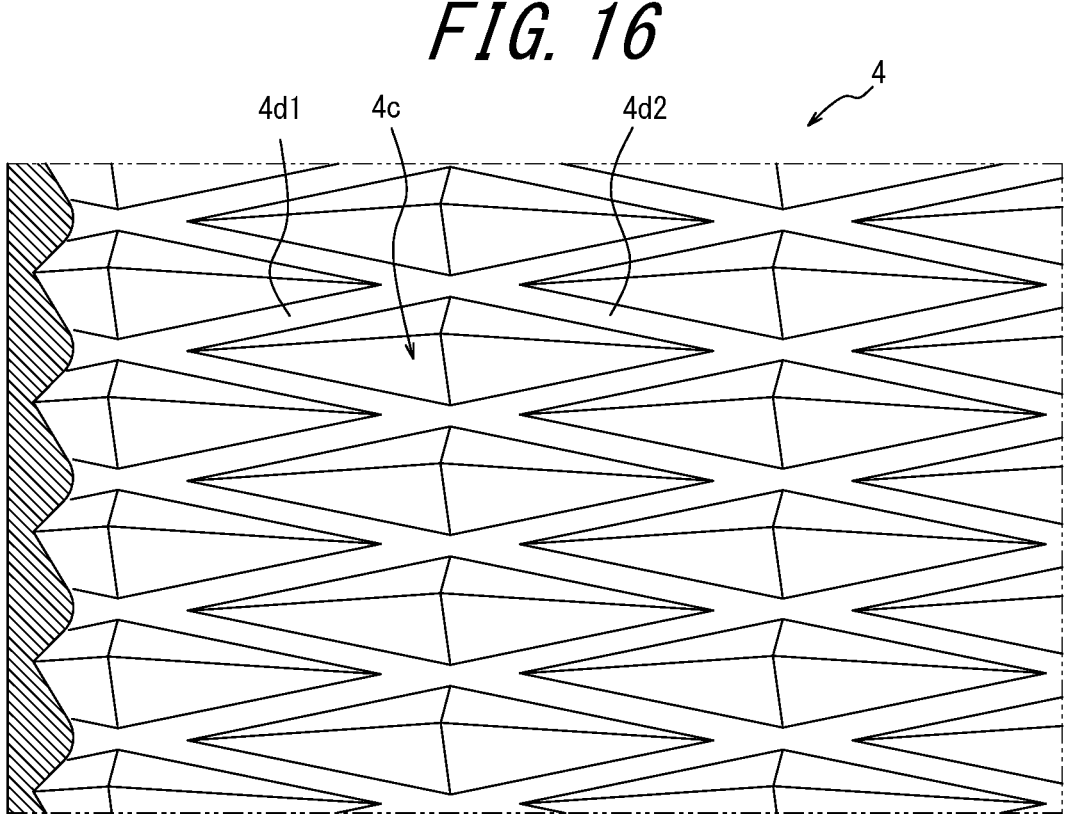
FIG. 16 is a perspective view illustrating an example of shape of quadrangular pyramid-shaped depressions of an optical body according to a third embodiment.

FIG. 16 is a perspective view illustrating an example of shape of the quadrangular pyramid-shaped depressions 4c formed in the first transparent optical layer 4 of the optical body 1 according to the third embodiment. In FIG. 16, the ridges 4d1 and the ridges 4d2 of the quadrangular pyramid-shaped depressions 4c are formed with an aspherical shape. The aspherical shape is formed, for example, in accordance with the following equation (3).

$$Z = cx^2/(1+\sqrt{(1-(1+k)c^2x^2)}) + A4x^4 \qquad (3)$$

(c=1/R, k=−2, A4=1500)

According to the third embodiment, it is possible to efficiently reduce generation of diffracted light at the ridges 4d1 and the ridges 4d2 through an aspherical lens effect in accordance with the incident angle of incident light as a result of the ridges 4d1 and the ridges 4d2 being formed with an aspherical shape. Further improvement of transmitted image clarity is expected as a result.

Fourth Embodiment

A fourth embodiment differs from the embodiments set forth above in terms that light of specific wavelengths is directionally reflected whereas light that is not of the specific wavelengths is scattered. An optical body 1 includes a light scatterer that scatters incident light. The light scatterer may be provided at one or more locations selected from at the surface of an optical layer 2, inside the optical layer 2, and between the optical layer 2 and a wavelength-selective reflecting layer 3. The light scatterer is preferably provided at one or more locations selected from between the wavelength-selective reflecting layer 3 and a first optical transparent layer 4, inside the first optical transparent layer 4, and at the surface of the first optical transparent layer 4. When affixing the optical body 1 to a support such as a window material, the optical body 1 can be adopted at an indoor side or an outdoor side thereof. In a case in which the optical body 1 is affixed at an outdoor side, it is preferable that the light scatterer scattering light that is not of the specific wavelengths is only provided between the wavelength-selective reflecting layer 3 and the window material or other support. This is because directional reflection characteristics are lost if a light scatterer is present between the wavelength-selective reflecting layer 3 and the incident surface. Moreover, in a case in which the optical body 1 is affixed at an indoor side, it is preferable that the light scatterer is provided between the wavelength-selective reflecting layer 3 and an emission surface that is at the opposite side of the optical body 1 to the affixed surface.

Figure 17A:
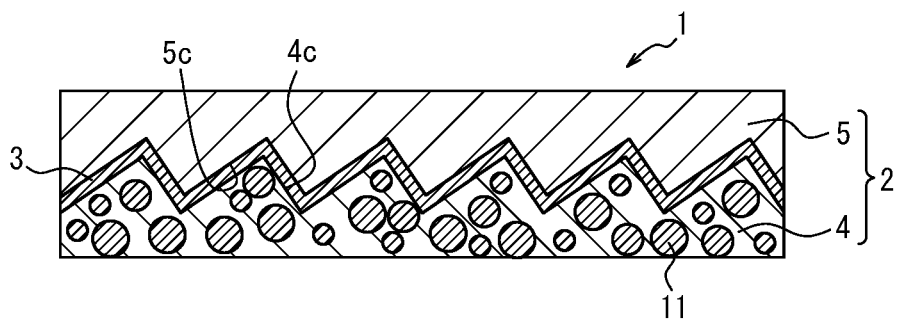
FIG. 17A is a cross-sectional view illustrating a first example of configuration of an optical body according to a fourth embodiment.

FIG. 17A is a cross-sectional view illustrating a first example of configuration of the optical body 1 according to the fourth embodiment. As illustrated in FIG. 17A, the first optical transparent layer 4 contains a resin and fine particles 11. The fine particles 11 have a different refractive index to the resin serving as a main constituent material of the first optical transparent layer 4. The fine particles 11 may, for example, be one or more types of organic fine particles and/or inorganic fine particles. Moreover, hollow fine particles may be used as the fine particles 11. Examples of the fine particles 11 include inorganic fine particles of silica, alumina, or the like and organic fine particles of styrene, acrylic, a copolymer thereof, or the like, with silica fine particles being particularly preferable.

Figure 17B:
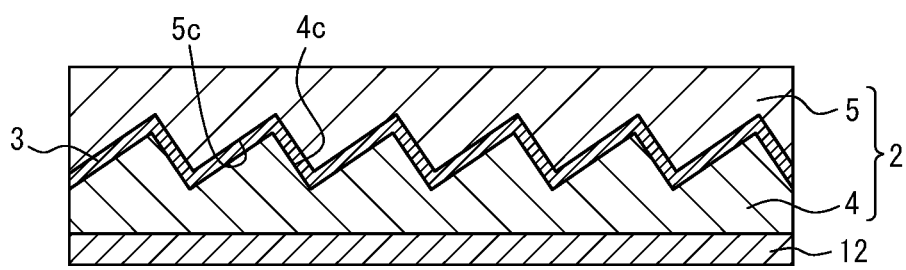
FIG. 17B is a cross-sectional view illustrating a second example of configuration of the optical body according to the fourth embodiment.

FIG. 17B is a cross-sectional view illustrating a second example of configuration of the optical body 1 according to the fourth embodiment. As illustrated in FIG. 17B, the optical body 1 further includes a light diffusion layer 12 at the surface of the first optical transparent layer 4. The light diffusion layer 12 contains a resin and fine particles, for example. Any of the same materials as described for the first example may be used as the fine particles.

Figure 17C:
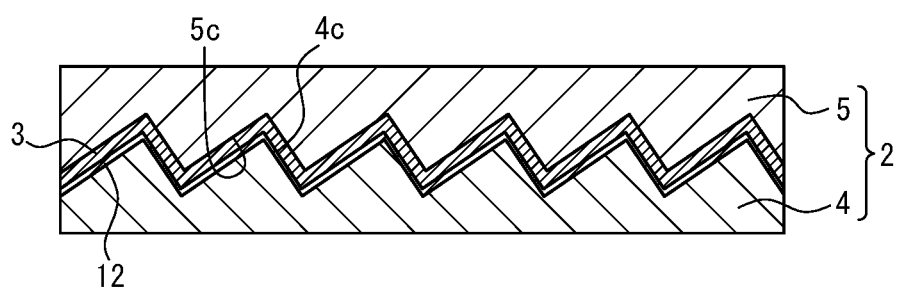
FIG. 17C is a cross-sectional view illustrating a third example of configuration of the optical body according to the fourth embodiment.

FIG. 17C is a cross-sectional view illustrating a third example of configuration of the optical body 1 according to the fourth embodiment. As illustrated in FIG. 17C, the optical body 1 further includes a light diffusion layer 12 between the wavelength-selective reflecting layer 3 and the first optical transparent layer 4. The light diffusion layer 12 contains a resin and fine particles, for example. Any of the same materials as described for the first example may be used as the fine particles.

According to the fourth embodiment, light of a specific wavelength band such as infrared light can be directionally reflected and light such as visible light that is not of the specific wavelength band can be scattered. This can cause clouding of the optical body 1 and impart a design on the optical body 1.

Fifth Embodiment

Figure 18:
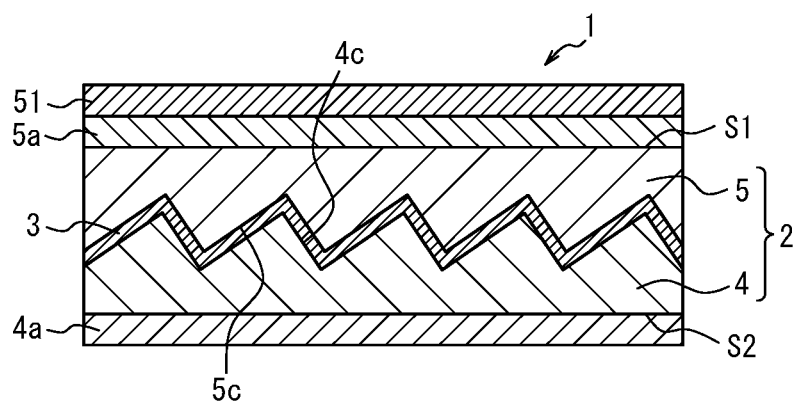
FIG. 18 is a cross-sectional view illustrating one example of configuration of an optical body according to a fifth embodiment.

FIG. 18 is a cross-sectional view illustrating one example of configuration of an optical body according to a fifth embodiment. The fifth embodiment differs from the embodiments set forth above in terms that the optical body 1 further includes a self-cleaning effect layer 51 that displays a cleaning effect on a surface that, among an incident surface S1 and an emission surface S2 of the optical body 1, is an exposed surface at the opposite side of the optical body 1 to a surface that is affixed to an adherend. The self-cleaning effect layer 51 contains a photocatalyst, for example. The photocatalyst may, for example, be $TiO_2$.

The optical body 1 selectively reflects incident light of a specific wavelength band and transmits incident light that is not of the specific wavelength band as previously described. When the optical body 1 is used outdoors or in a dirty room, for example, adhesion of dirt to the surface of the optical body 1 may cause scattering of light and loss of transmittance and reflectance. Therefore, it is preferable that the surface of the optical body 1 is constantly in an optically transparent state. For this reason, it is preferable that the surface of the optical body 1 has excellent water repellency, hydrophilicity, or the like and that the surface automatically displays a cleaning effect.

According to the fifth embodiment, the incident surface can be provided with water repellency, hydrophilicity, or the like through inclusion of the self-cleaning effect layer 51 in the optical body 1. Consequently, adhesion of dirt or the like to the incident surface can be inhibited and deterioration of directional reflection characteristics can be inhibited.

Sixth Embodiment

Figure 19:
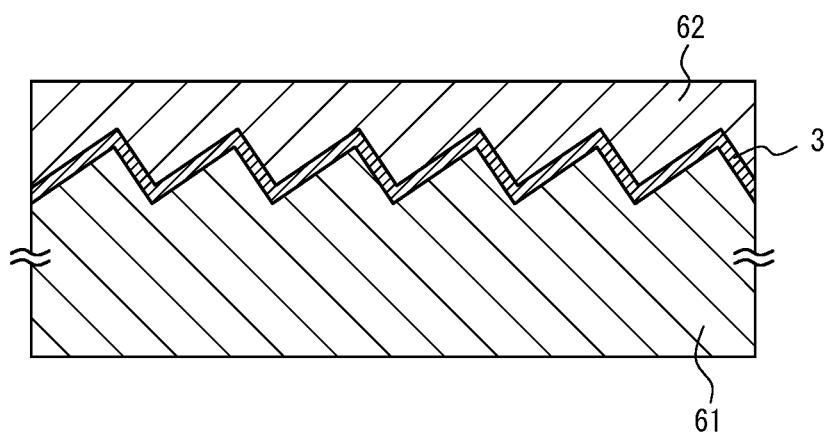
FIG. 19 is a cross-sectional view illustrating one example of configuration of a window material according to a sixth embodiment.

In the embodiments set forth above, although examples are described in which an optical body 1 serving as an optical body is used through affixing to a window material or the like, the optical body itself may alternatively be configured as a window material. FIG. 19 is a cross-sectional view illustrating one example of configuration of a window material according to a sixth embodiment. The present embodiment differs from the embodiments set forth above in terms that a wavelength-selective reflecting layer 3 is formed directly on a window material 61 serving as a first optical transparent layer. At one principal surface of the window material 61, quadrangular pyramid-shaped depressions 61c having ridges that rhombically intersect are formed in a maximally packed two-dimensional array. The wavelength-selective reflecting layer 3 and a second optical transparent layer 62 are laminated in order on the principal surface of the window material 61 at which the depressions 61c are formed. The second optical transparent layer 62 is a layer for improving transmitted image clarity and total luminous transmittance and for protecting the wavelength-selective reflecting layer 3. The second optical transparent layer 62 is, for example, a thermoplastic resin or a product obtained through curing of a resin having an active energy ray-curable resin as a main component.

According to the sixth embodiment, the window material 61 can be provided with directional reflection functionality in advance. Note that the window material 61 may alternatively serve as the second optical transparent layer 62. In this case, quadrangular pyramid-shaped protrusions are formed on the second optical transparent layer 62 serving as a window material and the first optical transparent layer is formed on these protrusions with the wavelength-selective reflecting layer 3 interposed between, for example.

Seventh Embodiment

The optical bodies 1 of the first to fifth embodiments can be adopted for interior members, exterior members, and the like other than window materials. Moreover, such optical bodies 1 are not limited to adoption for immobile interior and exterior members that are fixed in position such as walls and roofs, and can also be adopted in devices that can adjust the amount of transmitted sunlight and/or the amount of reflected sunlight through movement of an interior or exterior member in accordance with variation in the amount of sunlight caused by seasonal or time variation, and can take the adjusted sunlight into an indoor space or the like. In a seventh embodiment, as one example of such a device, a roll screen is described that is one example of a solar radiation shielding device that can adjust the amount of shielding of incident light rays by a solar radiation shielding member through rolling up or unrolling of the solar radiation shielding member.

Figure 20A:
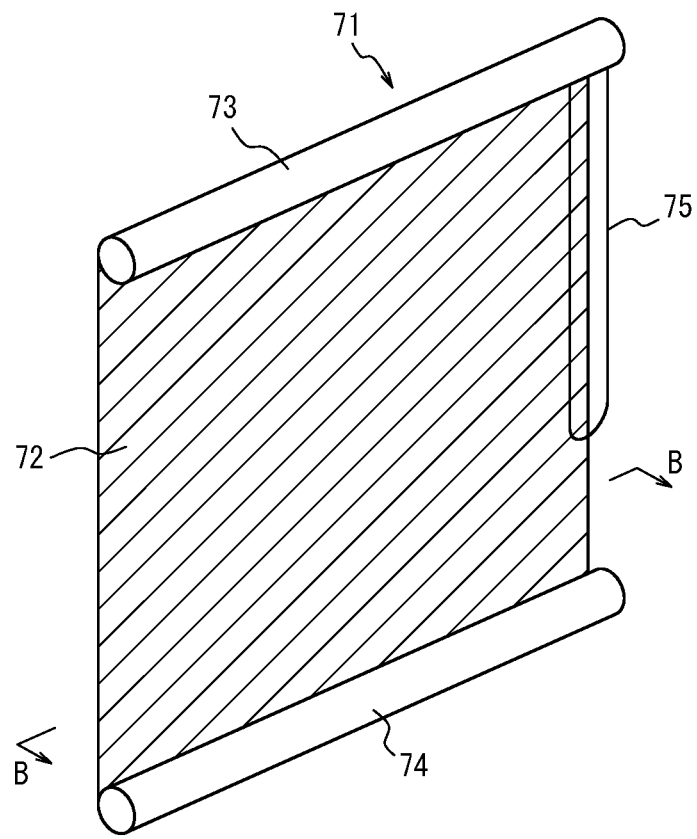
FIG. 20A is a perspective view illustrating one example of configuration of a roll screen according to a seventh embodiment.

FIG. 20A is a perspective view illustrating one example of configuration of the roll screen according to the seventh embodiment. As illustrated in FIG. 20A, a roll screen 71 (solar radiation shielding device) includes a screen 72, a headbox 73, and a core material 74. The headbox 73 is configured in a manner such that the screen 72 can be raised and lowered through operation of an operating section such as a chain 75. The headbox 73 includes a rolling shaft therein for rolling up and unrolling of the screen. One edge of the screen 72 is joined to this rolling shaft. The other edge of the screen 72 is joined to the core material 74. The screen 72 has flexibility and may be any shape without any specific limitations. The screen 72 is preferably a shape that is selected in accordance with the shape of a window material or the like for which the roll screen 71 is to be adopted and may, for example, be a rectangular shape.

Figure 20B:
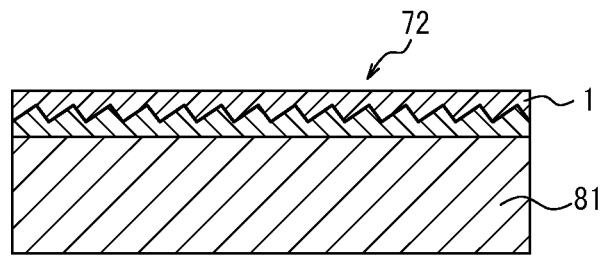
FIG. 20B is a cross-sectional view along a line B-B in FIG. 20A.

FIG. 20B is a cross-sectional view along a line B-B in FIG. 20A. As illustrated in FIG. 20B, the screen 72 includes a substrate 81 and an optical body 1 and preferably has flexibility. The optical body 1 is preferably provided at a surface that, among the principal surfaces of the substrate 81, is at an incident surface side where external light is incident (i.e., at a surface side opposing a window material). The optical body 1 and the substrate 81 are affixed to one another through an affixing layer such as a bonding layer or an adhesive layer. It should be noted that the configuration of the screen 72 is not limited to this example and the optical body 1 may alternatively be used as the screen 72.

The substrate 81 may, for example, be in the form of a sheet, a film, or a plate. The substrate 81 may be made from glass, resin material, paper material, cloth material, or the like and is preferably made from a resin material having transparency in consideration of taking visible light into a specific space such as an indoor space. Examples of glass, resin materials, paper materials, and cloth materials that may be used include commonly known materials used for conventional roll screens. The optical body 1 may be one type of optical body 1 among those according to the first to fifth embodiments set forth above or may be a combination of two or more types of such optical bodies 1.

EXAMPLES

The following describes examples of optical bodies together with comparative examples. However, the present disclosure is not in any way limited by these examples.

<Production of Optical Body>

First, grooves were imparted on a mold roll made from Ni—P from different angle directions intersecting the axial direction of the metal roll by cutting processing using a tool bit (cutting tool) so as to form rhombic quadrangular pyramid-shaped protrusions in a maximally packed two-dimensional array. The different angle directions intersecting the axial direction of the metal roll are angle directions respectively corresponding to the directions of the ridges 4d1 and the ridges 4d2 illustrated in FIG. 3A. Next, PET film having an average thickness of 75 μm (A4300 produced by Toyobo Co., Ltd.) was passed between this mold roll and a nip roll, the PET film was run with urethane acrylate (ARONIX produced by Toagosei Co., Ltd.; post-curing refractive index: 1.533) supplied between the mold roll and the PET film while being nipped, and UV light was irradiated from the PET film side for resin curing to produce a film (first optical transparent layer) in which rhombic quadrangular pyramid-shaped depressions had been imparted. The quadrangular pyramid-shaped depressions had ridges 4d1 and ridges 4d2 with the same apex angle η and were symmetric with respect to the Z direction diagonal of the rhombic open surface illustrated in FIG. 3A.

Next, vacuum sputtering was used to form ZTO (46.8 nm)/AgNdCu (10 nm)/ZTO (106.4 nm)/AgPdCu (10 nm)/ZTO (46.8 nm) in this order on the surface of the first optical transparent layer in which the quadrangular pyramid-shaped depressions had been imparted and thereby form a wavelength-selective reflecting layer. Herein, "ZTO" indicates ZnO to which approximately 30 mass % of $SnO_2$ has been added. Also, formation of the AgNdCu layer (metal layer), which is a silver alloy layer, was performed using an alloy target having a composition of Ag/Nd/Cu=99.0 at %/0.4 at %/0.6 at %. Formation of the ZTO layers (high refractive index layers) was performed with the rear surface side of the film formation surface of the PET film (substrate) in a supported state by a roll that was held at 60° C. In this manner, a wavelength selective reflecting layer-equipped first optical transparent layer was obtained.

After film formation, the depression shape surface at which the wavelength-selective reflecting layer of the wavelength selective reflecting layer-equipped first optical transparent layer was formed and PET film having an average thickness of 50 μm (A4300 produced by Toyobo Co., Ltd.) were placed in opposition between nip rolls and were run with the same resin as used in formation of the depression shapes of the first optical transparent layer (ARONIX produced by Toagosei Co., Ltd.; post-curing refractive index: 1.533) supplied therebetween while being nipped to press out air bubbles. Thereafter, UV light was irradiated through the PET film for resin curing. In this manner, a second optical transparent layer was formed and an optical body was obtained. The optical body was subsequently affixed to transparent glass of 3 mm in thickness to produce a sample.

Samples were produced in this manner as Examples 1 to 8 and Comparative Examples 1 to 6 in order to investigate the relationship between upward reflectance R1 (%), omnidirectional reflectance R2 (%), and average reflection elevation angle βave for a ridge intersection angle θ1 of 25° to 150°, a quadrangular pyramid-shaped depression lowermost point inclination angle θ2 of 0° to 20°, and a ridge apex angle η of 90° to 100°.

<Upward Reflectance R1 (%) and Omnidirectional Reflectance R2 (%)>

LightTools illumination design analysis software produced by ORA (Optical Research Associates) was used to perform simulation to calculate upward reflectance R1 of near infrared light (wavelength 780 nm to 2100 nm) reflected in directions at reflection angles (θ=0° to 90°, φ=0°) among light (wavelength 300 nm to 2500 nm) incident at an incident angle (θ=60°, φ=0°) and also omnidirectional reflectance R2, which is total reflectance at all angles of near infrared light among the incident light that is reflected in directions at reflection angles (θ=−90° to 90°, φ=0°). Note that for each of the samples, incident light was incident from above at an incident angle of 60° with a lowermost point of each of the quadrangular pyramid-shaped depressions of the optical body in an upward position.

<Average Reflection Elevation Angle βave>

Figure 21:
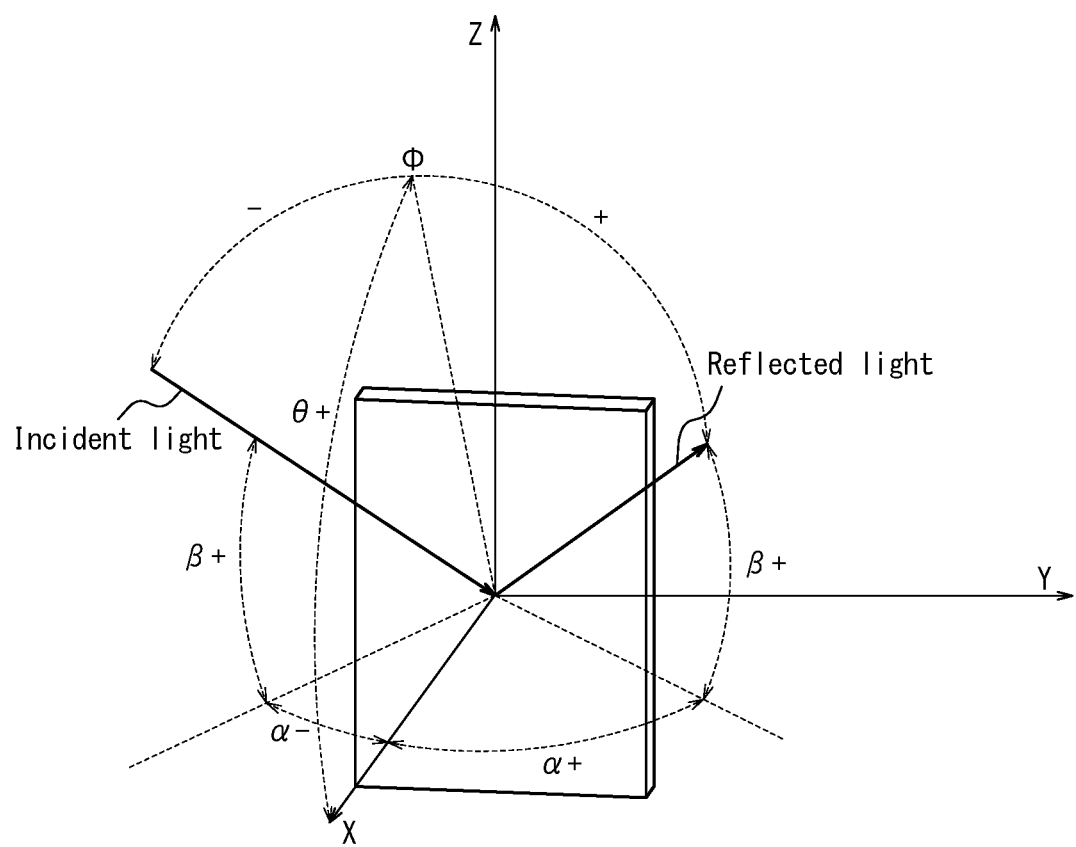
FIG. 21 illustrates a relationship between a polar coordinate system and a Cartesian coordinate system.

The average reflection elevation angle βave was determined by performing simulation for each of 3 standard types of incident light of differing azimuth at an incident angle roughly the same as incident light of an incident angle (θ, φ) expressed by a polar coordinate system to calculate the reflection elevation angle, and then determining the average value of the calculated angles. The three standard types of incident light were taken to be values expressed by a Cartesian coordinate system (α, β). FIG. 21 illustrates a relationship between a polar coordinate system and a Cartesian coordinate system. As illustrated in FIG. 21, α in the Cartesian coordinate system expresses the azimuth in the XY plane and β in the Cartesian coordinate system expresses the elevation angle in the Z direction. Herein, the following three types of incident light of differing azimuth α were set with the elevation angle β roughly equal to incident light for which θ=60° and the average reflection elevation angle βave was determined in all of the examples and comparative examples.

(α,β)=(0°,60°),(−24°,57°),(−62°,57°)

<Judgment of Elevation Angle>

Judgment of the elevation angle was performed with 30° (i.e., ½ of θ=60°) as a standard. A judgment of "good" was made in cases in which βave≥30° and a judgment of "poor" was made in cases in which βave<30°.

<Overall Judgment>

An overall judgment of "good" was made in cases satisfying conditions of an upward reflectance R1 of 5% or more and an average reflection elevation angle βave of 30° or more, which are conditions for a large degree of reflection to the same quadrant as incident light, and an overall judgment of "poor" was made in cases not satisfying these conditions. The results are shown in Table 1.

TABLE 1

| | Incident angle θ = 60° | | | | | | | |
|---|---|---|---|---|---|---|---|---|
| | Intersection angle θ1 (°) | Inclination angle θ2 (°) | Ridge apex angle η (°) | Upward reflectance R1 (%) | Omnidirectional reflectance R2 (%) | Average reflection elevation angle βave (°) | Elevation angle judgment | Overall judgment |
| Example 1 | 120 | 10 | 90 | 12.9 | 33.7 | 30.0 | Good | Good |
| Example 2 | 90 | 10 | 90 | 8.7 | 22.3 | 46.0 | Good | Good |
| Example 3 | 45 | 10 | 90 | 35.4 | 47.8 | 48.3 | Good | Good |
| Example 4 | 30 | 0 | 90 | 9.2 | 29.9 | 44.8 | Good | Good |
| Example 5 | 30 | 10 | 90 | 36.8 | 49.6 | 54.7 | Good | Good |
| Example 6 | 30 | 15 | 90 | 42.1 | 53.0 | 37.3 | Good | Good |
| Example 7 | 30 | 10 | 100 | 8.9 | 25.2 | 54.4 | Good | Good |
| Example 8 | 25 | 10 | 90 | 38.6 | 49.9 | 57.7 | Good | Good |
| Comparative Example 1 | 30 | 10 | 90 | 1.8 | 33.6 | −5 | Poor | Poor |
| Comparative Example 2 | 120 | 20 | 90 | 19.4 | 31.7 | 15.0 | Poor | Poor |

TABLE 1-continued

|  | Incident angle θ = 60° | | | | | | | |
|---|---|---|---|---|---|---|---|---|
|  | Intersection angle θ1 (°) | Inclination angle θ2 (°) | Ridge apex angle η (°) | Upward reflectance R1 (%) | Omnidirectional reflectance R2 (%) | Average reflection elevation angle βave (°) | Elevation angle judgment | Overall judgment |
| Comparative Example 3 | 60 | 0 | 90 | 29.4 | 4.5 | 14.8 | Poor | Poor |
| Comparative Example 4 | 60 | 10 | 90 | 0.7 | 15.2 | 33.1 | Good | Poor |
| Comparative Example 5 | 60 | 20 | 90 | 43.4 | 54.4 | 15.7 | Poor | Poor |
| Comparative Example 6 | 30 | 20 | 90 | 43.3 | 54.3 | 23.0 | Poor | Poor |

It can be seen from Table 1 that when $$25° \leq \theta1 \leq 45° \text{ and } \theta2 \leq 15° \quad (1)$$

$$90° \leq \theta1 \leq 120° \text{ and } \theta2 \leq 10° \quad (2)$$

the conditions of an upward reflectance R1 of 5% or more and an average reflection elevation angle βave of 30° or more are satisfied. This can reduce the influence of near infrared light that is reflected to a different quadrant than incident light.

Figure 22:
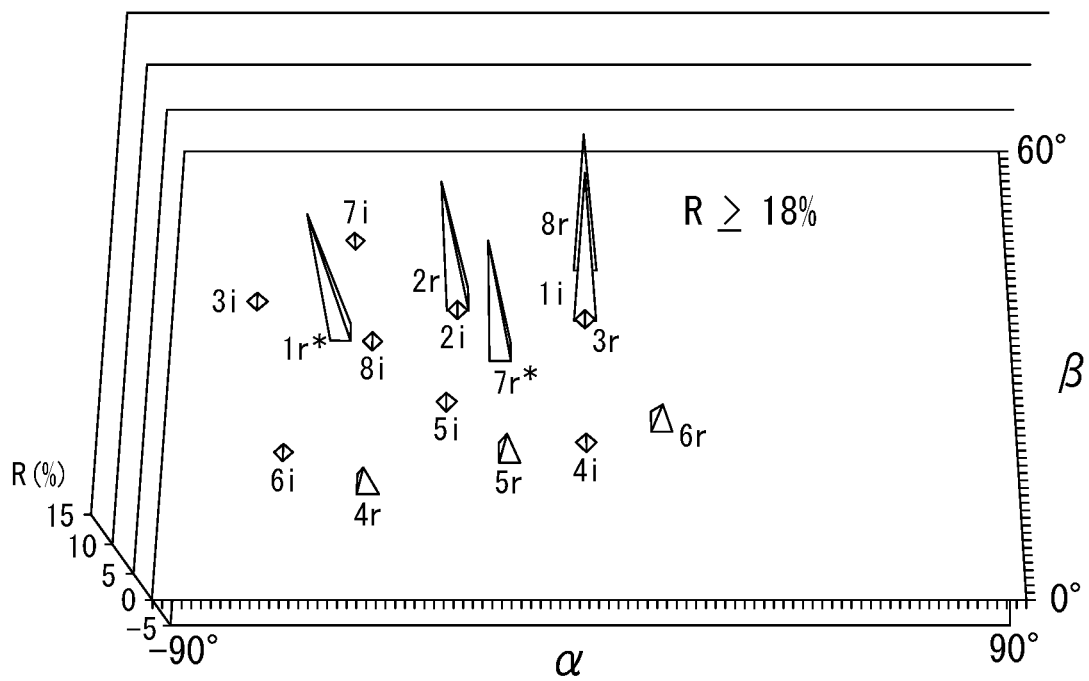
FIG. 22 is a graph illustrating simulation results of incidence/reflection characteristics for an optical body of Example 5.

FIG. 22 is a graph illustrating simulation results of incidence/reflection characteristics for an optical body of Example 5. The azimuth α, the elevation angle β, and the reflectance R are indicated in FIG. 22. The reflectance R is a value for a case in which the elevation angle β of incident light corresponds to 60°. In FIG. 22, "1i" indicates the position of incident light in a case in which (α, β)=(0°, 60°), "2i" indicates the position of incident light in a case in which (α, β)=(−24°, 57°), and "3i" indicates the position of incident light in a case in which (α, β)=(−62°, 57°). Moreover, the position of reflected light of the specific wavelength band and the reflectance with respect to "1i", "2i", and "3i" are indicated by "1r", "2r", and "3r". Moreover, in FIG. 22, positions "4i", "5i", and "6i" of incident light in proximity to an elevation angle β corresponding to 30°, and the position of reflected light of the specific wavelength band and reflectance with respect to these types of incident light are indicated by "4r", "5r", and "6r". Furthermore, a position "7i" of incident light for a case in which the azimuth α is between "2i" and "3i" and the elevation angle β is higher than corresponding to 60°, a position "8i" of incident light for a case in which the elevation angle β is slightly lower than corresponding to 60°, and the position of reflected light of the specific wavelength band and reflectance with respect to each of these types of incident light are indicated by "7r" and "8r" in FIG. 22. Note that a superscript asterisk (*) for the reflected light "1r", "4r", and "7r" indicates that there is symmetric reflected light in the azimuth α(+) direction.

It is clear from FIG. 22 that in the case of Example 5, with respect to incident light from incident positions "1i", "2i", "3i", "7i", and "8i" in proximity to an elevation angle β corresponding to 60°, as reflected light of light of the specific wavelength band, reflectance R is high for "1r", "2r", "3r", "7r", and "8r" in proximity to an elevation angle corresponding to 60° that is roughly the same as the incident light. In such a situation, the reflectance of light of the specific wavelength band for each type of incident light was R≥18%. Consequently, light of the specific wavelength band among light that is incident from the sky above buildings that stand at roughly the same height can be efficiently returned to the sky above other buildings, thereby suppressing the heat island effect. In contrast, with respect to incident light from incident positions "4i", "5i", and "6i" in proximity to an elevation angle β corresponding to 30°, reflected light of light of the specific wavelength band is obtained at "4r", "5r", and "6r" in proximity to an elevation angle corresponding to 30° that is roughly the same as for the incident light, but the reflectance thereof is extremely low. Although incident light in proximity to an elevation angle β corresponding to 30° has little influence on the heat island effect, the heat island effect can be further suppressed by reducing reflectance with respect to such incident light.

Reference Example

Figure 23:
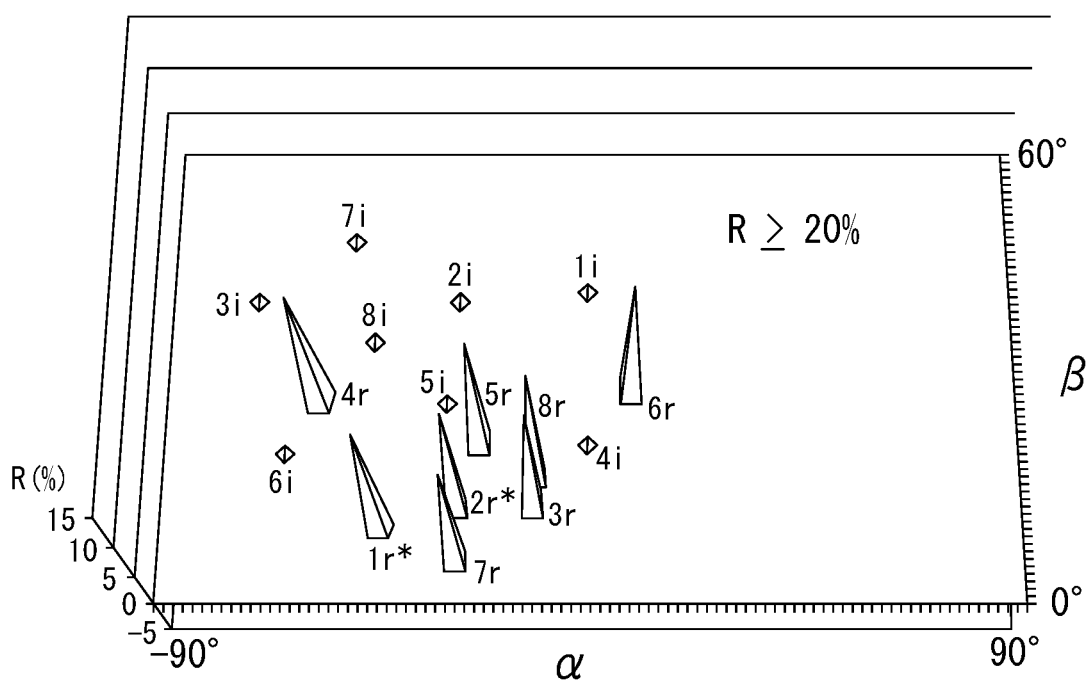
FIG. 23 is a graph illustrating simulation results of incidence/reflection characteristics for an optical body of a reference example.

FIG. 23 is a graph illustrating simulation results of incidence/reflection characteristics for an optical body of a reference example. The optical body of the reference example differs from the preceding example in terms that the ridge intersection angle θ1 is 60°, the quadrangular pyramid-shaped depression lowermost point inclination angle θ2 is 25°, and the ridge apex angle η is 65°. The incident positions "1i", "2i", "3i", "4i", "5i", "6i", "7i", and "8i" of incident light illustrated in FIG. 23 are the same as in FIG. 22.

It is clear from FIG. 23 that in the case of the reference example, with respect to incident light from incident positions "1i", "2i", "3i", "7i", and "8i" in proximity to an elevation angle β corresponding to 60°, reflected light "1r", "2r", "3r", "7r", and "8r" of light of the specific wavelength band has a high reflectance R at a lower angle than an elevation angle β corresponding to 30°. In this situation, the reflectance of light of the specific wavelength band for each type of incident light was R≥20%. Moreover, with respect to incident light from incident positions "4i", "5i", and "6i" in proximity to an elevation angle β corresponding to 30°, reflected light "4r", "5r", and "6r" of light of the specific wavelength band has high reflectance in proximity to an elevation angle corresponding to 30° that is roughly the same as the incident light. Consequently, it is difficult to achieve a sufficient suppressive effect on the heat island effect.

Example 9

A sample including an optical body according to the second embodiment illustrated in FIG. 15 was produced in the same way as in Examples 1 to 8 described above. The optical body of the sample had a ridge intersection angle θ1 of ~30°, a quadrangular pyramid-shaped depression lowermost point inclination angle θ2 of 10°, and a ridge apex angle η of 90° with a spherical shape.

In the present example, LightTools illumination design analysis software produced by ORA was used to perform simulation in which the curvature radius Sr of the spherical ridge shape of the sample was varied in a range of 0 μm to 10 μm, and to calculate the upward reflectance R1 of near infrared light (wavelength 780 nm to 2100 nm) among light (wavelength 300 nm to 2500 nm) incident at an incident angle (θ=60°, φ=0°) and the reflection angle $θ_{out}$ at which reflection intensity is largest. Note that incident light was incident from above at an incident angle of 60° with a lowermost point of each of the quadrangular pyramid-shaped depressions of the optical body in an upward position. The results are illustrated in FIG. 24.

Figure 25A:
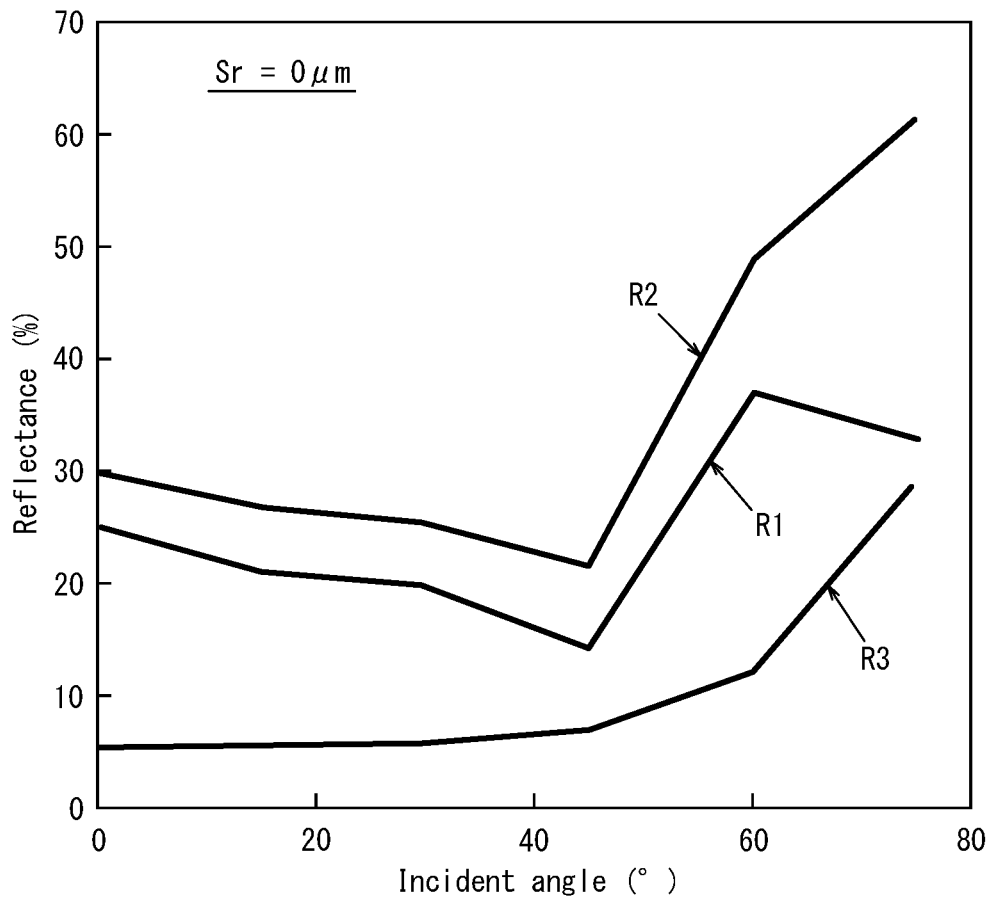
FIG. 25A is a graph illustrating simulation results for omnidirectional reflectance, upward reflectance, and downward reflectance in a case in which the curvature radius of ridges in Example 9 is 0 μm.
Figure 25B:
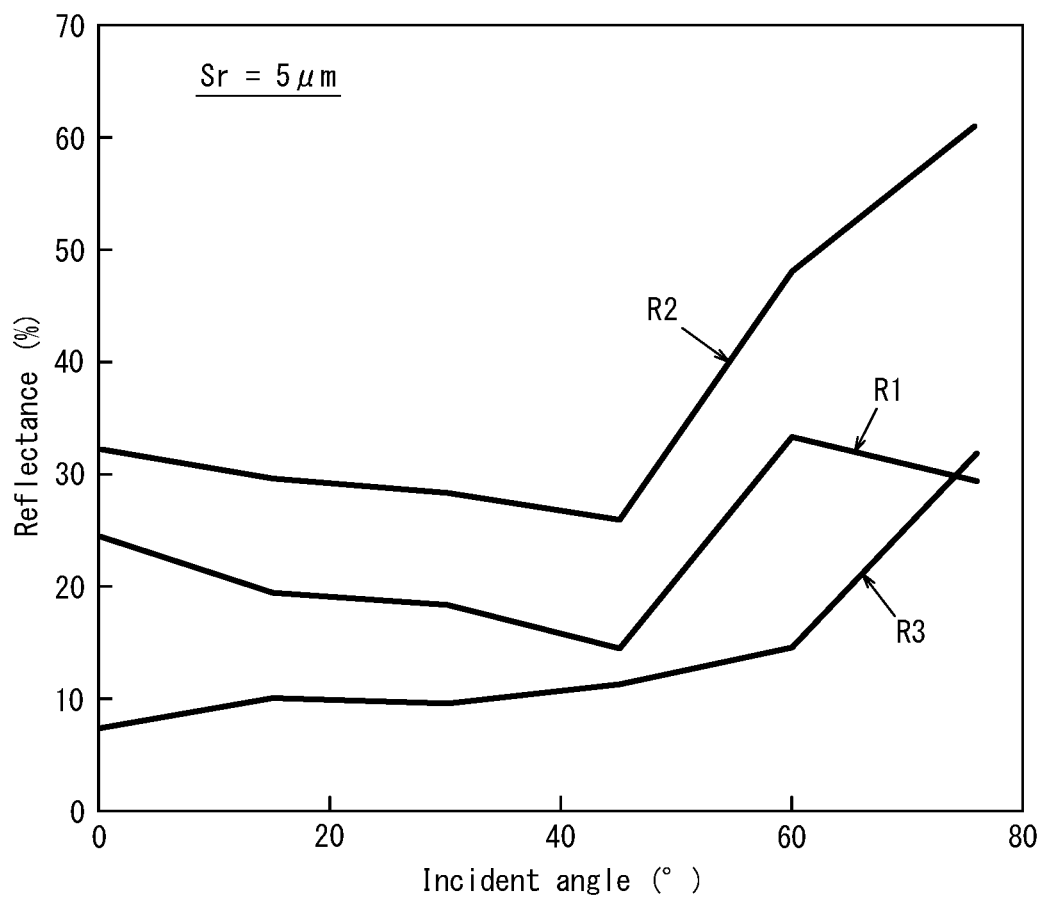
FIG. 25B is a graph illustrating simulation results for omnidirectional reflectance, upward reflectance, and downward reflectance in a case in which the curvature radius of ridges in Example 9 is 5 μm.
Figure 25C:
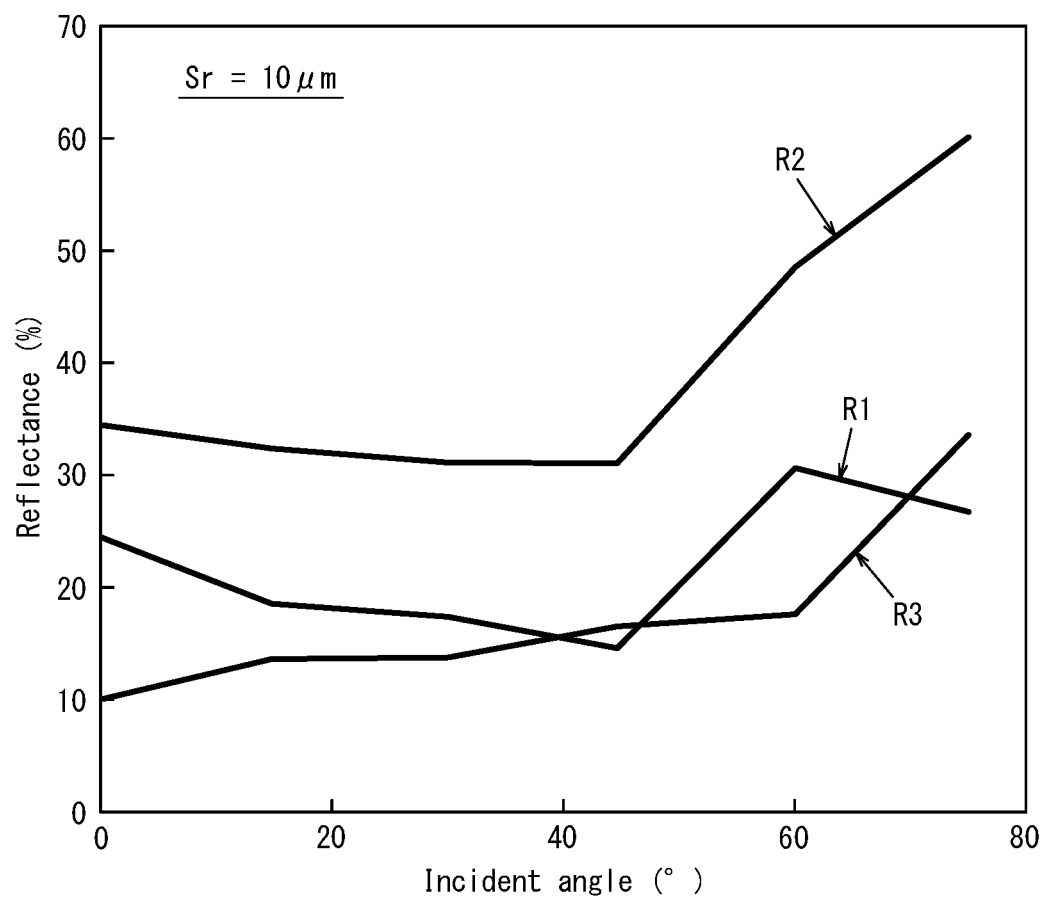
FIG. 25C is a graph illustrating simulation results for omnidirectional reflectance, upward reflectance, and downward reflectance in a case in which the curvature radius of ridges in Example 9 is 10 μm.

Moreover, simulation was performed in which the incident angle (θ=0° to 75°, φ=0°) was varied for cases in which the curvature radius Sr was 0 μm, 5 μm, and 10 μm, and the omnidirectional reflectance R2, the upward reflectance R1, and the downward reflectance R3 were calculated. The results are illustrated in FIGS. 25A, 25B, and 25C. FIG. 25A illustrates results for the case in which Sr=0 μm, FIG. 25B illustrates results for the case in which Sr=5 μm, and FIG. 25C illustrates results for the case in which Sr=10 μm.

Figure 24:
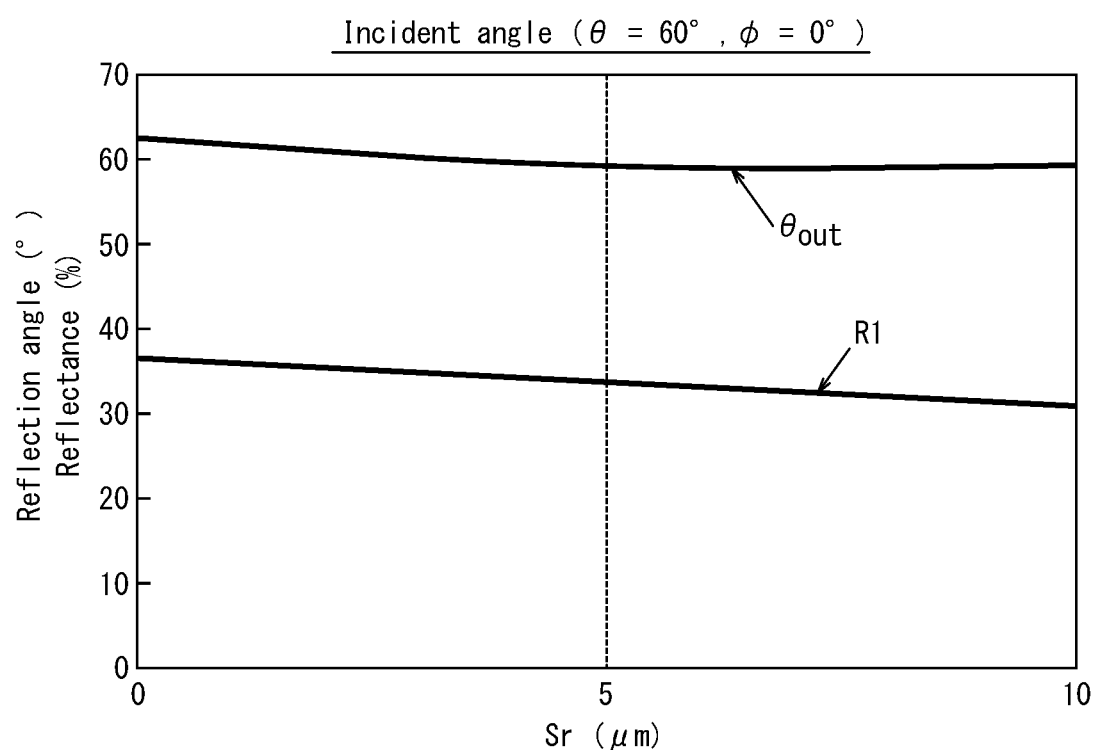
FIG. 24 is a graph illustrating simulation results for upward reflectance and maximum reflectance angle against curvature radius of spherical shape for Example 9 in which ridges have a spherical shape.

As is clear from FIG. 24, in the case of an incident angle (θ=60°, φ=0°), the reflection angle $θ_{out}$ is in proximity to 60° (i.e., the same as the incident angle) when the curvature radius Sr is within a range of 0 μm to 10 μm. In contrast, the upward reflectance R1 decreases as the curvature radius Sr increases. For example, the upward reflectance R1 is approximately 36% when Sr=0 μm, whereas R1≈33.5% when Sr=5 μm, and R1≈30.5% when Sr=10 μm. Based on these results, it is anticipated that the upward reflectance R1 will fall below 30% when the curvature radius Sr exceeds 10 μm. Moreover, as is clear from FIGS. 25A to 25C, the omnidirectional reflectance R2 increases with increasing curvature radius Sr around incident angles (θ=0° to 50°, φ=0°). Furthermore, through incident angles (θ=0° to 75°, φ=0°), the downward reflectance R3 increases in accordance with increasing incident angle θ as the curvature radius Sr increases. This demonstrates that the curvature radius Sr is preferably set as 10 μm or less, and more preferably set as 5 μm or less. This is also the same in a case in which the ridge shape is an aspherical shape in the preceding embodiments and examples.

Example 10

Figure 26:
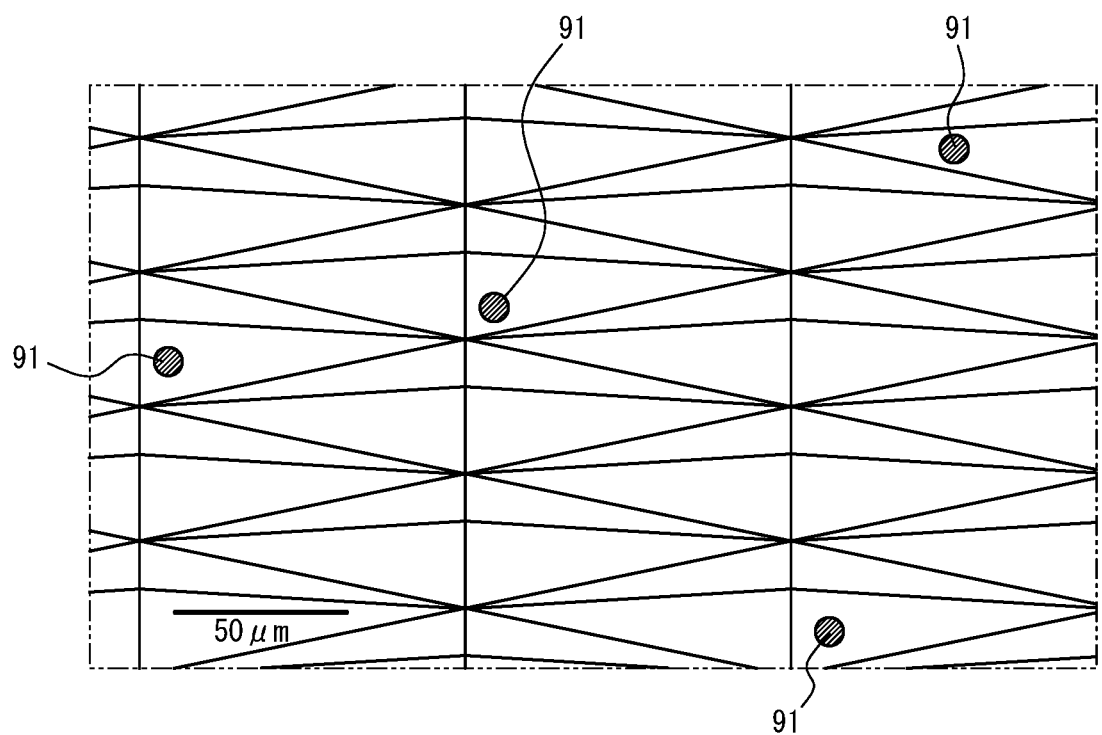
FIG. 26 is a schematic view illustrating an optical body as observed by an optical microscope.

Upon inspection of the optical bodies of Examples 1 to 8 using an optical microscope, the inventors found that there were cases in which clouding by miniscule air bubbles 91 in the quadrangular shaped depressions 4c was observed as illustrated schematically in FIG. 26, for example. It is presumed that these miniscule air bubbles 91 are air bubbles that remained without being pressed out when the reflecting layer-equipped optical layer 9 was embedded using the ionizing radiation-curable resin 34 in an embedding process using the production apparatus illustrated in FIG. 9. Although the overall optical characteristics of such optical bodies are largely unaffected because the remaining air bubbles 91 are extremely small, these air bubbles 91 may lead to reduction in quality. It is anticipated that in order to ensure that no air bubbles remain, it would be necessary to enhance the apparatus in the embedding process of FIG. 9 or make changes such as reducing the embedding line speed, which may lead to an increase in production cost.

In view of the above, the inventors produced various samples of optical bodies having a height difference between intersecting ridges and then inspected the presence of air bubbles using an optical microscope. In terms of shape, the intersecting ridges each had a pointed shape for which the curvature radius Sr was 0. Note that the height difference between the intersecting ridges is the distance between the ridges 4d1 and the ridges 4d2 in the X direction in FIG. 3A. In the following description, the height difference is denoted as "ΔX". The height difference ΔX results, for example, from a difference in cutting depth between the tool bit 21 and the tool bit 22 illustrated in FIGS. 11A and 11B in formation of the mold 20 illustrated in FIG. 10A.

In the samples, the ridge intersection angle θ1 was 30°, the quadrangular pyramid-shaped depression lowermost point inclination angle θ2 was 10°, the ridge apex angle η was 90°, and the pitch $P_y$ in the Y direction and the pitch $P_z$ in the Z direction of the quadrangular pyramid-shaped depressions 4c illustrated in FIG. 3A were each 67 μm. Moreover, in the samples, the design values for the ridge height of the ridges 4d1 and the ridges 4d2 (i.e., the design values for the cutting depth of the tool bit 21 and the tool bit 22 illustrated in FIGS. 11A and 11B in formation of the mold 20 illustrated in FIG. 10A, for example) were each 32 μm. In each of the samples, one type of ridge corresponded to the design value ridge height and the other type of ridge had a height difference ΔX of 0.1 μm, 0.2 μm, 0.5 μm, 1.0 μm, 1.5 μm, or 2.0 μm in the +X direction or the −X direction relative to the one type of ridge. Two types of urethane acrylate (ARONIX produced by Toagosei Co., Ltd.; post-curing refractive index: 1.533) having viscosities of 300 cP and 1500 cP were used as the ionizing radiation-curable resin 34 for embedding the reflecting layer-equipped optical layer 9 in the embedding process using the production apparatus illustrated in FIG. 9. Moreover, two conditions of 1.5 m/min and 10 m/min were adopted for the embedding line speed in the embedding process.

Table 2 show the results of inspection of the presence of air bubbles for these samples. In Table 2, "poor" indicates a result that air bubbles were observed, whereas "good" indicates a result that air bubbles were not observed.

TABLE 2

| | | Height difference ΔX | | | | | |
|---|---|---|---|---|---|---|---|
| Viscosity | Embedding line speed | 0.1 μm | 0.2 μm | 0.5 μm | 1.0 μm | 1.5 μm | 2.0 μm |
| 1500 cP | 1.5 m/min | Poor | Poor | Good | Good | Good | Good |
| | 10 m/min | Poor | Poor | Good | Good | Good | Good |
| 300 cP | 1.5 m/min | Poor | Good | Good | Good | Good | Good |
| | 10 m/min | Poor | Poor | Good | Good | Good | Good |

Figure 27:
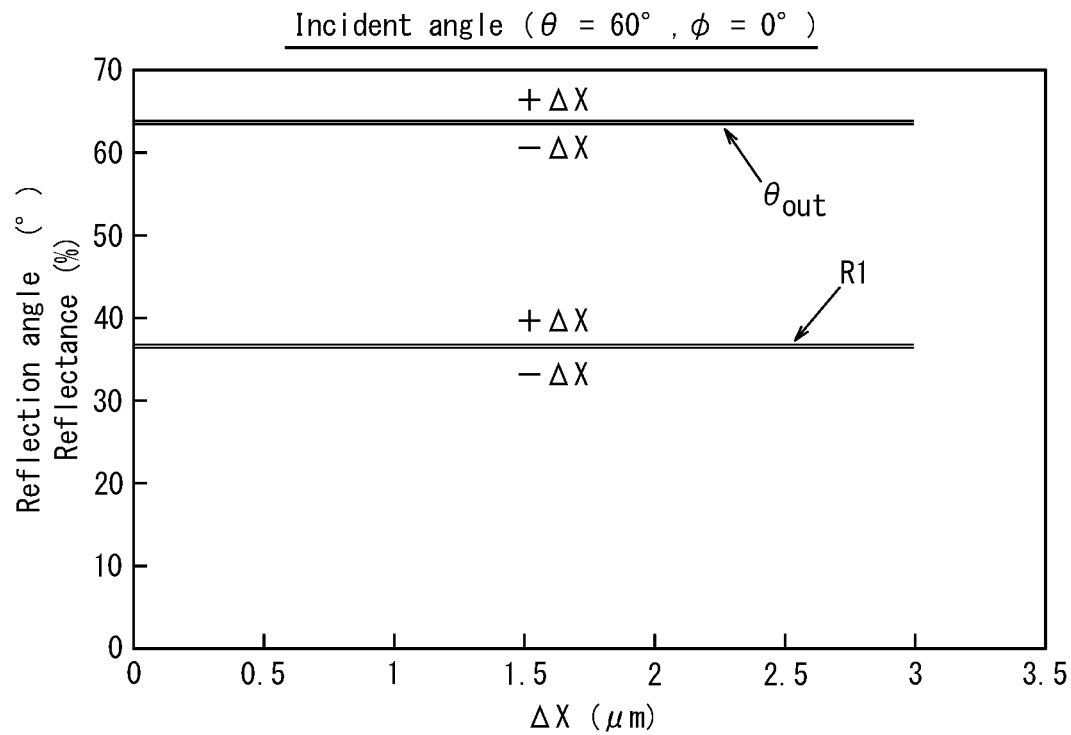
FIG. 27 is a graph illustrating simulation results of upward reflectance R1 and reflection angle $\theta_{out}$ at which reflection intensity is highest against height difference ΔX between ridges for an incident angle ($\theta=60°$, $\phi=0°$) in Example 10.
Figure 28:
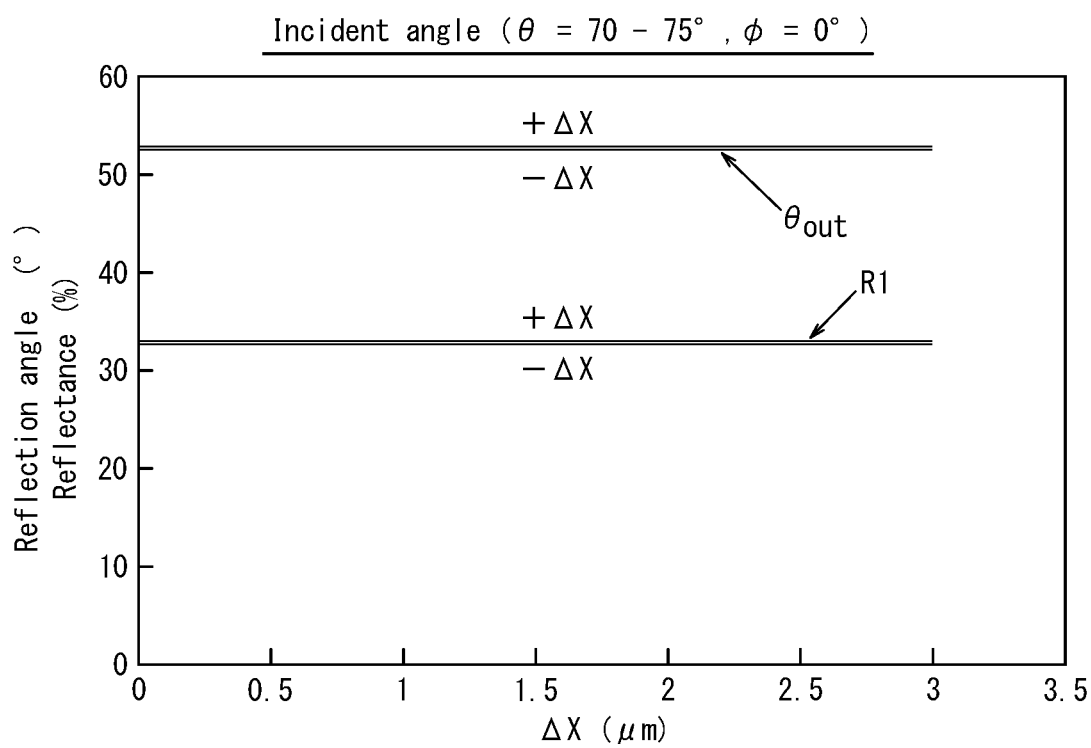
FIG. 28 is a graph illustrating simulation results of upward reflectance R1 and reflection angle $\theta_{out}$ at which reflection intensity is highest against height difference ΔX between ridges for an incident angle ($\theta=70°$ to $75°$, $\phi=0°$) in Example 10.

Moreover, LightTools illumination design analysis software produced by ORA was used to calculate upward reflectance R1 of near infrared light (wavelength 780 nm to 2100 nm) among light (wavelength 300 nm to 2500 nm) incident at an incident angle (θ=60°, φ=0°) and the reflection angle $θ_{out}$ at which reflection intensity is largest. The incident light was incident from above at an incident angle of 60° with the sample in a vertically set-up state having the lowermost point of each of the quadrangular pyramid-shaped depressions in an upward position. The results are illustrated in FIG. 27. The upward reflectance R1 of near infrared light and the reflection angle $θ_{out}$ at which reflection intensity is largest were calculated for a situation in which the same incident light was incident with an incident angle θ in a range of 70° to 75° at φ=0°. The results are illustrated in FIG. 28. Note that FIGS. 27 and 28 illustrate simulation results for the upward reflectance R1 and reflection angle $\theta_{out}$ in cases in which the height difference ΔX was to 3.0 μm. Moreover, in FIGS. 27 and 28, +ΔX indicates a case in which the other type of ridge is higher than the type of ridge corresponding to the design value ridge height, whereas −ΔX indicates a case in which the other type of ridge is lower than the type of ridge corresponding to the design value ridge height.

Based on the above-described results, it is clear from Table 2 that an optical body in which air bubbles are not present is obtained when the height difference ΔX satisfies 0.2 μm<ΔX in a case in which the intersecting ridges each have a pointed ridge shape for which the curvature radius Sr is 0. This is thought to be a consequence of the height difference ΔX facilitating escape of air bubbles in the depressions of the reflecting layer-equipped optical layer 9 in the embedding process. In FIGS. 27 and 28, the upward reflectance R1 and the reflection angle $\theta_{out}$ are roughly the same for both +ΔX and −ΔX. Moreover, it is clear from FIG. 27 that at an incident angle of 60°, the reflection angle $\theta_{out}$ is 60° or more and the upward reflectance R1 is 30° or more when 0.2 μm<ΔX. Likewise, it is clear from FIG. 28 that at an incident angle in a range of 70° to 75°, the reflection angle $\theta_{out}$ is 50° or more and the upward reflectance R1 is 30° or more when 0.2 μm<ΔX. This demonstrates that in a case in which Sr=0, an optical body having the same optical characteristics as in Examples 1 to 8 is obtained when 0.2 μm<ΔX is satisfied. Moreover, in the case of an optical body configured as set forth above, quality can be improved without causing an increase in production cost because the embedding line speed is not reduced.

Example 11

In Example 9, a curvature radius Sr of 10 μm or less was taken to be preferable in a case in which the ridge shape of the optical body is spherical. However, in a case in which there is no height difference between the intersecting ridges (i.e., in a case in which the height difference ΔX between the intersecting ridges described in Example 10 is ΔX=0), it is presumed that if the curvature radius Sr is extremely small, it is difficult for air bubbles to escape in the embedding process and miniscule air bubbles 91 remain in the optical body as illustrated in FIG. 26. Consequently, it is expected that there will be cases in which this leads to reduced quality or increased production cost as explained in Example 10.

In view of the above, the inventors produced samples for which the height difference ΔH between intersecting ridges was ΔX=0 and for which the curvature radius Sr of a spherical shape of ridges differed from one another, and inspected the presence of air bubbles using an optical microscope. In the samples, the ridge intersection angle θ1 was 30°, the quadrangular pyramid-shaped depression lowermost point inclination angle θ2 was 10°, the ridge apex angle η was 90°, the ridge height was 32 μm, and the pitch $P_y$ in the Y direction and the pitch $P_z$ in the Z direction of the quadrangular pyramid-shaped depressions 4c illustrated in FIG. 3A were each 67 μm. The curvature radius Sr of the spherical shape of the ridges was set as 0.1 μm, 0.2 μm, 0.3 μm, 1.0 μm, 2.0 μm, and 3.0 μm in the samples. Two types of urethane acrylate (ARONIX produced by Toagosei Co., Ltd.; post-curing refractive index: 1.533) having viscosities of 300 cP and 1500 cP were used as the ionizing radiation-curable resin 34 for embedding the reflecting layer-equipped optical layer 9 in the embedding process using the production apparatus illustrated in FIG. 9. Moreover, two conditions of 1.5 m/min and 10 m/min were adopted for the embedding line speed in the embedding process.

Table 3 shows the results of inspection of the presence of air bubbles for these samples. In Table 3, "poor" indicates a result that air bubbles were observed, whereas "good" indicates a result that air bubbles were not observed.

TABLE 3

| Viscosity | Embedding line speed | Curvature radius Sr | | | | | |
|---|---|---|---|---|---|---|---|
| | | 0.1 μm | 0.2 μm | 0.3 μm | 1.0 μm | 2.0 μm | 3.0 μm |
| 1500 cP | 1.5 m/min | Poor | Poor | Good | Good | Good | Good |
| | 10 m/min | Poor | Poor | Good | Good | Good | Good |
| 300 cP | 1.5 m/min | Poor | Good | Good | Good | Good | Good |
| | 10 m/min | Poor | Poor | Good | Good | Good | Good |

It is clear from Table 3 that in a case in which the height difference ΔX between intersecting ridges is ΔX=0, an optical body in which air bubbles are not present is obtained when the spherical shape of each of the ridges has a curvature radius Sr satisfying 0.3 μm≤Sr. This is thought to be due to the escape of air bubbles in the depressions of the reflecting layer-equipped optical layer 9 being facilitated along the spherical shape of the ridges in the embedding process. Therefore, in consideration of Example 9 described above, an optical body in which air bubbles are not present and having the optical characteristics described in Example 9 is reliably obtained when 0.3 μm≤Sr≤10 μm is satisfied in a case in which ΔX=0. Moreover, in the case of an optical body configured as set forth above, quality can be improved without causing an increase in production cost because the embedding line speed is not reduced.

A specific description of embodiments of the present disclosure has been provided above but the present disclosure is not limited to the preceding embodiments and various modifications can be made based on the technical concept of the present disclosure.

For example, configurations, methods, shapes, materials, values, and so forth given in the preceding embodiments are merely examples and other configurations, methods, shapes, materials, values, and so forth may be adopted as necessary.

Moreover, the configurations in the preceding embodiments may be combined so long as this does not cause deviation from the essence of the present disclosure.

In the preceding embodiments, an example is described in which a roll screen has a manual mode of operation but the roll screen may alternatively be operated in an electrically powered manner.

Also, although an example in which the optical body is in the form of a film is described in the preceding embodiments, the optical body is not limited to being in the form of a film and may alternatively be in the form of a plate, a block, or the like.

Although examples in which the optical body is adopted for a window material and a screen of a roll screen are described in the preceding embodiments, the present disclosure is not limited to these examples and the optical body may be adopted for interior members and exterior members such as fittings and blind slats.

The interior member or exterior member for which the optical body according to the present disclosure is adopted may, for example, be an interior member or an exterior member that is composed by the optical body itself or may be an interior member or an exterior member that is composed by a transparent substrate or the like to which a directional reflector is affixed. When such an interior member or exterior member is installed in proximity to a window indoors, it is possible to directionally reflect only infrared light outdoors and take in visible light indoors, for example. Consequently, the necessity of indoor illumination can be reduced even when such an interior member or exterior member is installed. Moreover, since there is hardly any diffuse reflection to the indoor side due to the interior member or exterior member, a rise in the surrounding temperature can be suppressed. An affixing member other than a transparent substrate may be adopted depending on necessary objectives such as controlling visibility or improving strength.

Although an example in which the optical body according to the present disclosure is adopted in a solar radiation shielding device (for example, a roll screen) that can adjust the amount of incident light shielded by a solar radiation shielding member through rolling up or unrolling of the solar radiation shielding member is described in the preceding embodiments, the present disclosure is not limited to this example. For example, the present disclosure can also be adopted with respect to a solar radiation shielding device that can adjust the amount of incident light that is shielded by a solar radiation shielding member through folding up of the solar radiation shielding member. One example of such a solar radiation shielding device is a pleated screen device that adjusts the amount of incident light that is shielded through folding up of a screen (solar radiation shielding member) in a bellows-like form.

Moreover, in a case in which the optical body according to the present disclosure is adopted in a blind, the blind is not limited to a horizontal blind (Venetian blind) and may be a vertical blind.

REFERENCE SIGNS LIST 1 optical body
2 optical layer
3 wavelength-selective reflecting layer
4 first optical transparent layer
4a first substrate
4c, 61c quadrangular pyramid-shaped depression
4d1, 4d2 ridge
4e lowermost point
4f center of mass
5, 62 second optical transparent layer
5a second substrate
6 affixing layer
7 peelable layer
8 hard coat layer
10, 61 window material
71 roll screen
S1 incident surface
S2 emission surface

The invention claimed is:
1. An optical body comprising:
a first optical transparent layer having a surface in which quadrangular pyramid-shaped depressions having ridges that rhombically intersect are formed;
a wavelength-selective reflecting layer that is formed on the depressions and selectively reflects light of a specific wavelength band; and
a second optical transparent layer formed on the wavelength-selective reflecting layer, wherein
when (θ, φ) is taken as an incident angle, where:
θ is an angle between a perpendicular line relative to the second optical transparent layer acting as an incident surface and incident light that is incident on the incident surface; and
φ is an angle between a specific straight line within the incident surface and a component resulting from projection of the incident light on the incident surface,
with respect to incident light that is incident on the incident surface from different directions at θ=60°, an average reflection angle of reflected light to the same quadrant as the incident light is 30° or more, and
wherein equations (1) shown below,

$$25° \leq \theta 1 \leq 45° \text{ and } \theta 2 \leq 15° \tag{1}$$

are satisfied when:
an intersection angle of the ridges that rhombically intersect is taken to be θ1; and
an angle between a principal axis of each of the depressions that passes through a lowermost point of the depression and a center of mass of a rhombic open surface of the depression and the perpendicular line is taken to be θ2.

2. The optical body according to claim 1, wherein the wavelength-selective reflecting layer includes at least an amorphous high refractive index layer and a metal layer.

3. The optical body according to claim 1, wherein the light of a specific wavelength band is principally light of a wavelength of 780 nm to 2100 nm.

4. The optical body according to claim 1, wherein the ridges have a pointed shape, and
when a height difference between the ridges that rhombically intersect is taken to be ΔX, 0.2 μm<ΔX is satisfied.

5. The optical body according to claim 1, wherein the ridges have a spherical shape, and
when a curvature radius of the spherical shape is taken to be Sr and a height difference between the ridges that rhombically intersect is taken to be ΔX, ΔX=0 and 0.3 μm≤Sr≤10 μm are satisfied.

6. A window material comprising the optical body according to claim 1.

7. A roll screen comprising the optical body according to claim 1.

* * * * *